(12) United States Patent
Xu et al.

(10) Patent No.: US 11,546,581 B2
(45) Date of Patent: Jan. 3, 2023

(54) IMPLEMENTATION ASPECTS IN INTRA BLOCK COPY IN VIDEO CODING

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/384,246

(22) Filed: Jul. 23, 2021

(65) Prior Publication Data

US 2021/0368164 A1 Nov. 25, 2021

Related U.S. Application Data

(63) Continuation of application No. PCT/CN2020/077418, filed on Mar. 2, 2020.

(30) Foreign Application Priority Data

Mar. 4, 2019 (WO) ................ PCT/CN2019/076848
Mar. 11, 2019 (WO) ................ PCT/CN2019/077725

(Continued)

(51) Int. Cl.
*H04N 19/176* (2014.01)
*H04N 19/423* (2014.01)
(Continued)

(52) U.S. Cl.
CPC ......... *H04N 19/105* (2014.11); *H04N 19/176* (2014.11); *H04N 19/423* (2014.11); *H04N 19/593* (2014.11)

(58) Field of Classification Search
CPC ... H04N 19/105; H04N 19/176; H04N 19/423
See application file for complete search history.

(56) References Cited

U.S. PATENT DOCUMENTS 8,295,361 B2  10/2012  Tseng et al.
8,947,449 B1   2/2015  Dodd
(Continued)

FOREIGN PATENT DOCUMENTS

CN  1589028 A  3/2005
CN  1759610 A  4/2006
(Continued)

OTHER PUBLICATIONS

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.
(Continued)

*Primary Examiner* — Irfan Habib
(74) *Attorney, Agent, or Firm* — Perkins Coie LLP

(57) ABSTRACT

A method of visual media processing includes determining, for a conversion between a current video block of visual media data and a bitstream representation of the current video block, a buffer that stores reference samples for prediction in an intra block copy mode; for a sample spatially located at location of the current video block relative to an upper-left position of a coding tree unit including the current video block and having a block vector, computing a corresponding reference in the buffer at a reference location, wherein the reference location is deter- (Continued)

mined using the block vector and the location; and upon determining that the reference location lies outside the buffer, re-computing the reference location based at least in part on a location of the current video block relative to the coding tree unit including the current video block.

20 Claims, 28 Drawing Sheets

(30) Foreign Application Priority Data

| Mar. 21, 2019 | (WO) | PCT/CN2019/079151 |
|---|---|---|
| May 7, 2019 | (WO) | PCT/CN2019/085862 |
| May 23, 2019 | (WO) | PCT/CN2019/088129 |
| Jun. 18, 2019 | (WO) | PCT/CN2019/091691 |
| Jun. 28, 2019 | (WO) | PCT/CN2019/093552 |

(51) Int. Cl.
  *H04N 19/593* (2014.01)
  *H04N 19/105* (2014.01)

(56) References Cited

U.S. PATENT DOCUMENTS

| 9,426,463 | B2 | 8/2016 | Seregin et al. |
|---|---|---|---|
| 9,491,460 | B2 | 11/2016 | Seregin et al. |
| 9,591,325 | B2 | 3/2017 | Li et al. |
| 9,860,559 | B2 | 1/2018 | Zhang et al. |
| 9,877,043 | B2 | 1/2018 | He et al. |
| 9,918,105 | B2 | 3/2018 | Pang et al. |
| 10,148,981 | B2 | 12/2018 | Zhu et al. |
| 10,178,403 | B2 | 1/2019 | Seregin et al. |
| 10,200,706 | B2 | 2/2019 | Hellman |
| 10,264,290 | B2 | 4/2019 | Xu et al. |
| 10,284,874 | B2 | 5/2019 | He et al. |
| 10,306,240 | B2 | 5/2019 | Xiu et al. |
| 10,368,091 | B2 | 7/2019 | Li et al. |
| 10,412,387 | B2 | 9/2019 | Pang et al. |
| 10,440,378 | B1 | 10/2019 | Xu et al. |
| 10,469,863 | B2 | 11/2019 | Zhu et al. |
| 10,516,882 | B2 | 12/2019 | He et al. |
| 10,567,754 | B2 | 2/2020 | Li et al. |
| 10,582,213 | B2 | 3/2020 | Li et al. |
| 10,728,552 | B2 | 7/2020 | Tsukuba |
| 10,841,607 | B2 | 11/2020 | Park et al. |
| 10,873,748 | B2 | 12/2020 | Chen et al. |
| 11,025,945 | B2 | 6/2021 | Park et al. |
| 11,070,816 | B2 | 7/2021 | Xu et al. |
| 11,228,775 | B2 | 1/2022 | Xu et al. |
| 2008/0025407 | A1 | 1/2008 | Winger |
| 2008/0043845 | A1 | 2/2008 | Nakaishi |
| 2008/0219352 | A1 | 9/2008 | Tokumitsu et al. |
| 2008/0260034 | A1 | 10/2008 | Wang et al. |
| 2010/0014584 | A1 | 1/2010 | Feder et al. |
| 2011/0249754 | A1 | 10/2011 | Karczewicz et al. |
| 2012/0002716 | A1 | 1/2012 | Antonellis et al. |
| 2012/0201308 | A1 | 8/2012 | Prasad et al. |
| 2012/0236931 | A1 | 9/2012 | Karczewicz et al. |
| 2013/0003864 | A1 | 1/2013 | Sullivan |
| 2013/0329784 | A1 | 12/2013 | Chuang et al. |
| 2014/0072041 | A1 | 3/2014 | Seregin et al. |
| 2014/0160139 | A1 | 6/2014 | MacInnis et al. |
| 2014/0301465 | A1 | 10/2014 | Kwon et al. |
| 2014/0348240 | A1 | 11/2014 | Kim et al. |
| 2014/0376611 | A1 | 12/2014 | Kim et al. |
| 2015/0063440 | A1 | 3/2015 | Pang et al. |
| 2015/0131724 | A1 | 5/2015 | Lin et al. |
| 2015/0195559 | A1 | 7/2015 | Chen et al. |
| 2015/0264372 | A1 | 9/2015 | Kolesnikov et al. |
| 2015/0264373 | A1 | 9/2015 | Wang et al. |
| 2015/0264383 | A1 | 9/2015 | Cohen et al. |
| 2015/0264386 | A1* | 9/2015 | Pang ............... H04N 19/463 |
|  |  |  | 375/240.16 |
| 2015/0264396 | A1 | 9/2015 | Zhang et al. |
| 2015/0271487 | A1 | 9/2015 | Li et al. |
| 2015/0296213 | A1 | 10/2015 | Hellman |
| 2015/0334405 | A1 | 11/2015 | Rosewarne et al. |
| 2015/0373358 | A1 | 12/2015 | Pang et al. |
| 2015/0373359 | A1 | 12/2015 | He et al. |
| 2016/0100189 | A1* | 4/2016 | Pang ............... H04N 19/186 |
|  |  |  | 375/240.13 |
| 2016/0104457 | A1 | 4/2016 | Wu et al. |
| 2016/0227222 | A1 | 8/2016 | Hu et al. |
| 2016/0227244 | A1 | 8/2016 | Rosewarne |
| 2016/0241858 | A1 | 8/2016 | Li et al. |
| 2016/0241875 | A1 | 8/2016 | Wu et al. |
| 2016/0330474 | A1 | 11/2016 | Liu et al. |
| 2016/0337661 | A1 | 11/2016 | Pang et al. |
| 2016/0360234 | A1 | 12/2016 | Tourapis et al. |
| 2017/0054996 | A1 | 2/2017 | Xu et al. |
| 2017/0076419 | A1 | 3/2017 | Fries et al. |
| 2017/0094271 | A1 | 3/2017 | Liu et al. |
| 2017/0094314 | A1 | 3/2017 | Zhao et al. |
| 2017/0099490 | A1 | 4/2017 | Seregin et al. |
| 2017/0099495 | A1 | 4/2017 | Rapaka et al. |
| 2017/0134724 | A1 | 5/2017 | Liu et al. |
| 2017/0188033 | A1 | 6/2017 | Lin et al. |
| 2017/0223379 | A1 | 8/2017 | Chuang et al. |
| 2017/0280159 | A1 | 9/2017 | Xu et al. |
| 2017/0289566 | A1 | 10/2017 | He et al. |
| 2017/0295379 | A1 | 10/2017 | Sun et al. |
| 2017/0372494 | A1 | 12/2017 | Zhu et al. |
| 2018/0103260 | A1 | 4/2018 | Chuang et al. |
| 2018/0152727 | A1 | 5/2018 | Chuang et al. |
| 2018/0160122 | A1 | 6/2018 | Xu et al. |
| 2018/0184093 | A1 | 6/2018 | Xu et al. |
| 2018/0220130 | A1 | 8/2018 | Zhang et al. |
| 2018/0302645 | A1 | 10/2018 | Laroche et al. |
| 2018/0376165 | A1 | 12/2018 | Alshin et al. |
| 2019/0007705 | A1* | 1/2019 | Zhao ............... H04N 19/12 |
| 2019/0068992 | A1 | 2/2019 | Tourapis et al. |
| 2019/0191167 | A1 | 6/2019 | Drugeon et al. |
| 2019/0200038 | A1 | 6/2019 | He et al. |
| 2019/0208217 | A1 | 7/2019 | Zhou et al. |
| 2019/0238864 | A1 | 8/2019 | Xiu et al. |
| 2019/0246143 | A1 | 8/2019 | Zhang et al. |
| 2020/0037002 | A1 | 1/2020 | Xu et al. |
| 2020/0077087 | A1 | 3/2020 | He et al. |
| 2020/0084454 | A1 | 3/2020 | Liu et al. |
| 2020/0092579 | A1 | 3/2020 | Zhu et al. |
| 2020/0099953 | A1 | 3/2020 | Xu et al. |
| 2020/0137401 | A1 | 4/2020 | Kim et al. |
| 2020/0177910 | A1 | 6/2020 | Li et al. |
| 2020/0204819 | A1 | 6/2020 | Hsieh et al. |
| 2020/0213608 | A1 | 7/2020 | Chen et al. |
| 2020/0396465 | A1 | 12/2020 | Zhang et al. |
| 2020/0404255 | A1 | 12/2020 | Zhang et al. |
| 2020/0404260 | A1 | 12/2020 | Zhang et al. |
| 2020/0413048 | A1 | 12/2020 | Zhang et al. |
| 2021/0021811 | A1 | 1/2021 | Xu et al. |
| 2021/0029373 | A1* | 1/2021 | Park ............... H04N 19/44 |
| 2021/0120261 | A1 | 4/2021 | Lim et al. |
| 2021/0136405 | A1 | 5/2021 | Chen et al. |
| 2021/0152833 | A1 | 5/2021 | Gao et al. |
| 2021/0274201 | A1* | 9/2021 | Xu ............... H04N 19/517 |
| 2021/0274202 | A1 | 9/2021 | Xu et al. |
| 2021/0297674 | A1 | 9/2021 | Xu et al. |
| 2021/0321127 | A1 | 10/2021 | Zhao et al. |
| 2021/0352279 | A1 | 11/2021 | Xu et al. |
| 2021/0360270 | A1 | 11/2021 | Xu et al. |
| 2021/0368178 | A1 | 11/2021 | Xu et al. |
| 2021/0385437 | A1 | 12/2021 | Xu et al. |

FOREIGN PATENT DOCUMENTS

| CN | 102017638 A | 4/2011 |
|---|---|---|
| CN | 102595118 A | 7/2012 |
| CN | 105393536 A | 3/2016 |
| CN | 105474645 A | 4/2016 |
| CN | 105532000 A | 4/2016 |
| CN | 105556967 A | 5/2016 |
| CN | 105659602 A | 6/2016 |

(56) References Cited

FOREIGN PATENT DOCUMENTS

| | | | |
|---|---|---|---|
| CN | 105765974 A | 7/2016 | |
| CN | 105847795 A | 8/2016 | |
| CN | 105847843 A | 8/2016 | |
| CN | 106105215 A | 11/2016 | |
| CN | 10646896 A | 2/2017 | |
| CN | 106415607 A | 2/2017 | |
| CN | 106416243 A | 2/2017 | |
| CN | 106416250 A | 2/2017 | |
| CN | 106464904 A | 2/2017 | |
| CN | 106464921 A | 2/2017 | |
| CN | 106576172 A | 4/2017 | |
| CN | 106717004 A | 5/2017 | |
| CN | 106797466 A | 5/2017 | |
| CN | 106797475 A | 5/2017 | |
| CN | 107018418 A | 8/2017 | |
| CN | 107211155 A | 9/2017 | |
| CN | 107409226 A | 11/2017 | |
| CN | 107615762 A | 1/2018 | |
| CN | 107615763 A | 1/2018 | |
| CN | 107615765 A | 1/2018 | |
| CN | 107846597 A | 3/2018 | |
| CN | 107852490 A | 3/2018 | |
| CN | 107925769 A | 4/2018 | |
| CN | 101198063 A | 6/2018 | |
| CN | 108141605 A | 6/2018 | |
| CN | 109076210 A | 12/2018 | |
| EP | 3253059 A1 | 12/2017 | |
| JP | 4360093 B2 | 11/2009 | |
| JP | 2016534660 A | 11/2016 | |
| JP | 2016539542 A | 12/2016 | |
| JP | 2017130938 A | 7/2017 | |
| JP | 2017535148 A | 11/2017 | |
| JP | 2017535150 A | 11/2017 | |
| JP | 6324590 B2 | 5/2018 | |
| JP | 2018521539 A | 8/2018 | |
| KR | 20170020928 A | 2/2017 | |
| WO | 2011127964 A2 | 10/2011 | |
| WO | 2015108793 A1 | 7/2015 | |
| WO | 2015142854 A1 | 9/2015 | |
| WO | 2016054985 A1 | 4/2016 | |
| WO | 2016057208 A1 | 4/2016 | |
| WO | 2016057701 A1 | 4/2016 | |
| WO | 2016192594 A1 | 12/2016 | |
| WO | 2016200984 A1 | 12/2016 | |
| WO | 2017041692 A1 | 3/2017 | |
| WO | 2018190207 A1 | 10/2018 | |
| WO | 2019017694 A1 | 1/2019 | |
| WO | 2020228744 A1 | 11/2020 | |
| WO | 2020259677 A1 | 12/2020 | |

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Budagavi et al. "AHG8: Video-Coding Using Intra Motion Compensation," Joint Collaborative Team on Video Coding (JCT-VC) of ITU-T SG 16 WP 3 and ISO/IEC JTC 1/SC 29/WG 11, 13th Meeting, Incheon, KR, Apr. 18-26, 2013, document JCTVC-M0350, 2013.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al.CE4: Affine Merge Enhancement with Simplification (Test 4.2.2), Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0369, 2018.
Gao et al. "CE8-Related: Dedicated IBC Reference Buffer without Bitstream Restrictions," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0248, 2019.
Hendry et al. "APS Partial Update—APS Buffer Management," Joint Collaborative Team on Video Coding (JCT-VC) of ITU-T SG 16 WP 3 and ISO/IEC JTC 1/SC 29/WG 11, 9th Meeting, Geneva, CH, Apr. 27-May 7, 2012, document JCTVC-I0082, 2012.
"Information Technology—High Efficiency Coding and Media Delivery in Heterogeneous Environments—Part 2: High Efficiency Video Coding" Apr. 20, 2018, ISO/DIS 23008, 4th Edition.
Li et al. "CE8-Related: IBC Modifications," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0127, 2019.
Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.
Lu et al. "CE12: Mapping Functions (Test CE12-1 and CE12-2)," Joint Video Experts Team (JVET) of ITU-t SG 16 WP 3 and ISO/IEC JTC 1/SC 29/WG 11, 13th Meeting, Marrakech, MA, Jan. 9-18, 2019, document JVET-M0427, 2019.
Nam et al. "Non-CE8: Block Vector Predictor for IBC," Joint Video Experts Team (JVET) of ITU-T SG 16 WP 3 and ISO/IEC JTC 1/SC 29/WG 11 12th Meeting, Macau, CN, Oct. 8-12, 2018, document JVET-L0159, 2018.
Pang et al. "Intra Block Copy with Larger Search Region," Joint Collaborative Team on Video Coding (JCT-VC) of ITU-T SG 16 WP 3 and ISO/IEC JTC 1/SC 29/WG 11, 17th Meeting, Valencia, ES, Mar. 27-Apr. 4, 2014, document JCTVC-Q0139, 2014.
Pang et al. "SCCE1: Test 1.1—Intra Block Copy with Different Areas," Joint Collaborative Team on Video Coding (JCT-VC) of ITU-T SG 16 WP 3 and ISO/IEC JTC1/SC29/WG11 18th Meeting, Sapporo, JP, Jun. 30-Jul. 9, 2014, document JCTVC-R0184, 2014.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.
Sole et al. "HEVC Screen Content Coding Core Experiment 1 (SCCE1): Intra Block Copying Extensions," Joint Collaborative Team on Video Coding (JCT-VC) of ITU-T SG 16 WP 3 and ISO/IEC JTC1/SC29/WG11 17th Meeting, Valencia, ES Mar. 27-Apr. 4, 2014 , document JCTVC-Q1121, 2014.
Venugopal et al. "Cross Check of JVET-L0297 (CE8-Related: CPR Mode with Local Search Range Optimization)," Joint Video Experts Team (JVET) of ITU-T SG 16 WP3 and ISO/IEC JTC 1/SC 29/WG 11, 12th Meeting, Macao, CN, Oct. 3-12, 2018, document JVET-L0518, 2018.
Xu et al. "CE8: CPR Reference Memory Reuse Without Increasing Memory Requirement (CE8.1.2a and CE8.1.2d)," Joint Video Experts Team (JVET) of ITU-T SG 16 WP 3 and ISO/IEC JTC 1/SC 29/WG 11 13 Meeting, Marrakesh, MA, Jan. 9-18, 2019, document JVET-M0407, 2019.
Xu et al. "CE8: CPR Reference Memory Reuse Without Reduced Memory Requirement (CE8.1.2b and CE8.1.2c)," Joint Video Experts Team (JVET) of ITU-T SG 16 WP 3 and ISO/IEC JTC 1/SC 29/WG 11 13 Meeting, Marrakesh, MA, Jan. 9-18, 2019, document JVET-M0408.
Xu et al. "Non-CE8: Reference Memory Reduction for Intra Block Copy," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0250, 2019.
Xu et al. "Non-CE8: Intra Block Copy Clean-Up," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0251, 2019.

(56) References Cited

OTHER PUBLICATIONS

Xu et al. "Non-CE8: IBC Search Range Adjustment for Implementation Consideration," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0383, 2019.
Xu et al. "Non-CE8: On IBC Reference Buffer Design," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0472, 2019.
Yang et al. "CE:4 Summary Report on Inter Prediction and Motion Vector Coding," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0024, 2018.
Zhang et al. "Symmetric Intra Block Copy," Joint Collaborative Team on Video Coding (JCT-VC) of ITU-T SG 16 WP 3 and ISO/IEC JTC 1/SC 29/WG 11, 17th Meeting, Valencia, ES, Mar. 27-Apr. 4, 2014, document JCTVC-Q0082, 2014.
JEM-7.0: https://jvet.hhi.fraunhofer.de/svn/svn_HMJEMSoftware/tags/ HM-16.6-JEM-7.0.
https://vcgit.hhi.fraunhofer.de/jvet/VVCSoftware_VTM/-/tags/VTM-3.0.
http://phenix.it-sudparis.eu/jvet/doc_end_user/current_document.php?id=4834.
International Search Report and Written Opinion from International Patent Application No. PCT/CN2020/074155 dated Apr. 21, 2020 (11 pages).
International Search Report and Written Opinion from International Patent Application No. PCT/CN2020/074156 dated Apr. 22, 2020 (10 pages).
International Search Report and Written Opinion from International Patent Application No. PCT/CN2020/074159 dated Apr. 22, 2020 (9 pages).
International Search Report and Written Opinion from International Patent Application No. PCT/CN2020/074160 dated Apr. 23, 2020 (10 pages).
International Search Report and Written Opinion from International Patent Application No. PCT/CN2020/074161 dated Apr. 28, 2020 (11 pages).
International Search Report and Written Opinion from International Patent Application No. PCT/CN2020/074162 dated Apr. 28, 2020 (8 pages).
International Search Report and Written Opinion from International Patent Application No. PCT/CN2020/074163 dated Apr. 22, 2020 (11 pages).
International Search Report and Written Opinion from International Patent Application No. PCT/CN2020/074164 dated Apr. 29, 2020 (8 pages).
International Search Report and Written Opinion from International Patent Application No. PCT/CN2020/077415 dated Apr. 26, 2020 (9 pages).
International Search Report and Written Opinion from International Patent Application No. PCT/CN2020/077416 dated Way 27, 2020 (10 pages).
International Search Report and Written Opinion from International Patent Application No. PCT/CN2020/077417 dated Way 27, 2020 (9 pages).
International Search Report and Written Opinion from International Patent Application No. PCT/CN2020/077418 dated Way 28, 2020 (9 pages).
International Search Report and Written Opinion from International Patent Application No. PCT/CN2020/098471 dated Oct. 10, 2020 (10 pages).
International Search Report and Written Opinion from International Patent Application No. PCT/CN2020/099702 dated Aug. 27, 2020 (9 pages).
International Search Report and Written Opinion from International Patent Application No. PCT/CN2020/100992 dated Sep. 28, 2020 (10 pages).
International Search Report and Written Opinion from International Patent Application No. PCT/CN2020/100998 dated Oct. 12, 2020 (9 pages).
Non Final Office Action from U.S. Appl. No. 17/320,008 dated Jul. 12, 2021.
Non Final Office Action from U.S. Appl. No. 17/319,994 dated Jul. 26, 2021.
Non Final Office Action from U.S. Appl. No. 17/320,033 dated Jul. 27, 2021.
Flynn et al. "BoG Reporton Range Extensions Topics," Joint Collaborative Team on Video Coding (JCT-VC) on ITU-T SG 16 WP 3 and ISO/IEC JTC 1/SC 29/WG 11, 15th Meeting, Geneva, CH, Oct. 23-Nov. 1, 2013, document JCTVC-O0352, 2013.
Van et al. "CE8-Related: Restrictions for the Search Area of the IBC Blocks in CPR," Joint Video Experts Team (JVET) of ITU-T SG 16 WP 3 and ISO/IEC JTC 1/SC 29/WG 11, 12th Meeting: Macao, CN, Oct. 3-12, 208, document JVET-L0404, 2018.
Xu et al. "Intra Block Copy in HEVC Screen Content Coding Extensions," IEEE Journal on Emerging and Selected Topics in Circuits and Systems, Dec. 2016, 6(4):409-419, XP011636923.
Xu et al. "CE8-Related: CPR Mode with Local Search Range Optimization," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0297, 2018.
Extended European Search Report from European Patent Application No. 20766750.2 dated Feb. 18, 2022 (21 pages).
Final Office Action from U.S. Appl. No. 17/320,033 dated Nov. 5, 2021.
Final Office Action from U.S. Appl. No. 17/319,994 dated Nov. 16, 2021.
Non Final Office Action from U.S. Appl. No. 17/362,341 dated Nov. 19, 2021.
Chen et al. "Algorithm Description for Versatile Video Coding and Test Model 3 (VTM 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-M1002, 2018.
Chen et al. "Algorithm Description for Versatile Video Coding and Test Model 4 (VTM 4)," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M1002, 2019.
"Encoder Decoder + Intra Block Copy + Buffer or Reference Buffer+ Bit Depth or Bit-Depth" Google Search, Mar. 22, 2022.
"Intra Block Copy" Library USTPO Query for NPL, Mar. 22, 2022.
Non Final Office Action from U.S. Appl. No. 17/570,723 dated Mar. 25, 2022.
Non Final Office Action from U.S. Appl. No. 17/570,753 dated Mar. 31, 2022.
Non Final Office Action from U.S. Appl. No. 17/569,390 dated Apr. 1, 2022.
Heng et al. "Non-CE8: Comments on Current Picture Referencing," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0402, 2019. (cited in EP20765739.6 EESR mailed May 19, 2022).
Rapaka et al. "On Storage of Unfiltered and Filtered Current Decoded Pictures," Joint Collaborative Team on Video Coding (JCT-VC) of ITU-T SG 16 WP 3 and ISO/IEC JTC 1/SC 29/WG 11 22nd Meeting: Geneva, CH, Oct. 15-21, 2015, document JVET-V0050, 2015. (cited in EP20748900.6 EESR mailed May 11, 2022).
Extended European Search Report from European Patent Application No. 20747609.4 dated May 11, 2022 (10 pages).
Extended European Search Report from European Patent Application No. 20748900.6 dated May 11, 2022 (10 pages).
Extended European Search Report from European Patent Application No. 20765739.6 dated May 19, 2022 (7 pages).
Notice of Allowance from U.S. Appl. No. 17/362,341 dated Jul. 7, 2022.
Gao et al. "Bitstram Conformance with a Virtual IBC Buffer Concept," Joint Video Experts Team (JVET) of ITU0T SG 16 WP

(56) References Cited

OTHER PUBLICATIONS 3 and ISO/IEC JTC 1/SC 29/WG 11 15th Meeting, Gothenburg, SE, Jul. 3-12, 2019, document JVET-O1171, 2019. (cited in EP20837885.1 EESR mailed Jul. 7, 2022).

Hannuksela et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE Jul. 3-12, 2019, document JVET-O2001, 2019. (cited in EP20837885.1 EESR mailed Jul. 7, 2022).

Hannuksela et al. "AHG12: single_slice_per_subpic_flag," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1024, 2019. (EP20837744.0 EESR mailed Jul. 5, 2022).

Xu et al. "Non-CE8: IBC Search Range Increase for Small CTU Size," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0384, 2019. (cited in EP20836430.7 EESR mailed Jul. 22, 2022).

Xu et al. "An Implementation of JVET-O0568 based on the IBC Buffer Design of JVET-O0127," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O1161, 2019. (cted in EP20837885.1 EESR mailed Jul. 7, 2022).

Xu et al. "Bitstram Conformance with a Virtual IBC Buffer Concept," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O1170, 2019. (cited in EP20837885.1 EESR mailed Jul. 7, 2022).

Extended European Search Report from European Patent Application No. 20836430.7 dated Jul. 22, 2022 (12 pages).

Extended European Search Report from European Patent Application No. 20837885.1 dated Jul. 7, 2022 (15 pages).

Extended European Search Report from European Patent Application No. 20837744.0 dated Jul. 5, 2022 (12 pages).

Xu et al. "Description of Core Experiment 8: Screen Content Coding Tools," Joint Video Experts Team (JVET) of ITU-T SG 16 WP 3 and ISO/IEC JTC 1/SC 29/WG 11 12th Meeting, Macao, CN, Oct. 3-12, 2018, document JVET-L1028, 2018 (cted in JP2021-551505 OA mailed Oct. 4, 2022).

Alshin et al. "RCE3: Intra Block Copy Search Range (Tests A),"Joint Collaborative Team on Video Coding (JCT-VC) of ITU-T SG 16 WP 3 and ISO/IEC JTC 1/SC 29/WG 1116th Meeting: San José, US, Jan. 9-17, 2014, document JCTVC-P0211, 2014.

Wang et al. "SCCE1: Result of Test 1.2 for IBC with Constrained Buffers from Left CTUs," Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014, document JCTVC-R0141, 2014.

Extended European Search Report from European Patent Application No. 20748417.1 dated Oct. 25, 2022 (11 pages).

\* cited by examiner

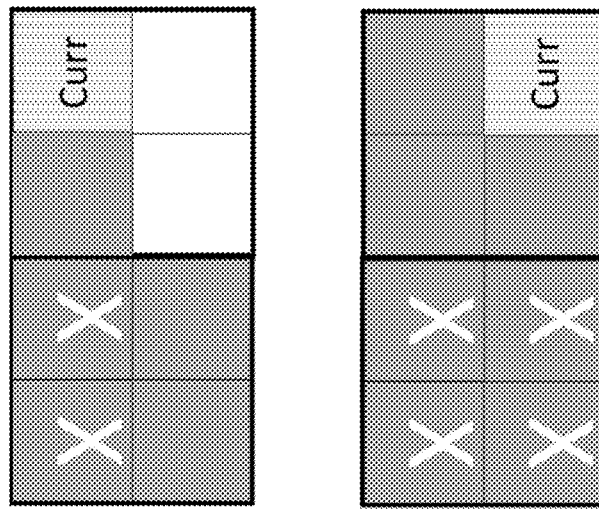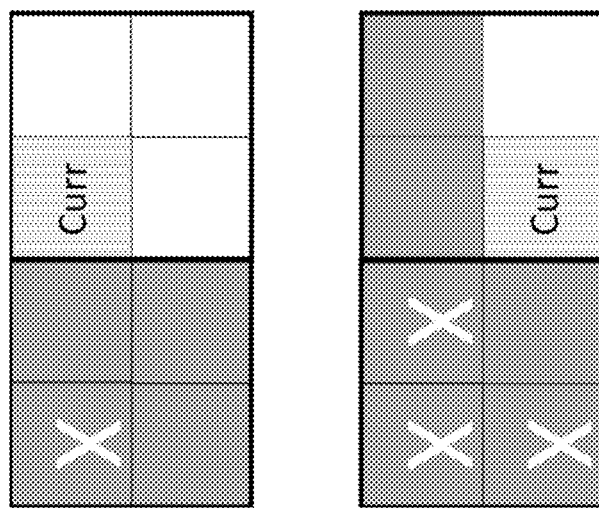
FIG. 2

```
                    ┌─────────────────────────┐
                    │ 1802                    │
                    │ determining, for a conversion between a current video block of visual
                    │ media data and a bitstream representation of the current video block, a
            1800    │ buffer that stores reference samples for prediction in an intra block
              ↘    │ copy mode, wherein the conversion is performed in the intra block
                    │ copy mode which is based on motion information related to a
                    │ reconstructed block located in same video region with the current
                    │ video block
                    └────────────┬────────────┘
                                 │
                    ┌────────────┴────────────┐
                    │ 1804                    │
                    │ for a sample spatially located at location (x0, y0) of the current video
                    │ block relative to an upper-left position of a coding tree unit including
                    │ the current video block and having a block vector (BVx, BVy),
                    │ computing a corresponding reference in the buffer at a reference
                    │ location (P, Q), wherein the reference location (P, Q) is determined
                    │ using the block vector (BVx, BVy) and the location (x0, y0);
                    └────────────┬────────────┘
                                 │
                    ┌────────────┴────────────┐
                    │ 1806                    │
                    │ upon determining that the reference location (P, Q) lies outside the
                    │ buffer, re-computing the reference location based at least in part on a
                    │ location of the current video block relative to the coding tree unit
                    │ including the current video block
                    └─────────────────────────┘
```

2102 — determining, for a conversion between a current video block and a bitstream representation of the current video block, a buffer that is used to store reconstructed samples for prediction in an intra block copy mode, wherein the conversion is performed in the intra block copy mode which is based on motion information related to a reconstructed block located in same video region with the current video block 2104 — updating the reconstructed samples stored in the buffer in accordance with an order

2202 ⟶ performing a conversion between a current video block and a bitstream representation of the current video block, wherein the conversion is performed in an intra block copy mode which is based on motion information related to a reconstructed block located in same video region with the video block, wherein, during the conversion, a first precision used for prediction calculations is lower than a second precision used for reconstruction calculations

2302 — performing a conversion between a current video block and a bitstream representation of the current video block using an intra block copy mode which is based on motion information related to a reconstructed block located in same video region with the current video block, wherein, during the conversion, a reference area of size nM x nM is used, where n and M are integers and wherein the current video block is positioned in a coding tree unit, and wherein the reference area includes samples from nxn nearest available coding tree units in a coding tree unit row corresponding to the current video block

2402 — performing a conversion between a current video block and a bitstream representation of the current video block using an intra block copy mode which is based on motion information related to a reconstructed block located in same video region with the current video block, wherein, during the conversion, a reference area of size nM × pM is used, where n, p and M are integers and wherein the current video block is positioned in a coding tree unit, and wherein the reference area includes samples from nxp-1 nearest available coding tree units in a coding tree unit row corresponding to the current video block

2502 — performing a conversion between a current video block of a virtual pipeline data unit (VPDU) of a video region and a bitstream representation of the current video block using an intra block copy mode which is based on motion information related to a reconstructed block located in same video region with the current video block, wherein, during the conversion, a reference area of size nM x nM is used, a size of the VPDU is kM x kM, where k, n and M are integers and wherein the current video block is positioned in the coding tree unit, and wherein the reference area includes samples from nxn-k nearest available coding tree units in a coding tree unit row corresponding to the current video block

2602 — determining, for a conversion between a w x h sized current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block 2604 — for a sample spatially located at location (x0, y0) of the current video block relative to an upper-left position of a coding tree unit (CTU) of size MxM including the current video block and having a block vector (BVx, BVy), computing a corresponding reference area starting at a reference location (P, Q) in the buffer, wherein the reference location (P, Q) is determined using the block vector (BVx, BVy) and/or the location (x0, y0)

2606 — applying one or more rule-based constraints to the reference area and/or the reference location (P, Q) to restrict overlap of the reference area with a video region

2702 — determining, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block 2704 — for a sample spatially located at location (x0, y0) of the current video block relative to a coding unit (CU) including the current video block, computing a corresponding reference area starting at a reference location in the buffer 2706 — adjusting the reference area and the reference location to determine which of the previously-processed blocks are used for prediction

FIG. 27

```
           ┌─────────────────────────┐  ┌─────────────────────────┐
           │  2802                   │  │  2804                   │
2800 ──▶   │  [Block 1]              │──│  [Block 2]              │
           └─────────────────────────┘  └─────────────────────────┘
```

Block 2802: determining, for a conversion between a current video block of a video and a bitstream representation of the current video block, validity of a block vector corresponding to the current video block of a component c of the video using a component X of the video, wherein the component X is different from a luma component of the video

Block 2804: performing the conversion using the block vector upon determining that the block vector is valid for the current video block, wherein the conversion is performed in an intra block copy (IBC) mode which is based on motion information related to a reconstructed block located in same video region with the current video block

IMPLEMENTATION ASPECTS IN INTRA BLOCK COPY IN VIDEO CODING

CROSS REFERENCE TO RELATED APPLICATIONS

This application is a continuation of International Patent Application No. PCT/CN2020/077418, filed on Mar. 2, 2020, which claims the priority to and benefits of International Patent Application No. PCT/CN2019/076848, filed on Mar. 4, 2019, PCT/CN2019/077725, filed on Mar. 11, 2019, PCT/CN2019/079151, filed on Mar. 21, 2019, PCT/CN2019/085862, filed on May 7, 2019, PCT/CN2019/088129, filed on May 23, 2019, PCT/CN2019/091691, filed on Jun. 18, 2019, PCT/CN2019/093552, filed on Jun. 28, 2019. All the aforementioned patent applications are hereby incorporated by reference in their entireties.

TECHNICAL FIELD

This patent document relates to video coding and decoding techniques, devices, and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present document describes various embodiments and techniques for buffer management and block vector coding for intra block copy mode for decoding or encoding video or images.

In one example aspect, a method of video or image (visual data) processing is disclosed. The method includes determining, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block; for a sample spatially located at location (x0, y0) of the current video block relative to an upper-left position of a coding tree unit including the current video block and having a block vector (BVx, BVy), computing a corresponding reference in the buffer at a reference location (P, Q), wherein the reference location (P, Q) is determined using the block vector (BVx, BVy) and the location (x0, y0); and upon determining that the reference location (P, Q) lies outside the buffer, re-computing the reference location based at least in part on a location of the current video block relative to the coding tree unit including the current video block.

In another example aspect, another method of visual data processing is disclosed. The method includes determining, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block; for a sample spatially located at location (x, y) of the current video block relative to an upper-left position of a picture including the current video block and having a block vector (BVx, BVy), assigning the block vector (BVx, BVy) as valid based at least in part on satisfying one or more conditions associated with at least one of: the location (x, y) of the current video block, dimensions of the current video block, dimensions of the picture, dimensions of a coding tree unit including the current video block, or dimensions of the buffer; performing a check to determine that the block vector (BVx, BVy) is valid; and upon identifying that the block vector (BVx, BVy) is valid, computing a corresponding reference in the buffer at a reference location (P, Q), wherein the reference location (P, Q) is determined using the block vector (BVx, BVy), the location (x, y), and the dimensions of the buffer.

In yet another example aspect, another method of visual data processing is disclosed. The method includes determining, for a conversion between a current video block of visual media data and a bitstream representation of the current video block, a block vector (BVx, BVy) or a block vector difference (BVDx, BVDy) for the current video block, wherein the conversion is performed in an intra block copy mode which is based on motion information related to a reconstructed block located in same video region with the current video block; and normalizing at least one component of the block vector (BVx, BVy) or at least one component of the block vector difference (BVDx, BVDy) to lie within a range.

In yet another example aspect, another method of video processing is disclosed. The method includes determining, for a conversion between a current video block and a bitstream representation of the current video block, a buffer that is used to store reconstructed samples for prediction in an intra block copy mode, wherein the conversion is performed in the intra block copy mode which is based on motion information related to a reconstructed block located in same video region with the current video block; and updating the reconstructed samples stored in the buffer in accordance with an order.

In another example aspect, another method of video processing is disclosed. The method includes performing a conversion between a current video block and a bitstream representation of the current video block, wherein the conversion is performed in an intra block copy mode which is based on motion information related to a reconstructed block located in same video region with the video block, wherein, during the conversion, a first precision used for prediction calculations is lower than a second precision used for reconstruction calculations.

In yet another example aspect, another method of video processing is disclosed. The method includes performing a conversion between a current video block and a bitstream representation of the current video block using an intra block copy mode which is based on motion information related to a reconstructed block located in same video region with the current video block, wherein, during the conversion, a reference area of size nM×nM is used, where n and M are integers and wherein the current video block is positioned in a coding tree unit, and wherein the reference area includes samples from n×n nearest available coding tree units in a coding tree unit row corresponding to the current video block.

In yet another example aspect, another method of video processing is disclosed. The method includes performing a conversion between a current video block and a bitstream representation of the current video block using an intra block copy mode which is based on motion information related to a reconstructed block located in same video region with the current video block, wherein, during the conversion, a reference area of size nM×pM is used, where n, p and M are integers and wherein the current video block is positioned in a coding tree unit, and wherein the reference area includes samples from n×p−1 nearest available coding tree units in a coding tree unit row corresponding to the current video block.

In yet another example aspect, another method of video processing is disclosed. The method includes performing a conversion between a current video block of a virtual pipeline data unit (VPDU) of a video region and a bitstream representation of the current video block using an intra block copy mode which is based on motion information related to a reconstructed block located in same video region with the current video block, wherein, during the conversion, a reference area of size nM×nM is used, a size of the VPDU is kM×kM, where k, n and M are integers and wherein the current video block is positioned in the coding tree unit, and wherein the reference area includes samples from n×n−k nearest available coding tree units in a coding tree unit row corresponding to the current video block.

In yet another example aspect, another method of video processing is disclosed. The method includes determining, for a conversion between a w×h sized current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block; for a sample spatially located at location (x0, y0) of the current video block relative to an upper-left position of a coding tree unit (CTU) of size M×M including the current video block and having a block vector (BVx, BVy), computing a corresponding reference area starting at a reference location (P, Q) in the buffer, wherein the reference location (P, Q) is determined using the block vector (BVx, BVy) and/or the location (x0, y0); and applying one or more rule-based constraints to the reference area and/or the reference location (P, Q) to restrict overlap of the reference area with a video region.

In yet another example aspect, another method of video processing is disclosed. The method includes determining, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block; for a sample spatially located at location (x0, y0) of the current video block relative to a coding unit (CU) including the current video block, computing a corresponding reference area starting at a reference location in the buffer; and adjusting the reference area and the reference location to determine which of the previously-processed blocks are used for prediction In yet another example aspect, another method of video processing is disclosed. The method includes determining, for a conversion between a current video block of a video and a bitstream representation of the current video block, validity of a block vector corresponding to the current video block of a component c of the video using a component X of the video, wherein the component X is different from a luma component of the video; and performing the conversion using the block vector upon determining that the block vector is valid for the current video block, wherein the conversion is performed in an intra block copy (IBC) mode which is based on motion information related to a reconstructed block located in same video region with the current video block.

In yet another example aspect, a video encoder or decoder apparatus comprising a processor configured to implement an above described method is disclosed.

In another example aspect, a computer readable program medium is disclosed. The medium stores code that embodies processor executable instructions for implementing one of the disclosed methods.

These, and other, aspects are described in greater details in the present document.

BRIEF DESCRIPTION OF DRAWINGS

FIG. 2 shows an example of dynamic reference area.

FIG. 18 is a flowchart of an example method of visual data processing.

FIG. 21 is a flowchart of an example method of visual data processing.

FIG. 22 is a flowchart of an example method of visual data processing.

FIG. 23 is a flowchart of an example method of visual data processing.

FIG. 24 is a flowchart of an example method of visual data processing.

FIG. 25 is a flowchart of an example method of visual data processing.

FIG. 26 is a flowchart of an example method of visual data processing.

FIG. 27 is a flowchart of an example method of visual data processing.

FIG. 28 is a flowchart of an example method of visual data processing.

DETAILED DESCRIPTION

Figure 1:
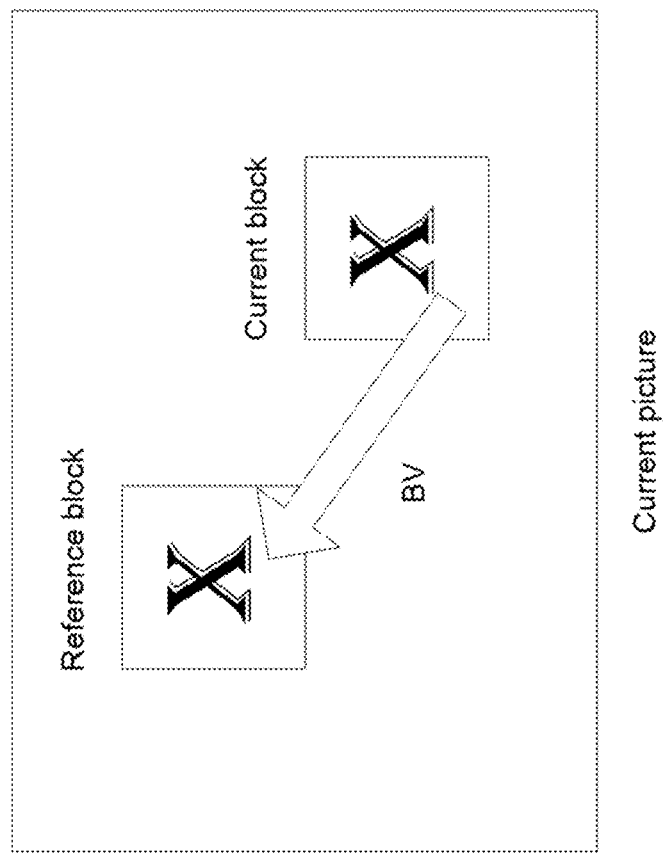
FIG. 1 shows an example of current picture referencing or intra block copy video or image coding technique.

Section headings are used in the present document for ease of understanding and do not limit scope of the disclosed embodiments in each section only to that section. The present document describes various embodiments and techniques for buffer management and block vector coding for intra block copy mode for decoding or encoding video or images.

1. SUMMARY

This patent document is related to video coding technologies. Specifically, it is related to intra block copy in video coding. It may be applied to the standard under development, e.g. Versatile Video Coding. It may be also applicable to future video coding standards or video codec.

2. BRIEF DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2 Current Picture Referencing

Current Picture Referencing (CPR), or once named as Intra Block Copy (IBC) has been adopted in HEVC Screen Content Coding extensions (HEVC-SCC) and the current VVC test model. IBC extends the concept of motion compensation from inter-frame coding to intra-frame coding. As demonstrated in FIG. 1, the current block is predicted by a reference block in the same picture when CPR is applied. The samples in the reference block must have been already reconstructed before the current block is coded or decoded. Although CPR is not so efficient for most camera-captured sequences, it shows significant coding gains for screen content. The reason is that there are lots of repeating patterns, such as icons and text characters in a screen content picture. CPR can remove the redundancy between these repeating patterns effectively. In HEVC-SCC, an inter-coded coding unit (CU) can apply CPR if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

FIG. 1 is an example illustration of Current Picture Referencing.

However, when a reference block is outside of the picture, or overlaps with the current block, or outside of the reconstructed area, or outside of the valid area restricted by some constraints, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3 CPR in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

offsetX = ( ChromaArrayType = = 0 ) ? 0 : ( mvCLX[ 0 ] & 0x7 ? 2 : 0 )     (8-104)

offsetY = ( ChromaArrayType = = 0 ) ? 0 : ( mvCLX[ 1 ] & 0x7 ? 2 : 0 )     (8-105)

It is a requirement of bitstream conformance that when the reference picture is the current picture, the luma motion vector mvLX shall obey the following constraints:
- When the derivation process for z-scan order block availability as specified in clause 6.4.1 is involved with ( xCurr, yCurr ) set equal to ( xCb, yCb ) and the neighbouring luma location ( xNbY, yNbY ) set equal to ( xPb + ( mvLX[ 0 ] >> 2 ) − offsetX, yPb + ( mvLX[ 1 ] >> 2 ) − offsetY ) as inputs, the output shall be equal to TRUE.
- When the derivation process for z-scan order block availability as specified in clause 6.4.1 is involved with ( xCurr, yCurr ) set equal to ( xCb, yCb ) and the neighbouring luma location ( xNbY, yNbY ) set equal to ( xPb + ( mvLX[ 0 ] >> 2 ) + nPbW − 1 + offsetX, yPb + ( mvLX[ 1 ] >> 2 ) + nPbH − 1 + offsetY ) as inputs, the output shall be equal to TRUE.
- One or both of the following conditions shall be true:
  - The value of ( mvLX[ 0 ] >> 2 ) + nPbW + xB1 + offsetX is less than or equal to 0.
  - The value of ( mvLX[ 1 ] >> 2 ) + nPbH + yB1 + offsetY is less than or equal to 0.
- The following condition shall be true:

( xPb + ( mvLX[ 0 ] >> 2 ) + nPbSw − 1 + offsetX ) / CtbSizeY − xCb / CtbSizeY <=     (8-106)
yCb/CtbSizeY − ( yPb + ( mvLX[ 1 ] >> 2 ) + nPbSh − 1 + offsetY ) / CtbSizeY Thus, the case that the reference block overlaps with the current block or the reference block is outside of the picture will not happen. There is no need to pad the reference or prediction block.

2.4 Examples of CPR/IBC

In a VVC test model, the whole reference block should be with the current coding tree unit (CTU) and does not overlap with the current block. Thus, there is no need to pad the reference or prediction block.

When dual tree is enabled, the partition structure may be different from luma to chroma CTUs. Therefore, for the 4:2:0 colour format, one chroma block (e.g., CU) may correspond to one collocated luma region which have been split to multiple luma CUs.

The chroma block could only be coded with the CPR mode when the following conditions shall be true:
1) each of the luma CU within the collocated luma block shall be coded with CPR mode
2) each of the luma 4×4 block' BV is firstly converted to a chroma block's BV and the chroma block's BV is a valid BV.

If any of the two condition is false, the chroma block shall not be coded with CPR mode.

It is noted that the definition of 'valid BV' has the following constraints:
1) all samples within the reference block identified by a BV shall be within the restricted search range (e.g., shall be within the same CTU in current VVC design).
2) all samples within the reference block identified by a BV have been reconstructed.

2.5 Examples of CPR/IBC

In some examples, the reference area for CPR/IBC is restricted to the current CTU, which is up to 128×128. The reference area is dynamically changed to reuse memory to store reference samples for CPR/IBC so that a CPR/IBC block can have more reference candidate while the reference buffer for CPR/IBC can be kept or reduced from one CTU.

FIG. 2 shows a method, where a block is of 64×64 and a CTU contains 4 64×64 blocks. When coding a 64×64 block, the previous 3 64×64 blocks can be used as reference. By doing so, a decoder just needs to store 4 64×64 blocks to support CPR/IBC.

Suppose that the current luma CU's position relative to the upper-left corner of the picture is (x, y) and block vector is (BVx, BVy). In the current design, if the BV is valid can be told by that the luma position ((x+BVx)>>6<<6+(1<<7), (y+BVy)>>6<<6) has not been reconstructed and ((x+BVx)>>6<<6+(1<<7), (y+BVy)>>6<<6) is not equal to (x>>6<<6, y>>6<<6).

2.6 In-Loop Reshaping (ILR)

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT [$Y_r$]. ($\hat{Y}_i$ represents the reconstruction values of $Y_i$).

2.6.1 PWL Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2^{FP\_PREC-1})>>FP\_PREC)+c$$

where m is scalar, c is an offset, and FP_PREC is a constant value to specify the precision.

In some examples, the PWL model is used to precompute the 1024-entry FwdLUT and InvLUT mapping tables; but the PWL model also allows implementations to calculate identical mapping values on-the-fly without pre-computing the LUTs.

2.6.2.1 Luma Reshaping

A method of the in-loop luma reshaping provides a lower complexity pipeline that also eliminates decoding latency for block-wise intra prediction in inter slice reconstruction. Intra prediction is performed in reshaped domain for both inter and intra slices.

Figure 10:
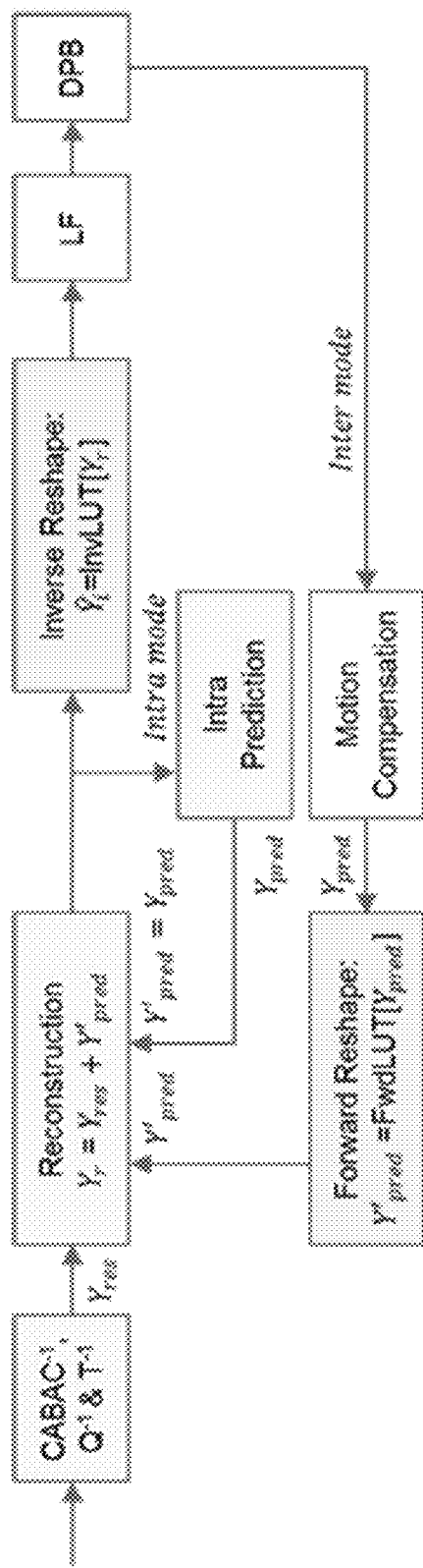
FIG. 10 shows an example flowchart for a decoding process with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 10 shows the block diagram of the CE12-2 decoding process based on mode.

16-piece piece-wise linear (PWL) models are tested for luma and chroma residue scaling instead of the 32-piece PWL models.

Inter slice reconstruction with in-loop luma reshaper (light-green shaded blocks indicate signal in reshaped domain: luma residue; intra luma predicted; and intra luma reconstructed)

2.6.2.2 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.
For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values 2.6.2.3 Signalling of ILR Side Information The parameters are (currently) sent in the tile group header (similar to ALF). These reportedly take 40-100 bits.

In some examples, the added syntax is highlighted in italics.

In 7.3.2.1 Sequence parameter set RBSP syntax

| seq_parameter_set_rbsp( ) { | Descriptor |
|---|---|
| sps_seq_parameter_set_id | ue(v) |
| ... | |
| sps_triangle_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| *sps_reshaper_enabled_flag* | *u(1)* |
| rbsp_trailing_bits( ) | |
| } | |

In 7.3.3.1 General Tile Group Header Syntax

| tile_group_header( ) { | Descriptor |
|---|---|
| ... | |
| if( num_tiles_in_tile_group_minus1 > 0 ) { | |
|   offset_len_minus1 | ue(v) |
|   for( i = 0; i < num_tiles_in_tile_group_minus1; i++ ) | |
|     entry_point_offset_minus1[ i ] | u(v) |
| } | |
| *if ( sps_reshaper_enabled_flag ) {* | |
|   *tile_group_reshaper_model_present_flag* | *u(1)* |
|   *if( tile_group_reshaper_model_present_flag )* | |
|     *tile_group_reshaper_model ( )* | |
|   *tile_group_reshaper_enable_flag* | *u(1)* |
|   *if ( tile_group_reshaper_enable_flag && (!(* | |
| *qtbtt_dual_tree_intra_flag && tile_group_type == I ) ) )* | |
|     *tile_group_reshaper_chroma_residual_scale_flag* | *u(1)* |
| *}* | |
| byte_alignment( ) | |
| } | |

Add a New Syntax Table Tile Group Reshaper Model:

| tile_group_reshaper_model ( ) { | Descriptor |
|---|---|
| reshaper_model_min_bin_idx | ue(v) |
| reshaper_model_delta_max_bin_idx | ue(v) |
| reshaper_model_bin_delta_abs_cw_prec_minus1 | ue(v) |
| for ( i = reshaper_model_min_bin_idx; i <= reshaper_model_max_bin_idx; i++ ) { | |
|   reshape_model_bin_delta_abs_CW [ i ] | u(v) |
|   if( reshaper_model_bin_delta_abs_CW[ i ] ) > 0) | |
|     reshaper_model_bin_delta_sign_CW_flag [ i ] | u(1) |
|   } | |
| } | |

In General Sequence Parameter Set RBSP Semantics, Add the Following Semantics:

sps_reshaper_enabled_flag equal to 1 specifies that reshaper is used in the coded video sequence (CVS). sps_reshaper_enabled_flag equal to 0 specifies that reshaper is not used in the CVS.

In Tile Group Header Syntax, Add the Following Semantics tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.

tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.

tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

Add Tile_Group_Reshaper_Model( ) Syntax reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx−reshape_model_delta_max_bin_idx.

reshaper_model_bin_delta_abs_cw_prec_minus1 plus 1 specifies the number of bits used for the representation of the syntax reshape_model_bin_delta_abs_CW[i].
reshaper_model_bin_delta_abs_CW[i] specifies the absolute delta codeword value for the ith bin.
reshaper_model_bin_delta_sign_CW_flag[i] specifies the sign of reshape_model_bin_delta_abs_CW[i] as follows:
 If reshape_model_bin_delta_sign_CW_flag[i] is equal to 0, the corresponding variable RspDeltaCW[i] is a positive value.
 Otherwise (reshape_model_bin_delta_sign_CW_flag[i] is not equal to 0), the corresponding variable RspDeltaCW[i] is a negative value.
When reshape_model_bin_delta_sign_CW_flag[i] is not present, it is inferred to be equal to 0. The variable RspDeltaCW[i]=(12*reshape_model_bin_delta_sign_CW [i])*reshape_model_bin_delta_abs_CW [i];
The variable RspCW[i] is derived as following steps:
The variable OrgCW is set equal to $(1<<BitDepth_Y)/(MaxBinIdx+1)$.
 If reshaper_model_min_bin_idx<=i<=reshaper_model_max_bin_idx RspCW[i]=OrgCW+RspDeltaCW[i].
 Otherwise, RspCW[i]=0.
The value of RspCW [i] shall be in the range of 32 to 2*OrgCW−1 if the value of $BitDepth_Y$ is equal to 10.
The variables InputPivot[i] with i in the range of 0 to MaxBinIdx+1, inclusive are derived as follows InputPivot[i]=i*OrgCW The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shiftY = 14
ReshapePivot[ 0 ] = 0;
for( i = 0; i <= MaxBinIdx ; i++) {
ReshapePivot[ i + 1 ] = ReshapePivot[ i ] + RspCW[ i ]
  ScaleCoef[ i ] = ( RspCW[ i ] * (1 << shiftY) + (1 << (Log2(OrgCW)
−
1))) >> (Log2(OrgCW))
  if ( RspCW[ i ] == 0 )
    InvScaleCoeff[ i ] = 0
  else
    InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follows:
 ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 10241;
 shiftC=11
 if (RspCW[i]==0)
  ChromaScaleCoef[i]=(1<<shiftC)
 Otherwise (RspCW[i]!=0), ChromaScaleCoef[i]= ChromaResidualScaleLut[RspCW[i]>>1]
2.6.2.4 Usage of ILR
At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
 Current block is intra-coded
 Current block is coded as CPR (current picture referencing, aka intra block copy, IBC)
 Current block is coded as combined inter-intra mode (CIIP) and the forward reshaping is disabled for the intra prediction block

3. EXAMPLES OF PROBLEMS SOLVED BY VARIOUS EMBODIMENTS

In the current design of CPR/IBC, some problems exist.
1) The reference area changes dynamically, which makes encoder/decoder processing complicated.
2) Invalid block vectors are easily generated and difficult to check, which complicates both encoder and decoder.
3) Irregular reference area leads to inefficient coding of block vector.
4) How to handle CTU size smaller than 128×128 is not clear.
5) In the determination process of whether a BV is valid or invalid, for chroma blocks, the decision is based on the luma sample's availability which may result in wrong decisions due to the dual tree partition structure.

4. EXAMPLE EMBODIMENTS

In some embodiments, a regular buffer can be used for CPR/IBC block to get reference.

A function isRec(x,y) is defined to indicate if pixel (x,y) has been reconstructed and be referenced by IBC mode. When (x,y) is out of picture, of different slice/tile/brick, isRec(x,y) return false; when (x,y) has not been reconstructed, isRec(x,y) returns false. In another example, when sample (x,y) has been reconstructed but some other conditions are satisfied, it may also be marked as unavailable, such as out of the reference area/in a different VPDU, and isRec(x,y) returns false.

A function isRec(c, x,y) is defined to indicate if sample (x,y) for component c is available. For example, if the sample (x, y) hasn't been reconstructed yet, it is marked as unavailable. In another example, when sample (x,y) has been reconstructed but some other conditions are satisfied, it may also be marked as unavailable, such as it is out of picture/in a different slice/tile/brick/in a different VPDU, out of allowed reference area. isRec(c, x,y) returns false when sample (x, y) is unavailable, otherwise, it returns true.

In the following discussion, the reference samples can be reconstructed samples. It is noted that 'pixel buffer' may response to 'buffer of one color component' or 'buffer of multiple color components'.
Reference Buffer for CPR/IBC
 1. It is proposed to use a M×N pixel buffer to store the luma reference samples for CPR/IBC.
  a. In one example, the buffer size is 64×64.
  b. In one example, the buffer size is 128×128.
  c. In one example, the buffer size is 64×128.
  d. In one example, the buffer size is 128×64.

e. In one example, N equals to the height of a CTU.
f. In one example, N=nH, where H is the height of a CTU, n is a positive integer.
g. In one example, M equals to the width of a CTU.
h. In one example, M=mW, where W is the width of a CTU, m is a positive integer.
i. In one example, the buffer size is unequal to the CTU size, such as 96×128 or 128×96.
j. In one example, the buffer size is equal to the CTU size
k. In one example, M=mW and N=H, where W and H are width and height of a CTU, m is a positive integer.
l. In one example, M=W and N=nH, where W and H are width and height of a CTU, n is a positive integer.
m. In one example, M=mW and N=nH, where W and H are width and height of a CTU, m and n are positive integers.
n. In above example, m and n may depend on CTU size.
   i. In one example, when CTU size is 128×128, m=1 and n=1.
   ii. In one example, when CTU size is 64×64, m=4 and n=1.
   iii. In one example, when CTU size is 32×32, m=16 and n=1.
   iv. In one example, when CTU size is 16×16, m=64 and n=1.
o. Alternatively, the buffer size corresponds to CTU size.
p. Alternatively, the buffer size corresponds to a Virtual Pipeline Data Unit (VPDU) size.
q. M and/or N may be signaled from the encoder to the decoder, such as in VPS/SPS/PPS/picture header/slice header/tile group header.

2. M and/or N may be different in different profiles/levels/tiers defined in a standard. It is proposed to use another Mc×Nc pixel buffer to store the chroma reference samples for CPR/IBC.
   a. In one example, Mc=M/2 and Nc=N/2 for 4:2:0 video
   b. In one example, Mc=M and Nc=N for 4:4:4 video
   c. In one example, Mc=M and Nc=N/2 for 4:2:2 video
   d. Alternatively, Mc and Nc can be independent of M and N.
   e. In one example, the chroma buffer includes two channels, corresponding to Cb and Cr.
   f. In one example, Mc=M and Nc=N.

3. It is proposed to use a M×N sample buffer to store the RGB reference samples for CPR/IBC
   a. In one example, the buffer size is 64×64.
   b. In one example, the buffer size is 128×128.
   c. In one example, the buffer size is 64×128.
   d. In one example, the buffer size is 128×64.
   e. Alternatively, the buffer size corresponds to CTU size.
   f. Alternatively, the buffer size corresponds to a Virtual Pipeline Data Unit (VPDU) size.

4. It is proposed that the buffer can store reconstructed pixels before loop-filtering. Loop-filtering may refer to deblocking filter, adaptive loop filter (ALF), sample adaptive offset (SAO), a cross-component ALF, or any other filters.
   a. In one example, the buffer can store samples in the current CTU.
   b. In one example, the buffer can store samples outside of the current CTU.
   c. In one example, the buffer can store samples from any part of the current picture.
   d. In one example, the buffer can store samples from other pictures.

5. It is proposed that the buffer can store reconstructed pixels after loop-filtering. Loop-filtering may refer to deblocking filter, adaptive loop filter (ALF), sample adaptive offset (SAO), a cross-component ALF, or any other filters.
   a. In one example, the buffer can store samples in the current CTU.
   b. In one example, the buffer can store samples outside of the current CTU.
   c. In one example, the buffer can store samples from any part of the current picture.
   d. In one example, the buffer can store samples from other pictures.

6. It is proposed that the buffer can store both reconstructed samples before loop-filtering and after loop-filtering. Loop-filtering may refer to deblocking filter, adaptive loop filter (ALF), sample adaptive offset (SAO), a cross-component ALF, or any other filters.
   a. In one example, the buffer can store both samples from the current picture and samples from other pictures, depending on the availability of those samples.
   b. In one example, reference samples from other pictures are from reconstructed samples after loop-filtering.
   c. In one example, reference samples from other pictures are from reconstructed samples before loop-filtering.

7. It is proposed that the buffer stores samples with a given bit-depth which may be different from the bit-depth for coded video data.
   a. In one example, the bit-depth for the reconstruction buffer/coded video data is larger than that for IBC reference samples stored in the buffer.
   b. In one example, even when the internal bit-depth is different from the input bit-depth for a video sequence, such as (10 bits vs 8 bits), the IBC reference samples are stored to be aligned with the input bit-depth.
   c. In one example, the bit-depth is identical to that of the reconstruction buffer.
   d. In one example, the bit-depth is identical to that of input image/video.
   e. In one example, the bit-depth is identical to a predefine number.
   f. In one example, the bit-depth depends on profile of a standard.
   g. In one example, the bit-depth or the bit-depth difference compared to the output bit-depth/input bit-depth/internal bit-depth may be signalled in SPS/PPS/sequence header/picture header/slice header/Tile group header/Tile header or other kinds of video data units.
   h. The proposed methods may be applied with the proposed buffer definitions mentioned in other bullets, alternatively, they may be also applicable to existing design of IBC.
   i. The bit-depth of each color component of the buffer may be different.

Buffer Initiation

8. It is proposed to initialize the buffer with a given value
   a. In one example, the buffer is initialized with a given value.

i. In one example, the given value may depend on the input bit-depth and/or internal bit-depth.
ii. In one example, the buffer is initialized with mid-grey value, e.g. 128 for 8-bit signal or 512 for 10-bit signal.
iii. In one example, the buffer is initialized with forwardLUT(m) when ILR is used. E.g. m=1<<(Bitdepth−1).
b. Alternatively, the buffer is initialized with a value signalled in SPS/VPS/APS/PPS/sequence header/Tile group header/Picture header/tile/CTU/Coding unit/VPDU/region.
c. In one example, the given value may be derived from samples of previously decoded pictures or slices or CTU rows or CTUs or CUs.
d. The given value may be different for different color component.
9. Alternatively, it is proposed to initialize the buffer with decoded pixels from previously coded blocks.
a. In one example, the decoded pixels are those before in-loop filtering.
b. In one example, when the buffer size is a CTU, the buffer is initialized with decoded pixels of the previous decoded CTU, if available.
c. In one example, when the buffer size is of 64×64, its buffer size is initialized with decoded pixels of the previous decoded 64×64 block, if available.
d. Alternatively, furthermore, if no previously coded blocks are available, the methods in bullet 8 may be applied.

Reference to the Buffer

10. For a block to use pixels in the buffer as reference, it can use a position (x,y), x=0, 1, 2, . . . , M−1; y=0, 1, 2, . . . , N−1, within the buffer to indicate where to get reference.
11. Alternatively, the reference position can be denoted as l=y*M+x, l=0, 1, . . . , M*N−1.
12. Denote that the upper-left position of a block related to the current CTU as (x0,y0), a block vector (BVx, BVy)=(x−x0,y−y0) may be sent to the decoder to indicate where to get reference in the buffer.
13. Alternatively, a block vector (BVx,BVy) can be defined as (x−x0+Tx,y−y0+Ty) where Tx and Ty are predefined offsets.
14. For any pixel (x0, y0) and (BVx, BVy), its reference in the buffer can be found at (x0+BVx, y0+BVy)
a. In one example, when (x0+BVx, y0+BVy) is outside of the buffer, it will be clipped to the boundary.
b. Alternatively, when (x0+BVx, y0+BVy) is outside of the buffer, its reference value is predefined as a given value, e.g. mid-grey.
c. Alternatively, the reference position is defined as ((x0+BVx) mod M, (y0+BVy) mod N) so that it is always within the buffer.
15. For any pixel (x0, y0) and (BVx, BVy), when (x0+BVx, y0+BVy) is outside of the buffer, its reference value may be derived from the values in the buffer.
a. In one example, the value is derived from the sample ((x0+BVx) mod M, (y0+BVy) mod N) in the buffer.
b. In one example, the value is derived from the sample ((x0+BVx) mod M, clip(y0+BVy, 0, N−1)) in the buffer.
c. In one example, the value is derived from the sample (clip(x0+BVx, 0, M−1), (y0+BVy) mod N) in the buffer.
d. In one example, the value is derived from the sample (clip(x0+BVx, 0, M−1), clip(y0+BVy, 0, N−1)) in the buffer.
16. It may disallow a certain coordinate outside of the buffer range
a. In one example, for any pixel (x0, y0) relative to the upperleft corner of a CTU and block vector (BVx, BVy), it is a bitstream constraint that y0+BVy should be in the range of [0, . . . , N−1].
b. In one example, for any pixel (x0, y0) relative to the upperleft corner of a CTU and block vector (BVx, BVy), it is a bitstream constraint that x0+BVx should be in the range of [0, . . . , M−1].
c. In one example, for any pixel (x0, y0) relative to the upperleft corner of a CTU and block vector (BVx, BVy), it is a bitstream constraint that both y0+BVy should be in the range of [0, . . . , N−1] and x0+BVx should be in the range of [0, . . . , M−1].
17. When the signalled or derived block vector of one block points to somewhere outside the buffer, padding may be applied according to the buffer.
a. In one example, the value of any sample outside of the buffer is defined with a predefined value.
i. In one example, the value can be 1<<(Bitdepth−1), e.g. 128 for 8-bit signals and 512 for 10-bit signals.
ii. In one example, the value can be forwardLUT(m) when ILR is used. E.g. m=1<<(Bitdepth−1).
iii. Alternatively, indication of the predefined value may be signalled or indicated at SPS/PPS/sequence header/picture header/slice header/Tile group/Tile/CTU/CU level.
b. In one example, any sample outside of the buffer is defined as the value of the nearest sample in the buffer.
18. The methods to handle out of the buffer reference may be different horizontally and vertically or may be different according to the location of the current block (e.g., closer to picture boundary or not).
a. In one example, when y0+BVy is outside of [0, N−1], the sample value of (x0+BVx, y0+BVy) is assigned as a predefined value.
b. In one example, when x0+BVx is outside of [0, M−1], the sample value of (x0+BVx, y0+BVy) is assigned as a predefined value.
c. Alternatively, the sample value of (x0+BVx, y0+BVy) is assigned as the sample value of ((x0+BVx)mod M, y0+BVy), which may invoke other method to further derive the value if ((x0+BVx)mod M, y0+BVy) is still outside of the buffer.
d. Alternatively, the sample value of (x0+BVx, y0+BVy) is assigned as the sample value of (x0+BVx, (y0+BVy) mod N), which may invoke other method to further derive the value if (x0+BVx, (y0+BVy) mod N) is still outside of the buffer.

Block Vector Representation

19. Each component of a block vector (BVx, BVy) or one of the component may be normalized to a certain range.
a. In one example, BVx can be replaced by (BVx mod M).
b. Alternatively, BVx can be replaced by ((BVx+X) mod M)−X, where X is a predefined value.
i. In one example, X is 64.
ii. In one example, X is M/2;
iii. In one example, X is the horizontal coordinate of a block relative to the current CTU.

c. In one example, BVy can be replaced by (BVy mod N).
d. Alternatively, BVy can be replaced by ((BVy+Y) mod N)−Y, where Y is a predefined value.
   i. In one example, Y is 64.
   ii. In one example, Y is N/2;
   iii. In one example, Y is the vertical coordinate of a block relative to the current CTU.
20. BVx and BVy may have different normalized ranges.
21. A block vector difference (BVDx, BVDy) can be normalized to a certain range.
   a. In one example, BVDx can be replaced by (BVDx mod M) wherein the function mod returns the reminder.
   b. Alternatively, BVDx can be replaced by ((BVDx+X) mod M)−X, where X is a predefined value.
      i. In one example, X is 64.
      ii. In one example, X is M/2;
   c. In one example, BVy can be replaced by (BVDy mod N).
   d. Alternatively, BVy can be replaced by ((BVDy+Y) mod N)−Y, where Y is a predefined value.
      i. In one example, Y is 64.
      ii. In one example, Y is N/2;
22. BVDx and BVDy may have different normalized ranges.

Validity Check for a Block Vector

Denote the width and height of an IBC buffer as $W_{buf}$ and $H_{buf}$. For a W×H block (may be a luma block, chroma block, CU, TU, 4×4, 2×2, or other subblocks) starting from (X, Y) relative to the upper-left corner of a picture, the following may apply to tell if a block vector (BVx, BVy) is valid or not. Let $W_{pic}$ and $H_{pic}$ be the width and height of a picture and; $W_{ctu}$, and $H_{ctu}$ be the width and height of a CTU. Function floor(x) returns the largest integer no larger than x. Function isRec(x, y) returns if sample (x, y) has been reconstructed.

23. Block vector (BVx, BVy) may be set as valid even if any reference position is outside of picture boundary.
   a. In one example, the block vector may be set as valid even if X+BVx<0.
   b. In one example, the block vector may be set as valid even if $X+W+BVx>W_{pic}$.
   c. In one example, the block vector may be set as valid even if Y+BVy<0.
   d. In one example, the block vector may be set as valid even if $Y+H+BVy>H_{pic}$.
24. Block vector (BVx, BVy) may be set as valid even if any reference position is outside of the current CTU row.
   a. In one example, the block vector may be set as valid even if $Y+BVy<floor(Y/H_{ctu})*H_{ctu}$.
   b. In one example, the block vector may be set as valid even if $Y+H+BVy>=floor(Y/H_{ctu})*H_{ctu}+H_{ctu}$.
25. Block vector (BVx, BVy) may be set as valid even if any reference position is outside of the current and left (n−1) CTUs, where n is the number of CTUs (including or excluding the current CTU) that can be used as reference area for IBC.
   a. In one example, the block vector may be set as valid even if $X+BVx<floor(X/W_{ctu})*W_{ctu}-(n-1)*W_{ctu}$.
   b. In one example, the block vector may be set as valid even if $X+W+BVx>floor(X/W_{ctu})*W_{ctu}+W_{ctu}$
26. Block vector (BVx, BVy) may be set as valid even if a certain sample has not been reconstructed.
   a. In one example, the block vector may be set as valid even if isRec(X+BVx, Y+BVy) is false.
   b. In one example, the block vector may be set as valid even if isRec(X+BVx+W−1, Y+BVy) is false.
   c. In one example, the block vector may be set as valid even if isRec(X+BVx, Y+BVy+H−1) is false.
   d. In one example, the block vector may be set as valid even if isRec(X+BVx+W−1, Y+BVy+H−1) is false.
27. Block vector (BVx, BVy) may be always set as valid when a block is not of the $1^{st}$ CTU in a CTU row.
   a. Alternatively, the block vector may be always set as valid.
28. Block vector (BVx, BVy) may be always set as valid when the following 3 conditions are all satisfied
   X+BVx>=0
   $Y+BVy>=floor(Y/H_{ctu})$
   isRec(X+BVx+W−1, Y+BVy+H−1)==true
      a. Alternatively, when the three conditions are all satisfied for a block of the Pt CTU in a CTU row, the block vector may be always set as valid.
29. When a block vector (BVx, BVy) is valid, sample copying for the block may be based on the block vector.
   a. In one example, prediction of sample (X, Y) may be from $((X+BVx) \% W_{buf}, (Y+BVy) \% H_{buf})$ Buffer Update 30. When coding a new picture or tile, the buffer may be reset.
   a. The term "reset" may refer that the buffer is initialized.
   b. The term "reset" may refer that all samples/pixels in the buffer is set to a given value (e.g., 0 or −1).
31. When finishing coding of a VPDU, the buffer may be updated with the reconstructed values of the VPDU.
32. When finishing coding of a CTU, the buffer may be updated with the reconstructed values of the CTU.
   a. In one example, when the buffer is not full, the buffer may be updated CTU by CTU sequentially.
   b. In one example, when the buffer is full, the buffer area corresponding to the oldest CTU will be updated.
   c. In one example, when M=mW and N=H (W and H are CTU size; M and N are the buffer size) and the previous updated area started from (kW, 0), the next starting position to update will be ((k+1)W mod M, 0).
33. The buffer can be reset at the beginning of each CTU row.
   a. Alternatively, the buffer may be reset at the beginning of decoding each CTU.
   b. Alternatively, the buffer may be reset at the beginning of decoding one tile.
   c. Alternatively, the buffer may be reset at the beginning of decoding one tile group/picture.
34. When finishing coding a block starting from (x,y), the buffer's corresponding area, starting from (x,y) will be updated with reconstruction from the block.
   a. In one example, (x,y) is a position relative to the upper-left corner of a CTU.
35. When finishing coding a block relative to the picture, the buffer's corresponding area will be updated with reconstruction from the block.
   a. In one example, the value at position (x mod M, y mod N) in the buffer may be updated with the reconstructed pixel value of position (x, y) relative to the upper-left corner of the picture.
   b. In one example, the value at position (x mod M, y mod N) in the buffer may be updated with the reconstructed pixel value of position (x, y) relative to the upper-left corner of the current tile.

c. In one example, the value at position (x mod M, y mod N) in the buffer may be updated with the reconstructed pixel value of position (x, y) relative to the upper-left corner of the current CTU row.
d. In one example, the value in the buffer may be updated with the reconstructed pixel values after bit-depth alignment.
36. When finishing coding a block starting from (x,y), the buffer's corresponding area, starting from (xb,yb) will be updated with reconstruction from the block wherein (xb, yb) and (x, y) are two different coordinates
   a. In one example, (x,y) is a position related to the upper-left corner of a CTU, and (xb, yb) is (x+update_x, y+update_y), wherein update_x and update_y point to a updatable position in the buffer.
37. For above examples, the reconstructed values of a block may indicate the reconstructed values before filters (e.g., deblocking filter) applied.
   a. Alternatively, the reconstructed values of a block may indicate the reconstructed values after filters (e.g., deblocking filter) applied.
38. When the buffer is updated from reconstructed samples, the reconstructed samples may be firstly modified before being stored, such as sample bit-depth can be changed.
   a. In one example, the buffer is updated with reconstructed sample value after bit-depth alignment to the bitdepth of the buffer.
   b. In one example, the buffer value is updated according to the value $\{p+[1<<(b-1)]\}>>b$, where p is reconstructed sample value, b is a predefined bit-shifting value.
   c. In one example, the buffer value is updated according to the value clip $(\{p+[1<<(b-1)]\}>>b, 0, (1<<bitdepth)-1)$, where p is reconstructed sample value, b is a predefined bit-shifting value, bitdepth is the buffer bit-depth.
   d. In one example, the buffer value is updated according to the value $\{p+[1<<(b-1)-1]\}>>b$, where p is reconstructed sample value, b is a predefined bit-shifting value.
   e. In one example, the buffer value is updated according to the value clip $(\{p+[1<<(b-1)-1]\}>>b, 0, (1<<bitdepth)-1)$, where p is reconstructed sample value, b is a predefined bit-shifting value, bitdepth is the buffer bit-depth.
   f. In one example, the buffer value is updated according to the value $p>>b$.
   g. In one example, the buffer value is updated according to the value $clip(p>>b, 0, (1<<bitdepth)-1)$, where bitdepth is the buffer bit-depth.
   h. In the above examples, b can be reconstructed bit-depth minus input sample bit-depth.
39. When use the buffer samples to form prediction, a preprocessing can be applied.
   a. In one example, the prediction value is $p<<b$, where p is a sample value in the buffer, and b is a predefined value.
   b. In one example, the prediction value is clip $(p<<b, 0, 1<<bitdepth)$, where bitdepth is the bit-depth for reconstruction samples.
   c. In one example, the prediction value is $(p<<b)+(1<<(bitdepth-1))$, where p is a sample value in the buffer, and b is the bit-depth for reconstruction samples.
   d. In the above examples, b can be reconstructed bit-depth minus input sample bit-depth.
40. The buffer can be updated in a given order.
   a. In one example, the buffer can be updated sequentially.
   b. In one example, the buffer can be updated according to the order of blocks reconstructed.
41. When the buffer is full, the samples in the buffer can be replaced with latest reconstructed samples.
   a. In one example, the samples can be updated in a first-in-first-out manner.
   b. In one example, the oldest samples will be replaced.
   c. In one example, the samples can be assigned a priority and replaced according to the priority.
   d. In one example, the samples can be marked as "long-term" so that other samples will be replaced first.
   e. In one example, a flag can be sent along with a block to indicate a high priority.
   f. In one example, a number can be sent along with a block to indicate priority.
   g. In one example, samples from a reconstructed block with a certain characteristic will be assign a higher priority so that other samples will be replace first.
      i. In one example, when the percentage of samples coded in IBC mode is larger than a threshold, all samples of the block can be assigned a high priority.
      ii. In one example, when the percentage of samples coded in Palette mode is larger than a threshold, all samples of the block can be assigned a high priority.
      iii. In one example, when the percentage of samples coded in IBC or Palette mode is larger than a threshold, all samples of the block can be assigned a high priority.
      iv. In one example, when the percentage of samples coded in transform-skip mode is larger than a threshold, all samples of the block can be assigned a high priority.
      v. The threshold can be different according to block-size, color component, CTU size.
      vi. The threshold can be signalled in SPS/PPS/sequence header/slice header/Tile group/Tile level/a region.
   h. In one example, that buffer is full may mean that the number of available samples in the buffer is equal or larger than a given threshold.
      i. In one example, when the number of available samples in the buffer is equal or larger than 64×64×3 luma samples, the buffer may be determined as full.

Alternative Buffer Combination

Figure 4:
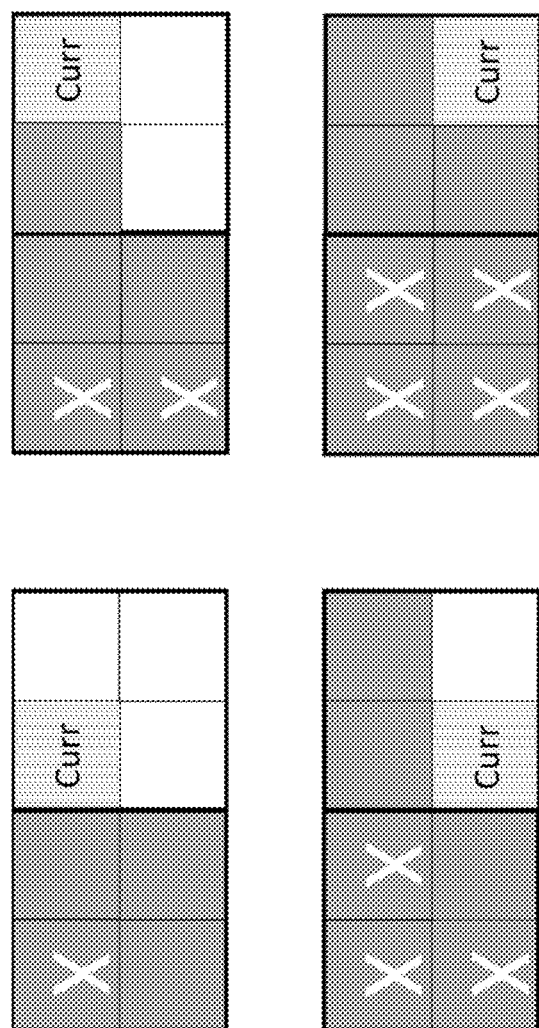
FIG. 4 shows examples of possible alternative way to choose the previous coded 64×64 blocks.

42. Instead of always using the previously coded three 64×64 blocks as a reference region, it is proposed to adaptively change it based on current block (or VPDU)'s location.
   a. In one example, when coding/decoding a 64×64 block, previous 364×64 blocks can be used as reference. Compared to FIG. 2, more kinds of combination of previous 64×64 blocks can be applied. FIG. 2 shows an example of a different combination of previous 64×64 blocks.
43. Instead of using the z-scan order, vertical scan order may be utilized instead.
   a. In one example, when one block is split into 4 VPDUs with index 0 . . . 3 in z-scan order, the encoding/decoding order is 0, 2, 1, 3.

b. In one example, when coding/decoding a 64×64 blocks, previous 364×64 blocks can be used as reference. Compared to FIG. 2, more kind of coding/decoding orders of 64×64 blocks can be applied. FIG. 4 shows an example of a different coding/decoding order of 64×64 blocks.
c. Alternatively, above methods may be applied only for screen content coding
d. Alternatively, above methods may be applied only when CPR is enabled for one tile/tile group/picture.
e. Alternatively, above methods may be applied only when CPR is enabled for one CTU or one CTU row.

Virtual IBC Buffer

The following, the width and height of a VPDU is denoted as $W_{VPDU}$ (e.g., 64) and $H_{VPDU}$ (e.g., 64), respectively in luma samples. Alternatively, $W_{VPDU}$ and/or $H_{VPDU}$ may denote the width and/or height of other video unit (e.g., CTU).

44. A virtual buffer may be maintained to keep track of the IBC reference region status.
   a. In one example, the virtual buffer size is m $W_{VPDU}$×n $H_{VPDU}$.
      i. In one example, m is equal to 3 and n is equal to 2.
      ii. In one example, m and/or n may depend on the picture resolution, CTU sizes.
      iii. In one example, m and/or n may be signaled or pre-defined.
   b. In one example, the methods described in above bullets and sub-bullets may be applied to the virtual buffer.
   c. In one example, a sample (x, y) relative to the upper-left corner of the picture/slice/tile/brick may be mapped to (x % (m$W_{VPDU}$), y % (n$H_{VPDU}$))
45. An array may be used to track the availability of each sample associated with the virtual buffer.
   a. In one example, a flag may be associated with a sample in the virtual buffer to specify if the sample in the buffer can be used as IBC reference or not.
   b. In one example, each 4×4 block containing luma and chroma samples may share a flag to indicate if any samples associated with that block can be used as IBC reference or not.
   c. In one example, an array corresponding to 3×2 VPDUs (e.g., each 4×4 block may share the same availability flag) maintained to track availability of IBC reference samples.
   d. In one example, an array corresponding to 4×2 VPDUs (e.g., each 4×4 block may share the same availability flag) maintained to track availability of IBC reference samples.
46. After finishing decoding a VPDU or a video unit, certain samples associated with the virtual buffer may be marked as unavailable for IBC reference.
   a. In one example, which samples may be marked as unavailable depend on the position of the most recently decoded VPDU.
   b. When one sample is marked unavailable, prediction from the sample is disallowed.
      i. Alternatively, other ways (e.g., using default values) may be further applied to derive a predictor to replace the unavailable sample.
47. The position of most recently decoded VPDU may be recorded to help to identify which samples associated with the virtual buffer may be marked as unavailable.
   a. In one example, at the beginning of decoding a VPDU, certain samples associated with the virtual buffer may be marked as unavailable according to the position of most recently decoded VPDU.
      i. In one example, denote (xPrevVPDU, yPrevVPDU) as the upper-left position relative to the upper-left corner of the picture/slice/tile/brick/other video processing unit of most recently decoded VPDU, if yPrevVPDU % (n $H_{VPDU}$) is equal to 0, certain positions (x, y) may be marked as unavailable.
         1. In one example, x may be within a range, such as [xPrevVPDU−2$W_{VPDU}$+2m$W_{VPDU}$) % m$W_{VPDU}$, ((xPrevVPDU−2 $W_{VPDU}$+2m$W_{VPDU}$) % m$W_{VPDU}$)−1+$W_{VPDU}$];
         2. In one example, y may be within a range, such as [yPrevVPDU % (n $H_{VPDU}$), (yPrevVPDU % (n$H_{VPDU}$))−1+$H_{VPDU}$];
         3. In one example, x may be within a range, such as [xPrevVPDU−2$W_{VPDU}$+2m$W_{VPDU}$) % m$W_{VPDU}$, ((xPrevVPDU−2$W_{VPDU}$+2m$W_{VPDU}$) % m$W_{VPDU}$)−1+$W_{VPDU}$] and y may be within a range, such as [yPrevVPDU % (n $H_{VPDU}$), (yPrevVPDU % (n $H_{VPDU}$))−1+$H_{VPDU}$].
      ii. In one example, denote (xPrevVPDU, yPrevVPDU) as the upper-left position relative to the upper-left corner of the picture/slice/tile/brick/other video processing unit of most recently decoded VPDU, if yPrevVPDU % (n $H_{VPDU}$) is not equal to 0, certain positions (x, y) may be marked as unavailable.
         1. In one example, x may be within a range, such as [xPrevVPDU−$W_{VPDU}$+2m$W_{VPDU}$) % m$W_{VPDU}$, ((xPrevVPDU−$W_{VPDU}$+2m$W_{VPDU}$) % m$W_{VPDU}$)−1+$W_{VPDU}$];
         2. In one example, y may be within a range, such as [yPrevVPDU % (n $H_{VPDU}$), (yPrevVPDU % (n $H_{VPDU}$))−1+$H_{VPDU}$]
         3. In one example, x may be within a range, such as [xPrevVPDU−$W_{VPDU}$ 2m$W_{VPDU}$) % m$W_{VPDU}$, ((xPrevVPDU−$W_{VPDU}$+2m$W_{VPDU}$) % m$W_{VPDU}$)−1+$W_{VPDU}$] and y may be within a range, such as [yPrevVPDU % (n $H_{VPDU}$), (yPrevVPDU % (n $H_{VPDU}$))−1+$H_{VPDU}$].
48. When a CU contains multiple VPDUs, instead of applying IBC reference availability marking process according to VPDU, the IBC reference availability marking process may be according to the CU
   a. In one example, at the beginning of decoding a CU containing multiple VPDUs, the IBC reference availability marking process may be applied for each VPDU before the VPDU within the CU is decoded.
   b. In such a case, 128×64 and 64×128 IBC blocks may be disallowed.
      i. In one example, pred_mode_ibc_flag for 128×64 and 64×128 CUs may not be sent and may be inferred to equal to 0.
49. For a reference block or sub-block, the reference availability status of the upper-right corner may not need to be checked to tell if the block vector associated with the reference block is valid or not.
   a. In one example, only the upper-left, bottom-left and bottom-right corner of a block/sub-block will be checked to tell if the block vector is valid or not.
50. The IBC buffer size may depend on VPDU size (wherein the width/height is denoted by vSize) and/or CTB/CTU size (wherein the width/height is denoted by ctbSize)

a. In one example, the height of the buffer may be equal to ctbSize.
b. In one example, the width of the buffer may depend on min(ctbSize, 64)
    i. In one example, the width of the buffer may be (128*128/vSize, min(ctbSize, 64))
51. An IBC buffer may contain values outside of pixel range, which indicates that the position may not be available for IBC reference, e.g., not utilized for predicting other samples.
    a. A sample value may be set to a value which indicates the sample is unavailable.
    b. In one example, the value may be −1.
    c. In one example, the value may be any value outside of [0, 1<<(internal_bit_depth)−1] wherein internal_bit_depth is a positive integer value. For example, internal_bit_depth is the internal bitdepth used for encoding/decoding a sample for a color component.
    d. In one example, the value may be any value outside of [0, 1<<(input_bit_depth)−1] wherein input_bit_depth is a positive integer value. For example, input_bit_depth is the input bitdepth used for encoding/decoding a sample for a color component.
52. Availability marking for samples in the IBC buffer may depend on position of the current block, size of the current block, CTU/CTB size and VPDU size. In one example, let (xCb, yCb) denotes the block's position relative to top-left of the picture; ctbSize is the size (i.e., width and/or height) of a CTU/CTB; vSize=min (ctbSize, 64); wIbcBuf and hIbcBuf are the IBC buffer width and height.
    a. In one example, if (xCb % vSize) is equal to 0 and (yCb % vSize) is equal to 0, a certain set of positions in the IBC buffer may be marked as unavailable.
    b. In one example, when the current block size is smaller than the VPDU size, i.e. min(ctbSize, 64), the region marked as unavailable may be according to the VPDU size.
    c. In one example, when the current block size is larger than the VPDU size, i.e. min(ctbSize, 64), the region marked as unavailable may be according to the CU size.
53. At the beginning of decoding a video unit (e.g., VPDU (xV, yV)) relative to the top-left position of a picture, corresponding positions in the IBC buffer may be set to a value outside of pixel range.
    a. In one example, buffer samples with position (x % wIbcBuf, y % hIbcBuf) in the buffer, with x=xV, . . . , xV+ctbSize−1 and y=yV, . . . , yV+ctbSize−1, will be set to value−1. Where wIbcBuf and hIbcBuf are the IBC buffer width and height, ctbSize is the width of a CTU/CTB.
        i. In one example, hIbcBuf may be equal to ctbSize.
54. A bitstream conformance constraint may be according to the value of a sample in the IBC buffer
    a. In one example, if a reference block associated with a block vector in IBC buffer contains value outside of pixel range, the bitstream may be illegal.
55. A bitstream conformance constraint may be set according to the availability indication in the IBC buffer.
    a. In one example, if any reference sample mapped in the IBC buffer is marked as unavailable for encoding/decoding a block, the bitstream may be illegal.
    b. In one example, when singletree is used, if any luma reference sample mapped in the IBC buffer for encoding/decoding a block is marked as unavailable, the bitstream may be illegal.
    c. A conformance bitstream may satisfy that for an IBC coded block, the associated block vector may point to a reference block mapped in the IBC buffer and each luma reference sample located in the IBC buffer for encoding/decoding a block shall be marked as available (e.g., the values of samples are within the range of [K0, K1] wherein for example, K0 is set to 0 and K1 is set to (1<<BitDepth−1) wherein BitDepth is the internal bit-depth or the input bit-depth).
56. Bitstream conformance constraints may depend on partitioning tree types and current CU's coding treeType
    a. In one example, if dualtree is allowed in high-level (e.g., slice/picture/brick/tile) and the current video block (e.g., CU/PU/CB/PB) is coded with single tree, bitstreams constraints may need to check if all components' positions mapped in the IBC buffer is marked as unavailable or not.
    b. In one example, if dualtree is allowed in high-level (e.g., slice/picture/brick/tile) and the current luma video block (e.g., CU/PU/CB/PB) is coded with dual tree, bitstreams constraints may neglect chroma components' positions mapped in the IBC buffer is marked as unavailable or not.
        i. Alternatively, in such a case, bitstreams constraints may still check all components' positions mapped in the IBC buffer is marked as unavailable or not.
    c. In one example, if single tree is used, bitstreams constraints may neglect chroma components' positions mapped in the IBC buffer is marked as unavailable or not.

Improvement to the Current VTM Design

57. The prediction for IBC can have a lower precision than the reconstruction.
    a. In one example, the prediction value is according to the value clip{{p+[1<<(b−1)]}>>b,0,(1<<bitdepth)−1}<<b, where p is reconstructed sample value, b is a predefined bit-shifting value, bitdepth is prediction sample bit-bitdepth.
    b. In one example, the prediction value is according to the value clip{{p+[1<<(b−1)−1]}>>b,0,(1<<bitdepth)−1}<<b, where p is reconstructed sample value, b is a predefined bit-shifting value.
    c. In one example, the prediction value is according to the value ((p>>b)+(1<<(bitdepth−1)))<<b, where bitdepth is prediction sample bit-bitdepth.
    d. In one example, the prediction value is according to the value (clip((p>>b), 0, (1<<(bitdepth−b)))+(1<<(bitdepth−1)))<<b, where bitdepth is prediction sample bit-bitdepth.
    e. In one example, the prediction value is clipped in different ways depending on whether ILR is applied or not.
    f. In the above examples, b can be reconstructed bit-depth minus input sample bit-depth.
    g. In one example, the bit-depth or the bit-depth difference compared to the output bit-depth/input bit-depth/internal bit-depth may be signalled in SPS/PPS/sequence header/picture header/slice header/Tile group header/Tile header or other kinds of video data units.
58. Part of the prediction of IBC can have a lower precision and the other part has the same precision as the reconstruction.

a. In one example, the allowed reference area may contain samples with different precisions (e.g., bit-depth).
b. In one example, reference from other 64×64 blocks than the current 64×64 block being decoded is of low precision and reference from the current 64×64 block has the same precision as the reconstruction.
c. In one example, reference from other CTUs than the current CTU being decoded is of low precision and reference from the current CTU has the same precision as the reconstruction.
d. In one example, reference from a certain set of color components is of low precision and reference from the other color components has the same precision as the reconstruction.
59. When CTU size is M×M and reference area size is nM×nM, the reference area is the nearest available n×n CTU in a CTU row.
a. In one example, when reference area size is 128×128 and CTU size is 64×64, the nearest available 4 CTUs in a CTU row can be used for IBC reference.
b. In one example, when reference area size is 128×128 and CTU size is 32×32, the nearest available 16 CTUs in a CTU row can be used for IBC reference.
60. When CTU size is M and reference area size is nM, the reference area is the nearest available n−1 CTUs in a CTU row/tile.
a. In one example, when reference area size is 128×128 or 256×64 and CTU size is 64×64, the nearest available 3 CTUs in a CTU row can be used for IBC reference.
b. In one example, when reference area size is 128×128 or 512×32 and CTU size is 32×32, the nearest available 15 CTUs in a CTU row can be used for IBC reference.
61. When CTU size is M, VPDU size is kM and reference area size is nM, and the reference area is the nearest available n-k CTUs in a CTU row/tile.
a. In one example, CTU size is 64×64, VPDU size is also 64×64, reference area size is 128×128, the nearest 3 CTUs in a CTU row can be used for IBC reference.
b. In one example, CTU size is 32×32, VPDU size is also 64×64, reference area size is 128×128, the nearest (16-4)=12 CTUs in a CTU row can be used for IBC reference.
62. For a w×h block with upper-left corner being (x, y) using IBC, there are constraints that keep reference block from certain area for memory reuse, wherein w and h are width and height of the current block.
a. In one example, when CTU size is 128×128 and (x, y)=(m×64,n×64), the reference block cannot overlap with the 64×64 region starting from ((m−2)×64, n×64).
b. In one example, when CTU size is 128×128, the reference block cannot overlap with the w×h block with upper-left corner being (x−128, y).
c. In one example, when CTU size is 128×128, (x+BVx, y+BVy) cannot be within the w*h block with upper-left corner being (x−128, y), where BVx and BVy denote the block vector for the current block.
d. In one example, when CTU size is M×M and IBC buffer size is k×M×M, reference block cannot overlap with the w×h block with upper-left corner being (x−k×M, y), where BVx and BVy denote the block vector for the current block.
e. In one example, when CTU size is M×M and IBC buffer size is k×M×M, (x+BVx, y+BVy) cannot be within the w×h block with upper-left corner being (x−k×M, y), where BVx and BVy denote the block vector for the current block.
63. When CTU size is not M×M and reference area size is nM×nM, the reference area is the nearest available n×n-1 CTU in a CTU row.
a. In one example, when reference area size is 128×128 and CTU size is 64×64, the nearest available 3 CTUs in a CTU row can be used for IBC reference.
b. In one example, when reference area size is 128×128 and CTU size is 32×32, the nearest available 15 CTUs in a CTU row can be used for IBC reference.
64. For a CU within a 64×64 block starting from (2m*64, 2n*64), i.e., a upper-left 64×64 block in a 128×128 CTU, its IBC prediction can be from reconstructed samples in the 64×64 block starting from ((2m−2)*64, 2n*64), the 64×64 block starting from ((2m−1)*64, 2n*64), the 64×64 block starting from ((2m−1)*64, (2n+1)*64) and the current 64×64 block.
65. For a CU within a 64×64 block starting from ((2m+1)*64, (2n+1)*64), i.e., a bottom-right 64×64 block in a 128×128 CTU, its IBC prediction can be from the current 128×128 CTU.
66. For a CU within a 64×64 block starting from ((2m+1)*64, 2n*64), i.e., a upper-right 64×64 block in a 128×128 CTU, its IBC prediction can be from reconstructed samples in the 64×64 block starting from ((2m−1)*64, 2n*64), the 64×64 block starting from ((2m−1)*64, (2n+1)*64), the 64×64 block starting from (2m*64, 2n*64) and the current 64×64 block.
a. Alternatively, if the 64×64 block starting from (2m*64, (2n+1)*64) has been reconstructed, the IBC prediction can be from reconstructed samples in the 64×64 block starting from ((2m−1)*64, 2n*64), the 64×64 block starting from (2m*64, 2n*64), the 64×64 block starting from (2m*64, (2n+1)*64) and the current 64×64 block.
67. For a CU within a 64×64 block starting from (2m*64, (2n+1)*64), i.e., a bottom-left 64×64 block in a 128×128 CTU, its IBC prediction can be from reconstructed samples in the 64×64 block starting from ((2m−1)*64, (2n+1)*64), the 64×64 block starting from (2m*64, 2n*64); the 64×64 block starting from ((2m+1)*64, 2n*64) and the current 64×64 block.
a. Alternatively, if the 64×64 block starting from ((2m+1)*64, 2n*64) has not been reconstructed, the IBC prediction can be from reconstructed samples in the 64×64 block starting from ((2m−1)*64, 2n*64), the 64×64 block starting from ((2m−1)*64, (2n+1)*64), the 64×64 block starting from (2m*64, 2n*64) and the current 64×64 block.
68. It is proposed to adjust the reference area based on which 64×64 blocks the current CU belongs to.
a. In one example, for a CU starting from (x,y), when (y>>6)&1==0, two or up to two previous 64×64 blocks, starting from ((x>>6<<6)−128, y>>6<<6) and ((x>>6<<6)−64, y>>6<<6) can be referenced by IBC mode.
b. In one example, for a CU starting from (x,y), when (y>>6)&1==1, one previous 64×64 block, starting from ((x>>6<<6)−64, y>>6<<6) can be referenced by IBC mode.
69. For a block starting from (x,y) and with block vector (BVx, BVy), if isRec(((x+BVx)>>6<<6)+128-(((y+

BVy)>>6)&1)*64+(x %64), ((y+BVy)>>6<<6)+(y %64)) is true, the block vector is invalid.
  a. In one example, the block is a luma block.
  b. In one example, the block is a chroma block in 4:4:4 format
  c. In one example, the block contains both luma and chroma components
70. For a chroma block in 4:2:0 format starting from (x,y) and with block vector (BVx, BVy), if isRec(((x+BVx)>>5<<5)+64-(((y+BVy)>>5)&1)*32+(x %32), ((y+BVy)>>5<<5)+(y %32)) is true, the block vector is invalid.
71. The determination of whether a BV is invalid or not for a block of component c may rely on the availability of samples of component X, instead of checking the luma sample only.
  a. For a block of component c starting from (x,y) and with block vector (BVx, BVy), if isRec(c, ((x+BVx)>>6<<6)+128-(((y+BVy)>>6)&1)*64+(x %64), ((y+BVy)>>6<<6)+(y %64)) is true, the block vector may be treated as invalid.
    i. In one example, the block is a luma block (e.g., c is the luma component, or G component for RGB coding).
    ii. In one example, the block is a chroma block in 4:4:4 format (e.g., c is the cb or cr component, or B/R component for RGB coding).
    iii. In one example, availability of samples for both luma and chroma components may be checked, e.g., the block contains both luma and chroma components
  b. For a chroma block in 4:2:0 format starting from (x,y) of component c and with block vector (BVx, BVy), if isRec(c, ((x+BVx)>>5<<5)+64-(((y+BVy)>>5)&1)*32+(x %32), ((y+BVy)>>5<<5)+(y %32)) is true, the block vector may be treated as invalid.
  c. For a chroma block or sub-block starting from (x, y) of component c and with block vector (BVx, BVy), if isRec(c, x+BVx+Chroma_CTU_size, y) for a chroma component is true, the block vector may be treated as invalid, where Chroma_CTU_size is the CTU size for chroma component.
    i. In one example, for 4:2:0 format, Chroma_CTU_size may be 64.
    ii. In one example, a chroma sub-block may be a 2×2 block in 4:2:0 format.
    iii. In one example, a chroma sub-block may be a 4×4 block in 4:4:4 format.
    iv. In one example, a chroma sub-block may correspond to the minimal CU size in luma component.
      1. Alternatively, a chroma sub-block may correspond to the minimal CU size for the chroma component.
72. For all bullets mentioned above, it is assumed that the reference buffer contains multiple M×M blocks (M=64). However, it could be extended to other cases such as the reference buffer contains multiple N×M blocks (e.g., N=128, M=64).
73. For all bullets mentioned above, further restrictions may be applied that the reference buffer should be within the same brick/tile/tile group/slice as the current block.
  a. In one example, if partial of the reference buffer is outside the current brick/tile/tile group/slice, the usage of IBC may be disabled. The signalling of IBC related syntax elements may be skipped.
  b. Alternatively, if partial of the reference buffer is outside the current brick/tile/tile group/slice, IBC may be still enabled for one block, however, the block vector associated with one block may only point to the remaining reference buffer.
74. It is proposed to have K1 most recently coded VPDU, if available, in the $1^{st}$ VPDU row of the CTU/CTB row and K2 most recently coded VPDU, if available, in the $2^{nd}$ VPDU row of the CTU/CTB row as the reference area for IBC, excluding the current VPDU.
  a. In one example, K1 is equal to 2 and K2 is equal to 1.
  b. In one example, the above methods may be applied when the CTU/CTB size is 128×128 and VPDU size is 64×64.
  c. In one example, the above methods may be applied when the CTU/CTB size is 64×64 and VPDU size is 64×64 and/or 32×32.
  d. In one example, the above methods may be applied when the CTU/CTB size is 32×32 and VPDU size is 32×32 or smaller.
75. The above methods may be applied in different stages.
  a. In one example, the module operation (e.g., a mod b) of block vectors (BVs) may be invoked in the availability check process of BVs to decide whether the BV is valid or not.
  b. In one example, the module operation (e.g., a mod b) of block vectors (BVs) may be invoked to identify a reference sample's location (e.g., according to the module results of a current sample's location and BV) in the IBC virtual buffer or reconstructed picture buffer (e.g., before in-loop filtering process).

5. EMBODIMENTS

5.1 Embodiment #1

An implementation of the buffer for IBC is described below:

The buffer size is 128×128. CTU size is also 128×128. For coding of the 1st CTU in a CTU row, the buffer is initialized with 128 (for 8-bit video signal). For coding of the k-th CTU in a CTU row, the buffer is initialized with the reconstruction before loop-filtering of the (k−1)-th CTU.

Figure 3:
FIG. 3 shows an example of coding of a block starting from (x,y).

FIG. 3 shows an example of coding of a block starting from (x,y).

When coding a block starting from (x,y) related to the current CTU, a block vector (BVx, BVy)=(x−x0, y−y0) is sent to the decoder to indicate the reference block is from (x0,y0) in the IBC buffer. Suppose the width and height of the block are w and h respectively. When finishing coding of the block, a w×h area starting from (x,y) in the IBC buffer will be updated with the block's reconstruction before loop-filtering.

5.2 Embodiment #2

FIG. 4 shows examples of possible alternative way to choose the previous coded 64×64 blocks.

5.3 Embodiment #3

Figure 5:
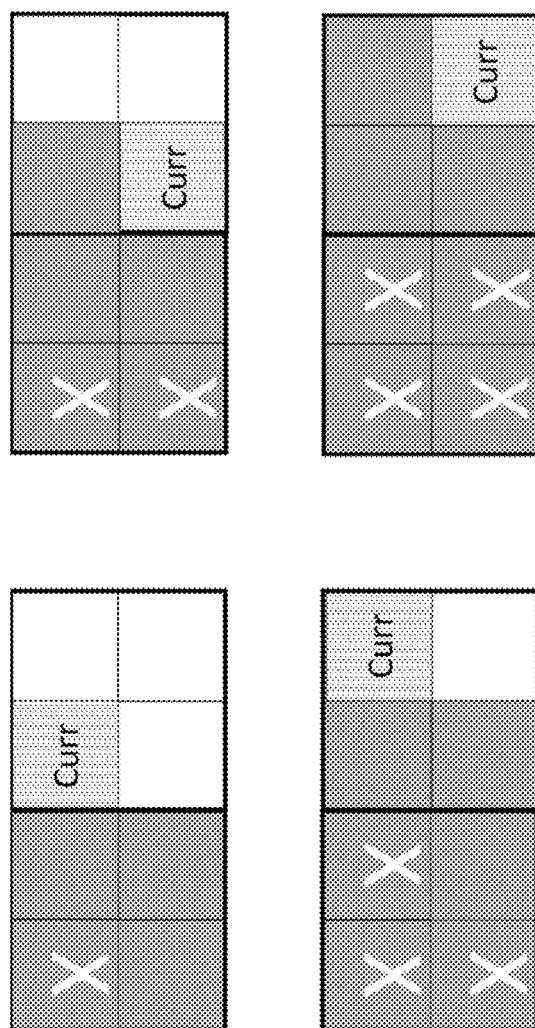
FIG. 5 shows an example of a possible alternative way to change the coding/decoding order of 64×64 blocks.

FIG. 5 shows an example of a possible alternative way to change the coding/decoding order of 64×64 blocks.

5.4 Embodiment #4

Figure 8:
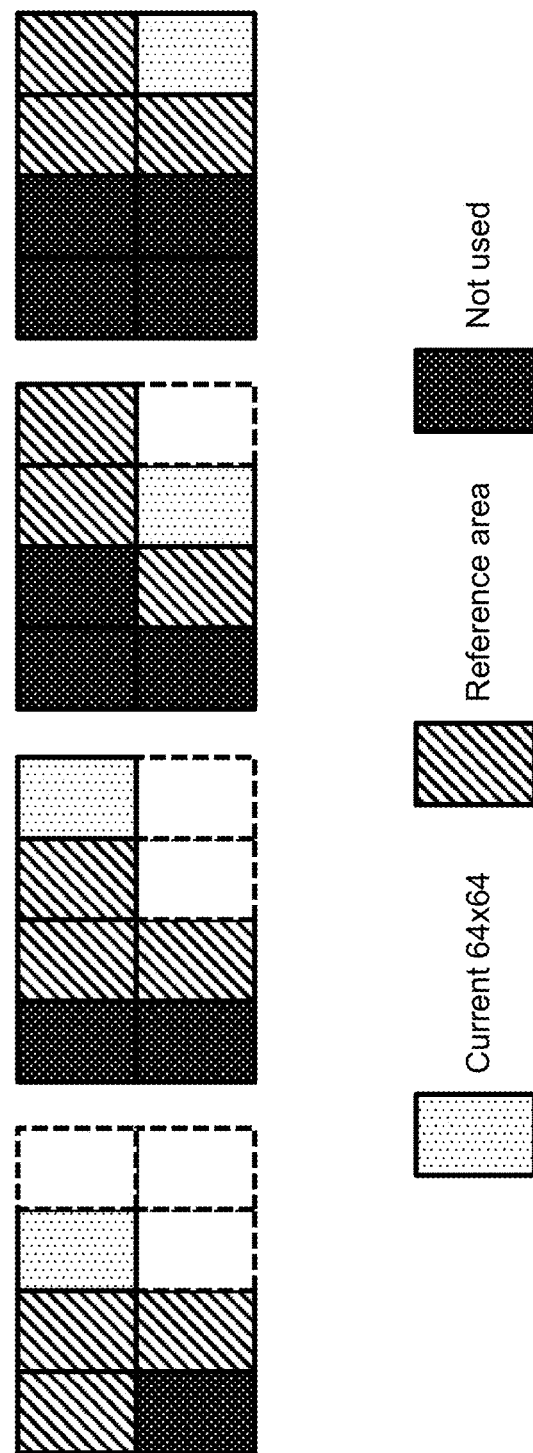
FIG. 8 shows another possible alternative way to choose the previous coded 64×64 blocks, when the decoding order for 64×64 blocks is from top to bottom, left to right.

FIG. 8 shows another possible alternative way to choose the previous coded 64×64 blocks, when the decoding order for 64×64 blocks is from top to bottom, left to right.

5.5 Embodiment #5

Figure 9:
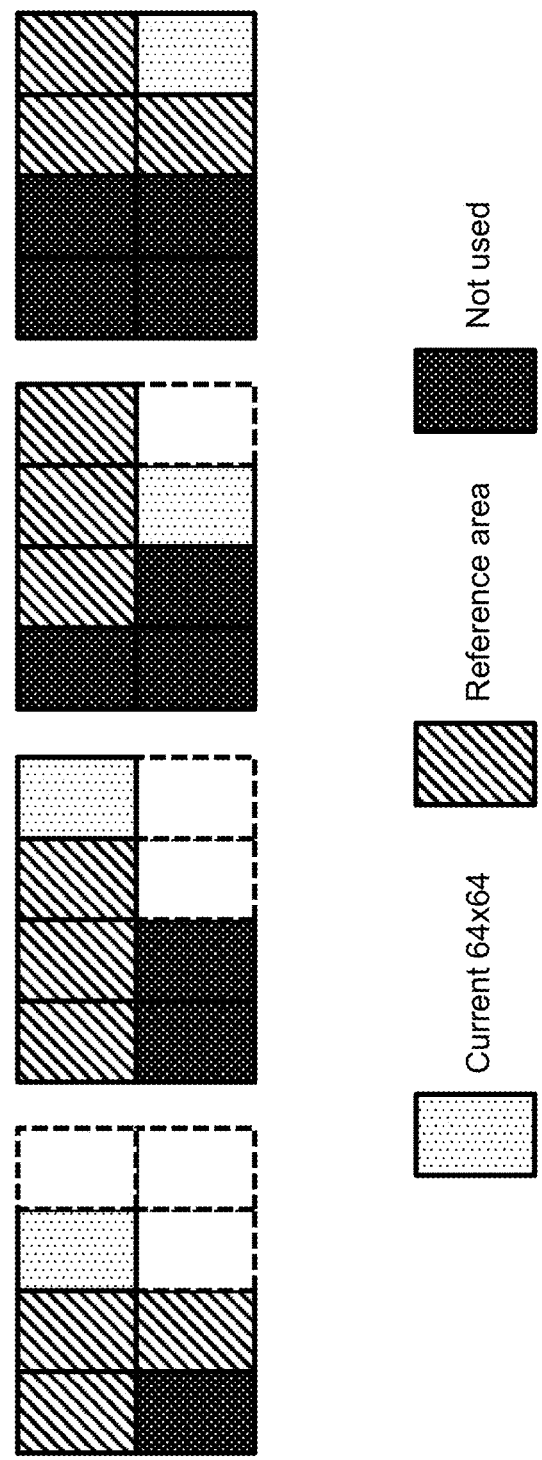
FIG. 9 shows another possible alternative way to choose the previous coded 64×64 blocks.

FIG. 9 shows another possible alternative way to choose the previous coded 64×64 blocks.

5.6 Embodiment #6

Figure 11:
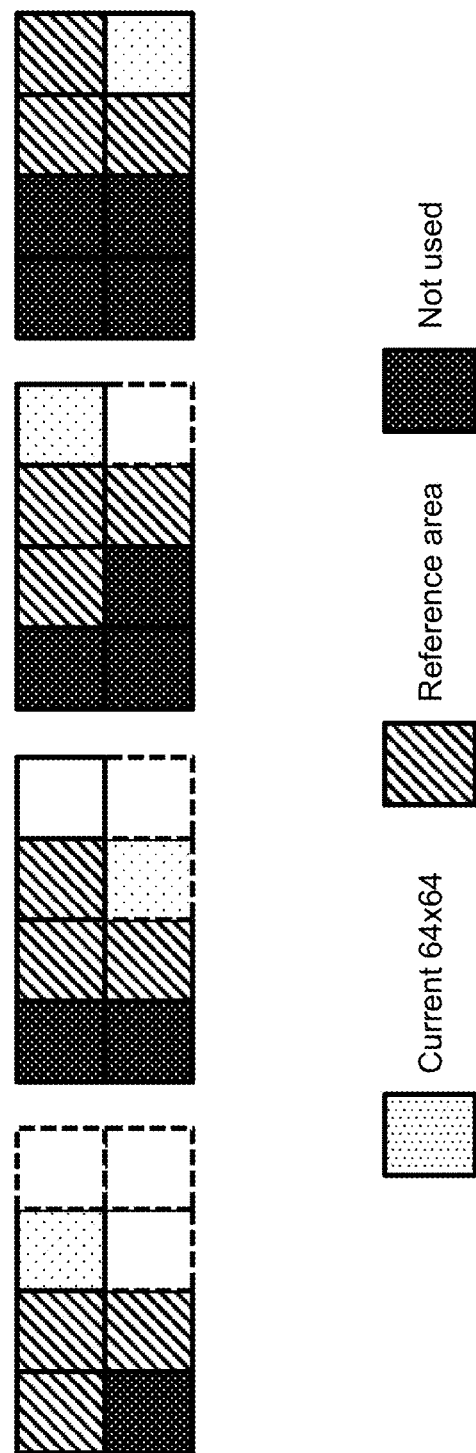
FIG. 11 shows another possible alternative way to choose the previous coded 64×64 blocks, when the decoding order for 64×64 blocks is from left to right, top to bottom.

FIG. 11 shows another possible alternative way to choose the previous coded 64×64 blocks, when the decoding order for 64×64 blocks is from left to right, top to bottom.

5.7 Embodiment #7

Suppose that CTU size is W×W, an implementation of IBC buffer with size mW×W and bitdepth being B, at the decoder is as below.

At the beginning of decoding a CTU row, initialize the buffer with value $(1<<(B-1))$ and set the starting point to update (xb, yb) to be (0,0).

When a CU starting from (x, y) related to a CTU upper-left corner and with size w×h is decoded, the area starting from (xb+x, yb+y) and w×h size will be updated with the reconstructed pixel values of the CU, after bit-depth aligned to B-bit.

After a CTU is decoded, the starting point to update (xb, yb) will be set as ((xb+W) mod mW, 0).

When decoding an IBC CU with block vector (BVx, BVy), for any pixel (x, y) related to a CTU upper-left corner, its prediction is extracted from the buffer at position ((x+BVx) mod mW, (y+BVy) mode W) after bit-depth alignment to the bit-depth of prediction signals.

In one example, B is set to 7, or 8 while the output/input bitdepth of the block may be equal to 10.

5.8 Embodiment #8

For a luma CU or joint luma/chroma CU starting from (x,y) related to the upper-left corner of a picture and a block vector (BVx, BVy), the block vector is invalid when isRec$(((x+BVx)>>6<<6)+128-(((y+BVy)>>6)\&1)*64+(x\ \%64), ((y+BVy)>>6<<6)+(y\ \%64))$ is true.

For a chroma CU starting from (x,y) related to the upper-left corner of a picture and a block vector (BVx, BVy), the block vector is invalid when isRec$(((x+BVx)>>5<<5)+64-(((y+BVy)>>5)\&1)*32+(x\ \%32), ((y+BVy)>>5<<5)+(y\ \%32))$ is true.

5.9 Embodiment #9

For a chroma block or sub-block starting from (x,y) in 4:2:0 format related to the upper-left corner of a picture and a block vector (BVx, BVy), the block vector is invalid when isRec(c, (x+BVx+64, y+BVy) is true, where c is a chroma component.

For a chroma block or sub-block starting from (x,y) in 4:4:4 format related to the upper-left corner of a picture and a block vector (BVx, BVy), the block vector is invalid when isRec(c, (x+BVx+128, y+BVy) is true, where c is a chroma component.

5.10 Embodiment #10

For a luma CU or joint luma/chroma CU starting from (x,y) related to the upper-left corner of a picture and a block vector (BVx, BVy), the block vector is invalid when isRec$(((x+BVx)>>6<<6)+128-(((y+BVy)>>6)\&1)*64+(x\ \%64), ((y+BVy)>>6<<6)+(y\ \%64))$ is true.

For a chroma block or sub-block starting from (x,y) in 4:2:0 format related to the upper-left corner of a picture and a block vector (BVx, BVy), the block vector is invalid when isRec(c, $((x+BVx)>>5<<5)+64-(((y+BVy)>>5)\&1)*32+(x\ \%32), ((y+BVy)>>5<<5)+(y\ \%32))$ is true, where c is a chroma component.

5.11 Embodiment #11

This embodiment highlights an implementation of keeping two most coded VPDUs in the $1^{st}$ VPDU row and one most coded VPDU in the $2^{nd}$ VPDU row of a CTU/CTB row, excluding the current VPDU.

Figure 13:
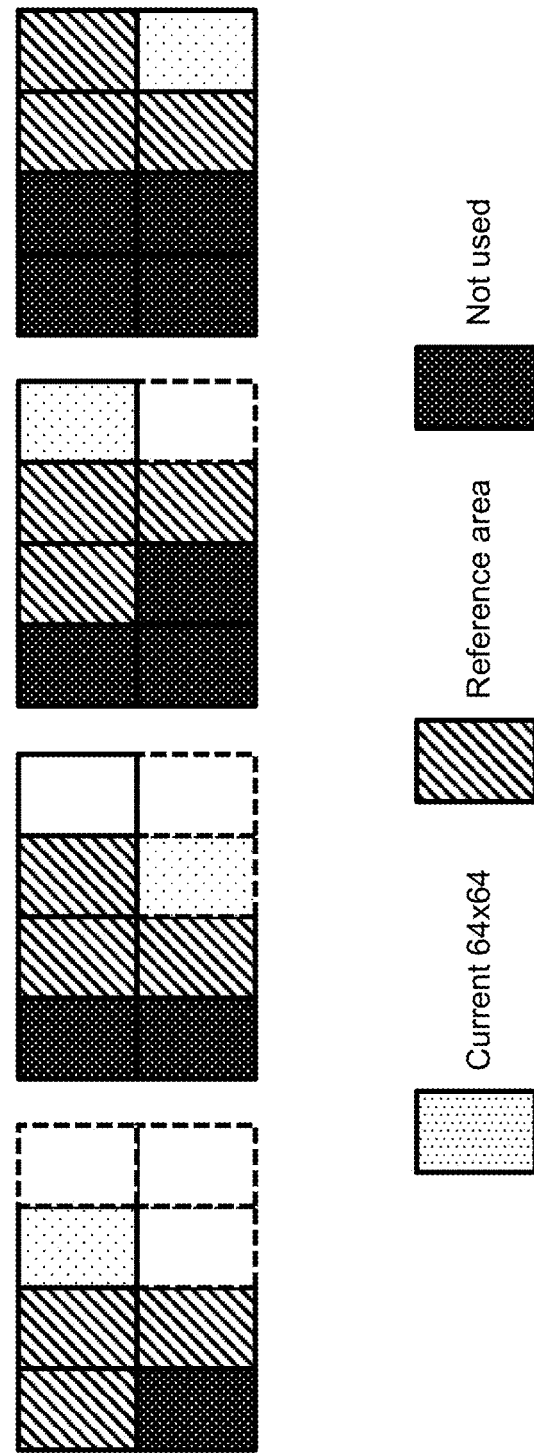
FIG. 13 shows one arrangement of reference area for IBC.

When VPDU coding order is top to bottom and left to right, the reference area is illustrated as in FIG. 13.

Figure 14:
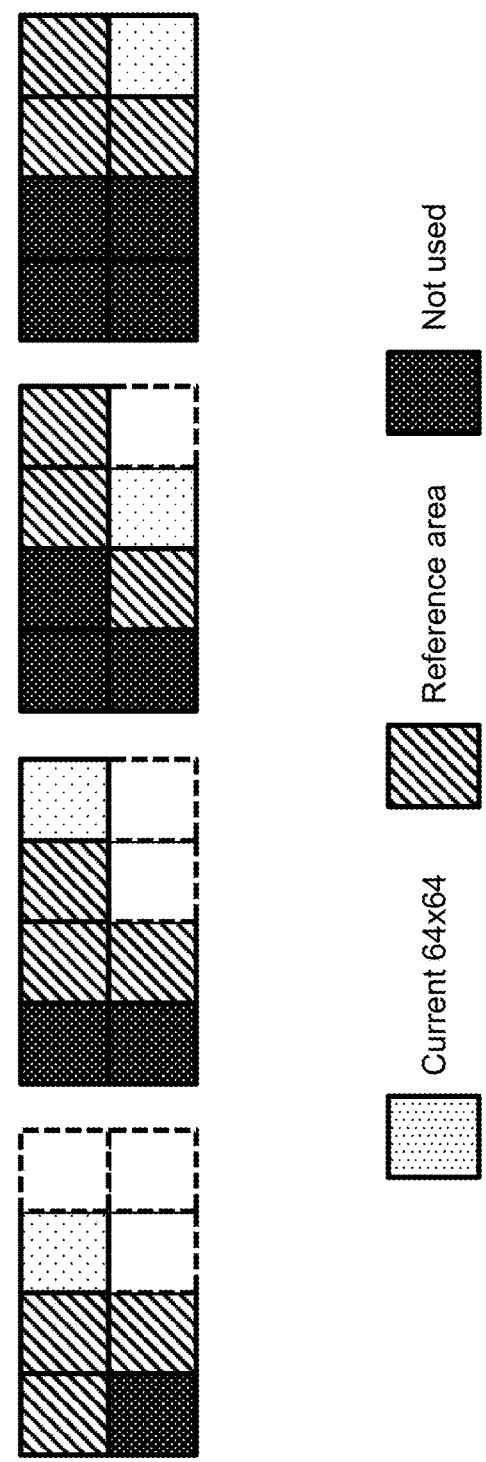
FIG. 14 shows another arrangement of reference area for IBC.

When VPDU coding order is left to right and top to bottom and the current VPDU is not to the right side of the picture boundary, the reference area is illustrated as in FIG. 14.

Figure 15:
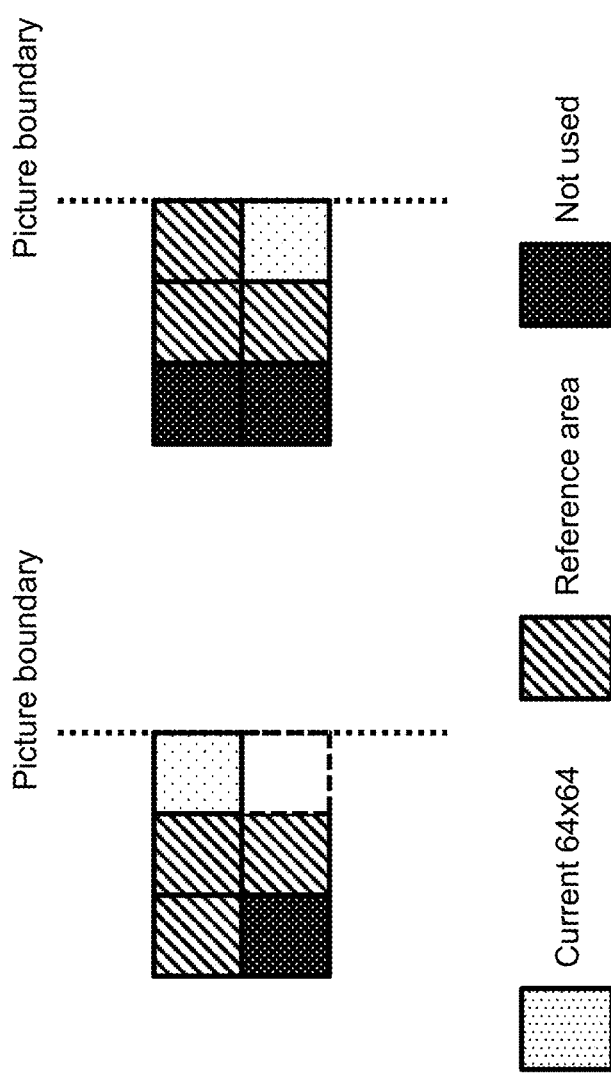
FIG. 15 shows another arrangement of reference area for IBC when the current virtual pipeline data unit (VPDU) is to the right side of the picture boundary.

When VPDU coding order is left to right and top to bottom and the current VPDU is to the right side of the picture boundary, the reference area may be illustrated as FIG. 15.

Given a luma block (x, y) with size w×h, a block vector (BVx, BVy) is valid or not can be told by checking the following condition:

isRec$(((x+BVx+128)>>6<<6)-(refy\&0x40)+(x\ \%64), ((y+BVy)>>6<<6)+(refy>>6==y>>6)?(y\ \%64):0)$, where refy=$(y\&0x40)?(y+BVy): (y+BVy+w-1)$.

If the above function returns true, the block vector (BVx, BVy) is invalid, otherwise the block vector might be valid.

5.12 Embodiment #12

If CTU size is 192×128, a virtual buffer with size 192×128 is maintained to track the reference samples for IBC.

A sample (x, y) relative to the upper-left corner of the picture is associated with the position (x %192, y %128) relative to the upper-left corner of the buffer. The following steps show how to mark availability of the samples associate with the virtual buffer for IBC reference.

A position (xPrevVPDU, yPrevVPDU) relative to the upper-left corner of the picture is recorded to stand for the upper-left sample of the most recently decoded VPDU.

1) At the beginning of decoding a VPDU row, all positions of the buffer are marked as unavailable. (xPrevVPDU, yPrevVPDU) is set as (0,0).
2) At the beginning of decoding the 1st CU of a VPDU, positions (x, y) with x=(xPrevVPDU−2WVPDU+2mWVPDU) % (mWVPDU), . . . , ((xPrevVPDU−2WVPDU+2mWVPDU) % (mWVPDU))−1+WVPDU; and y=yPrevVPDU % (nHVPDU), (yPrevVPDU % (nHVPDU))−1+HVPDU may be marked as unavailable. Then (xPrevVPDU, yPrevVPDU) is set as (xCU, yCU), i.e. the upper-left position of the CU relative to the picture.
3) After decoding a CU, positions (x, y) with x=xCU % (mWVPDU), . . . , (xCU+CU_width−1) % (mWVPDU) and y=yCU % (nHVPDU), . . . , (yCU+CU_height−1) % (nHVPDU) are marked as available.
4) For an IBC CU with a block vector (xBV, yBV), if any position (x, y) with x=(xCU+xBV) % (mWVPDU), (xCU+xBV+CU_width−1) % (mWVPDU) and y=(yCU+yBV) % (nHVPDU), . . . , (yCU+yBV+

CU_height−1) % (nHVPDU) is marked as unavailable, the block vector is considered as invalid.

Figure 16:
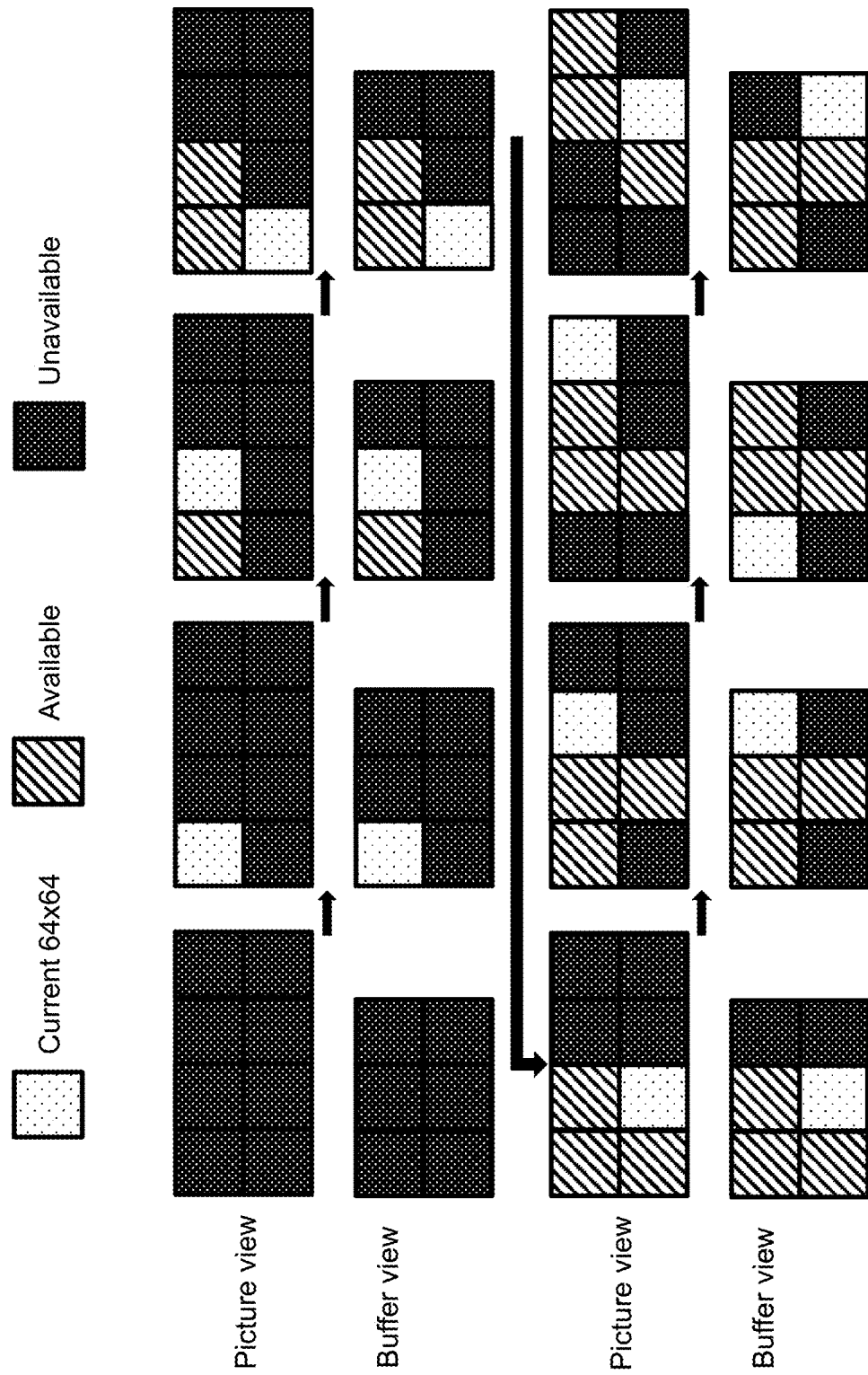
FIG. 16 shows an example of the status of virtual buffer when VPDUs in a CTU row are decoded sequentially.

FIG. 16 shows the buffer status along with the VPDU decoding status in the picture.

5.13 Embodiment #13

If CTU size is 128×128 or CTU size is greater than VPDU size (e.g., 64×64 in current design) or CTU size is greater than VPDU size (e.g., 64×64 in current design), a virtual buffer with size 192×128 is maintained to track the reference samples for IBC. In the following, when a<0, (a % b) is defined as floor(a/b)*b, where Floor© returns the largest integer no larger than c.

A sample (x, y) relative to the upper-left corner of the picture is associated with the position (x %192, y %128) relative to the upper-left corner of the buffer. The following steps show how to mark availability of the samples associate with the virtual buffer for IBC reference.

A position (xPrevVPDU, yPrevVPDU) relative to the upper-left corner of the picture is recorded to stand for the upper-left sample of the most recently decoded VPDU.

1) At the beginning of decoding a VPDU row, all positions of the buffer are marked as unavailable. (xPrevVPDU, yPrevVPDU) is set as (0,0).
2) At the beginning of decoding the 1st CU of a VPDU,
   a. If yPrevVPDU %64 is equal to 0, positions (x, y) with x=(xPrevVPDU 128) %192, ..., ((xPrevVPDU 128) %192)+63; and y=yPrevVPDU %128, ..., (yPrevVPDU %128)+63, are marked as unavailable. Then (xPrevVPDU, yPrevVPDU) is set as (xCU, yCU), i.e. the upper-left position of the CU relative to the picture.
   b. Otherwise, positions (x, y) with x=(xPrevVPDU 64) % 192, ..., ((xPrevVPDU−64) %192)+63; and y=yPrevVPDU %128, ..., (yPrevVPDU %128)+63, are marked as unavailable. Then (xPrevVPDU, yPrevVPDU) is set as (xCU, yCU), i.e. the upper-left position of the CU relative to the picture.
3) After decoding a CU, positions (x, y) with x=xCU %192, ..., (xCU+CU_width−1) %192 and y=yCU %128, ..., (yCU+CU_height−1) %128 are marked as available.
4) For an IBC CU with a block vector (xBV, yBV), if any position (x, y) with x=(xCU+xBV) %192, ..., (xCU+xBV+CU_width−1) %192 and y=(yCU+yBV) %128, ..., (yCU+yBV+CU_height−1) %128 is marked as unavailable, the block vector is considered as invalid.

If CTU size is S×S, S is not equal to 128, let Wbuf be equal to 128*128/S. A virtual buffer with size WbufxS is maintained to track the reference samples for IBC. The VPDU size is equal to the CTU size in such a case.

A position (xPrevVPDU, yPrevVPDU) relative to the upper-left corner of the picture is recorded to stand for the upper-left sample of the most recently decoded VPDU.

1) At the beginning of decoding a VPDU row, all positions of the buffer are marked as unavailable. (xPrevVPDU, yPrevVPDU) is set as (0,0).
2) At the beginning of decoding the 1st CU of a VPDU, positions (x, y) with x=(xPrevVPDU−$W_{buf}$*S) % S, ..., ((xPrevVPDU−$W_{buf}$*S) % S)+S−1; and y=yPrevVPDU % S, ..., (yPrevVPDU % S)+S−1; are marked as unavailable. Then (xPrevVPDU, yPrevVPDU) is set as (xCU, yCU), i.e. the upper-left position of the CU relative to the picture.
3) After decoding a CU, positions (x, y) with x=xCU % ($W_{buf}$), ..., (xCU+CU_width−1) % ($W_{buf}$) and y=yCU % S, ..., (yCU+CU_height−1) % S are marked as available.
4) For an IBC CU with a block vector (xBV, yBV), if any position (x, y) with x=(xCU+xBV) % ($W_{buf}$), ..., (xCU+xBV+CU_width−1) % ($W_{buf}$) and y=(yCU+yBV) % S, ..., (yCU+yBV+CU_height−1) % S is marked as unavailable, the block vector is considered as invalid.

5.14 Embodiment #14

If CTU size is 128×128 or CTU size is greater than VPDU size (e.g., 64×64 in current design) or CTU size is greater than VPDU size (e.g., 64×64 in current design), a virtual buffer with size 256×128 is maintained to track the reference samples for IBC. In the following, when a<0, (a % b) is defined as floor(a/b)*b, where Floor© returns the largest integer no larger than c.

A sample (x, y) relative to the upper-left corner of the picture is associated with the position (x %256, y %128) relative to the upper-left corner of the buffer. The following steps show how to mark availability of the samples associate with the virtual buffer for IBC reference.

A position (xPrevVPDU, yPrevVPDU) relative to the upper-left corner of the picture is recorded to stand for the upper-left sample of the most recently decoded VPDU.

1) At the beginning of decoding a VPDU row, all positions of the buffer are marked as unavailable. (xPrevVPDU, yPrevVPDU) is set as (0,0).
2) At the beginning of decoding the $1^{st}$ CU of a VPDU,
   a. If yPrevVPDU %64 is equal to 0, positions (x, y) with x=(xPrevVPDU−128) %256, ..., ((xPrevVPDU 128) % 256)+63; and y=yPrevVPDU %128, ..., (yPrevVPDU %128)+63, are marked as unavailable. Then (xPrevVPDU, yPrevVPDU) is set as (xCU, yCU), i.e. the upper-left position of the CU relative to the picture.
   b. Otherwise, positions (x, y) with x=(xPrevVPDU−64) % 256, ..., ((xPrevVPDU−64) % 256)+63; and y=yPrevVPDU %128, ..., (yPrevVPDU %128)+63, are marked as unavailable. Then (xPrevVPDU, yPrevVPDU) is set as (xCU, yCU), i.e. the upper-left position of the CU relative to the picture.
3) After decoding a CU, positions (x, y) with x=xCU %256, ..., (xCU+CU_width−1) %256 and y=yCU %128, ..., (yCU+CU_height−1) %128 are marked as available.
4) For an IBC CU with a block vector (xBV, yBV), if any position (x, y) with x=(xCU+xBV) %256, ..., (xCU+ xBV+CU_width−1) %256 and y=(yCU+yBV) %128, ..., (yCU+yBV+CU_height−1) %128 is marked as unavailable, the block vector is considered as invalid.

When CTU size is not 128×128 or less than 64×64 or less than 64×64, the same process applies as in the previous embodiment, i.e. embodiment #14.

5.15 Embodiment #15

An IBC reference availability marking process is described as follows. The changes are indicated in bolded, underlined, italicized text in this document.

7.3.7.1 General Slice Data Syntax

| | Descriptor |
|---|---|
| slice_data( ) { | |
|   for( i = 0; i < NumBricksInCurrSlice; i++ ) { | |
|     CtbAddrInBs = FirstCtbAddrBs[ SliceBrickIdx[ i ] ] | |
|     for( j = 0; j < NumCtusInBrick[ SliceBrickIdx[ i ] ]; j++, CtbAddrInBs++ ) { | |
|       if( ( j % BrickWidth[ SliceBrickIdx[ i ] ] ) = = 0 ) { | |
|         NumHmvpCand = 0 | |
|         NumHmvpIbcCand = 0 | |
|         *xPrevVPDU = 0* | |
|         *yPrevVPDU = 0* | |
|         *if( CtbSizeY = = 128 )* | |
|         *reset_ibc_isDecoded(0, 0, 256,CtbSizeY, BufWidth, BufHeight)* | |
|         *else* | |
|         ***reset_ibc_isDecoded(0, 0,128\*128/CtbSizeY, CtbSizeY, BufWidth, BufHeight)*** | |
|       } | |
|       CtbAddrInRs = CtbAddrBsToRs[ CtbAddrInBs ] | |
| ...... | |

| | Descriptor |
|---|---|
| *reset_ibc_isDecoded(x0, y0, w, h, BufWidth, BufHeight) {* | |
|   *if(x0 >= 0)* | |
|   *for (x = x0 % BufWidth; x < x0 + w; x+=4)* | |
|   *for (y = y0 % BufHeight; y < y0 + h; y+=4)* | |
|   *isDecoded[ x >> 2 ][ y >> 2 ] = 0* | |
| *}* | |

***BufWidth is equal to (CtbSize Y==128)?256:(128\*128/CtbSizeY) and BufHeight is equal to CtbSizeY.***

7.3.7.5 Coding Unit Syntax

| | Descriptor |
|---|---|
| coding_unin x0, y0, cbWidth, cbHeight, treeType ) { | |
|   *if(treeType != DUAL_TREE_CHROMA&& ( CtbSizeY = = 128 ) && (x0 % 64) = = 0 && (y0 % 64) = = 0 ) {* | |
|   *for( x = x0; x < x0 + cbWidth; x += 64 )* | |
|   *for( y = y0; y < y0 + cbHeight; y += 64 )* | |
|   *if( ( yPrevVPDU % 64 ) = = 0 )* | |
|   *reset_ibc_isDecoded(xPrevVPDU - 128, yPrevVPDU, 64, 64, BufWidth, BufHeight)* | |
|   *else* | |
|   *reset_ibc_isDecoded(xPrevVPDU - 64, yPrevVPDU, 64, 64, BufWidth, BufHeight)* | |
|   *xPrevVPDU = x0* | |
|   *yPrevVPDU = y0* | |
|   *}* | |
|   *if( treeType != DUAL_TREE CHROMA && ( CtbSizeY < 128 ) && (x0 % CtbSizeY) = = 0 && (y0 % CtbSizeY) = = 0 ) {* | |
| ***reset ibc isDecoded(xPrevVPDU - (128\*128/CtbSizeY - CtbSizeY), yPrevVPDU, 64, 64, BufWidth, BufHeight)*** | |
|   *xPrevVPDU = x0* | |
|   *yPrevVPDU = y0* | |
|   *}* | |
|   if( slice_type != I \|\| sps_ibc_enabled_flag ) { | |
|     if( treeType != DUAL_TREE_CHROMA && | |
|       !( cbWidth = = 4 && cbHeight = = 4 && !sps_ibc_enabled_flag ) ) | |
|         cu_skip_flag[ x0 ][ y0 ] | ae(v) |
|     if( cu_skip_flag[ x0 ][ y0 ] = = 0 && slice_type != I && !( cbWidth = = 4 && cbHeight = = 4 ) ) | |
|       pred_mode_flag | ae(v) |
|     if( ( ( slice_type = = I && cu_skip_flag[ x0 ][ y0 ] = = 0) \|\| | |
|       ( slice_type != I && ( CuPredMode[ x0 ][ y0 ] != MODE_INTRA \|\| | |
|       ( cbWidth = = 4 && cbHeight = = 4 && cu_skip_flag[ x0 ][ y0 ] = = 0 ) ) ) ) && | |
|       sps_ibc_enabled_flag && ( cbWidth != 128 && cbHeight != 128 ) ) | |
|       pred_mode_ibc_flag | ae(v) |
|   } | |
|   ... | |

8.6.2 Derivation Process for Motion Vector Components for IBC Blocks

8.6.2.1 General

. . .

*It is a requirement of bitstream comformance that when the block vector validity checking process in clause 8.6.3.2 is invoked with the block vector mvL, isBVvalid shall be true.*

. . .

8.6.3 Decoding Process for ibc Blocks
8.6.3.1 General
This process is invoked when decoding a coding unit coded in ibc prediction mode.
Inputs to this process are:
 a luma location (xCb, yCb) specifying the top-left sample of the current coding block relative to the top-left luma sample of the current picture,
 a variable cbWidth specifying the width of the current coding block in luma samples,
 a variable cbHeight specifying the height of the current coding block in luma samples, variables numSbX and numSbY specifying the number of luma coding sub-blocks in horizontal and vertical direction,
 the motion vectors mv[xSbIdx][ySbIdx] with xSbIdx= 0 . . . numSbX−1, and ySbIdx=0 . . . numSbY−1,
 a variable cIdx specifying the colour component index of the current block.
 _a (nIbcBufW)x(ctbSize) array ibcBuf_
. . .
For each coding subblock at subblock index (xSbIdx, ySbIdx) with xSbIdx=0 . . . numSbX−1, and ySbIdx=0 . . . numSbY−1, the following applies:
The luma location (xSb, ySb) specifying the top-left sample of the current coding subblock relative to the top-left luma sample of the current picture is derived as follows:

$$(xSb, ySb) = (xCb + xSbIdx * sbWidth, yCb + ySbIdx * sbHeight) \quad (8\text{-}913)$$

_If cIdx is equal to 0, nIbcBufW_
_is set to ibcBufferWidth, otherwise nIbcBufW is set to_
_( ibcBufferWidth / SubWidthC ). The following applies:_
_predSamples[ xSb + x ][ ySb + y ] = ibcBuf[_
_( xSb + x + (mv[ xSb ][ ySb ][ 0 ] >> 4 )) %_
_nIbcRefW ][ ySb +y + (mv[ xSb ][ ySb ][ 1 ] >> 4 ) ]_
_with x = 0..sbWidth − 1 and y = 0..sbHeight − 1._

...
_8.6.3.2 Block vector checking process_
_Inputs to this process are:_
_a luma location ( xCb, yCb ) specifying_
_the top-left sample of the current coding block_
_relative to the top-left_
_luma sample of the current picture,_
_a variable cbWidth specifying the width_
_of the current coding block in luma samples,_
_a variable cbHeight specifying the height_
_of the current coding block in luma samples,_
_variables numSbX and numSbY specifying_
_the number of luma coding subblocks in_
_horizontal and vertical direction,_
_the block vectors mv( xSbIdx ][ ySbIdx ]_
_with SbIdx = 0 .. NumSbX − 1, and_
_ySbIdx = 0 .. NumSbY − 1,_
_a variable cIdx specifying the colour_
_component index of the current block._
_a (nIbcBufW)x(ctbSize) array ibcBuf_
_Outputs of this process is a flag isBVvalid_
_to indicate if the block vector is valid or not._
_The following applies_
 1. _isBVvalid is set equal to true._
 2. _If ( ( yCb & ( ctbSize − 1 ) ) + mv[ 0 ][ 0 ][ 1 ]_
    _+ cbHeight ) > ctbSize, isBVvalid is set_
    _equal to false._
 3. _Otherwise, for each subblock index xSbIdx,_
    _ySbIdx with xSbIdx = 0 .. numSbX − 1,_
    _and ySbIdx = 0 .. numSbY − 1, its position_
    _relative to the top-left luma sample of the_
    _ibcBuf is derived_
    _xTL = ( xCb + xSbIdx * sbWidth + mv[ xSbIdx_
    _][ ySbIdx ][ 0 ] ) & ( nIbcBufW − 1 )_
    _yTL = ( yCb & ( ctbSize − 1 ) ) + ySbIdx_
    _* sbHeight + mv[ xSbIdx ][ ySbIdx ][ 1 ]_
    _xBR = ( xCb + xSbIdx * sbWidth + sbWidth_
    _− 1 + mv[ xSbIdx ][ ySbIdx ][ 0 ] ) & ( nIbcBufW − 1 )_
    _yBR = ( yCb & ( ctbSize − 1 ) ) +_
    _ySbIdx * sbHeight + sbHeight − 1 + mv[ xSbIdx ][ ySbIdx ][ 1 ]_
_if (isDecoded[ xTL>>2 ][ yTL>>2 ] == 0) or_
_(isDecoded[ xBR>>2 ][ yTL>>2 ] == 0) or_
_(isDecoded[ xBR>>2 ][ yBR>>2 ] == 0),_
_isBVvalid is set euqal to false._ .
8.7.5 Picture Reconstruction Process
8.7.5.1 General
Inputs to this process are:
 a location (xCurr, yCurr) specifying the top-left sample of the current block relative to the top-left sample of the current picture component,
 the variables nCurrSw and nCurrSh specifying the width and height, respectively, of the current block,
 a variable cIdx specifying the colour component of the current block,
 an (nCurrSw)×(nCurrSh) array predSamples specifying the predicted samples of the current block,
 an (nCurrSw)×(nCurrSh) array resSamples specifying the residual samples of the current block.
Output of this process are
a reconstructed picture sample array recSamples.
_an IBC reference array ibcBuf._
...
_Denote nIbcBufW as the width_
_of ibcBuf, the following applies:_
_ibcBuf[ ( xCurr + i ) & ( nIbcBufW − 1 )_
_][ ( yCurr + j ) & ( ctbSize − 1 ) ] =_
_recSamples[ xCurr + i ][ yCurr + j ]_
_with i = 0..nCurrSw − 1, j = 0..nCurrSh − 1._

5.16 Embodiment #16

This is identical to the previous embodiment except for the following changes

```
slice_data( ) {                                                              Descriptor
    for( i = 0; i < NumBricksInCurrSlice; i++ ) {
        CtbAddrInBs = FirstCtbAddrBs[ SliceBrickIdx[ i ] ]
        for( j = 0; j < NumCtusInBrick[ SliceBrickIdx[ i ] ]; j++, CtbAddrInBs++
) {
            if( ( j % BrickWidth[ SliceBrickIdx[ i ] ] ) = = 0 ) {
                NumHmvpCand = 0
                NumHmvpIbcCand = 0
    xPrevVPDU = 0
    yPrevVPDU = 0
    if( CtbSizeY == 128 )
```

```
    reset_ibc_isDecoded(0, 0, 192,CtbSizeY, BufWidth, BufHeight)
   else
    reset_ibc_isDecoded(0, 0, 128*128/CtbSizeY, CtbSizeY,
BufWidth, BufHeight)
     }
       CtbAddrInRs = CtbAddrBsToRs[ CtbAddrInBs ]
   ......
```

| reset_ibc_isDecoded(x0, y0, w, h, BufHeight) {                                                                                                          | Descriptor |
|---------------------------------------------------------------------------------------------------------------------------------------------------------|------------|
| if( x0 >= 0 )<br>  for (x = x0 % BufWidth; x < x0 + w; x+=4)<br>    for (y = y0 % BufHeight; y < y0 + h; y+=4)<br>      isDecoded[ x >> 2 ][ y >> 2 ] = 0<br>} | |

**BufWidth is equal to (CtbSizeY ==128)?192:(128\*128 /CtbSizeY) and BufHeight is equal to** CtbSizeY.

5.17 Embodiment #17

The changes in some examples are indicated in bolded, underlined, text in this document.

7.3.7 Slice Data Syntax
7.3.7.1 General Slice Data Syntax

| slice_data( ) {                                                                                  | Descriptor |
|--------------------------------------------------------------------------------------------------|------------|
| for( i = 0; i < NumBricksInCurrSlice; i++ ) {                                                    |            |
|   CtbAddrInBs = FirstCtbAddrBs[ SliceBrickIdx[ i ] ]                                             |            |
|   for( j = 0; j < NumCtusInBrick[ SliceBrickIdx[ i ] ]; j++, CtbAddrInBs++ )                     |            |
| {                                                                                                |            |
|     if( ( j % BrickWidth[ SliceBrickIdx[ i ] ] ) = = 0 ) {                                       |            |
|       NumHmvpCand = 0                                                                            |            |
|       NumHmvpIbcCand = 0                                                                         |            |
|       resetIbcBuf = 1                                                                        |            |
|     }                                                                                            |            |
|     CtbAddrInRs = CtbAddrBsToRs[ CtbAddrInBs ]                                                   |            |
|     coding_tree_unit( )                                                                          |            |
|     if( entropy_coding_sync_enabled_flag &&                                                      |            |
|         ( ( j + 1) % BrickWidth[ SliceBrickIdx[ i ] ] = = 0 ) ) {                                |            |
|       end_of_subset_one_bit /\* equal to 1 \*/                                               | ae(v)      |
|       if( j < NumCtusInBrick[ SliceBrickIdx[ i ] ] - 1 )                                         |            |
|         byte_alignment( )                                                                        |            |
|     }                                                                                            |            |
|   }                                                                                              |            |
|   if( !entropy_coding_sync_enabled_flag ) {                                                      |            |
|     end_of_brick_one_bit /\* equal to 1 \*/                                                  | ae(v)      |
|     if( i < NumBricksInCurrSlice - 1 )                                                           |            |
|       byte_alignment( )                                                                          |            |
|   }                                                                                              |            |
| }                                                                                                |            |
| }                                                                                                |            |

$CbWidth[x][y] = cbWidth$     (7-137)

$CbHeight[x][y] = cbHeight$     (7-138)

**Set vSize as min( ctbSize, 64 ) and wIbcBuf as (128\*128/ctbSize). The width and height of ibcBuf is wIbcBuf and ctbSize accordingly.**

If refreshIbcBuf is equal to 1, the following applies
    ibcBuf[ x % wIbcBuf ][ y % ctbSize ]
    = - 1, for x = x0..x0 + wIbcBuf - 1 and
    y = y0..y0 + ctbSize - 1
    resetIbcBuf = 0

When ( x0 % vSize ) is equal to 0 and ( y0 % vSize ) is equal to 0, for x = x0..x0 + vSize - 1 and y = y0..y0 +vSize - 1, the following applies
    ibcBuf[ x % wIbcBuf ][ y % ctbSize ] = - 1

7.4.8.5 Coding Unit Semantics

When all the following conditions are true, the history-based motion vector predictor list for the shared merging candidate list region is updated by setting NumHmvpSmrIbcCand equal to NumHmvpIbcCand, and setting HmvpSmrIbcCandList[i] equal to HmvpIbcCandList[i] for i=0 . . . NumHmvpIbcCand−1:

IsInSmr[x0][y0] is equal to TRUE.
  SmrX[x0][y0] is equal to x0.
  SmrY[x0][y0] is equal to y0.

The following assignments are made for x=x0 . . . x0+cbWidth−1 and y=y0 . . . y0+cbHeight−1:

$CbPosX[x][y] = x0$     (7-135)

$CbPosY[x][y] = y0$     (7-136)

8.6.2 Derivation Process for Motion Vector Components for IBC Blocks 8.6.2.1 General Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the luma motion vector in 1/16 fractional-sample accuracy mvL.

The luma motion vector mvL is derived as follows:
The derivation process for IBC luma motion vector prediction as specified in clause 8.6.2.2 is invoked with the luma location (xCb, yCb), the variables cbWidth and cbHeight inputs, and the output being the luma motion vector mvL.
When general_merge_flag[xCb][yCb] is equal to 0, the following applies:
1. The variable mvd is derived as follows:

$$mvd[0]=MvdL0[xCb][yCb][0] \quad (8\text{-}883)$$

$$mvd[1]=MvdL0[xCb][yCb][1] \quad (8\text{-}884)$$

2. The rounding process for motion vectors as specified in clause 8.5.2.14 is invoked with mvX set equal to mvL, rightShift set equal to MvShift+2, and leftShift set equal to MvShift+2 as inputs and the rounded mvL as output.
3. The luma motion vector mvL is modified as follows:

$$u[0]=(mvL[0]+mvd[0]+2^{18})\% \, 2^{18} \quad (8\text{-}885)$$

$$mvL[0]=(u[0]>=2^{17})?(u[0]2^{18}): u[0] \quad (8\text{-}886)$$

$$u[1]=(mvL[1]+mvd[1]+2^{18})\% \, 2^{18} \quad (8\text{-}887)$$

$$mvL[1]=(u[1]>=2^{17})?(u[1]-2^{18}): u[1] \quad (8\text{-}888)$$

NOTE 1—The resulting values of mvL[0] and mvL[1] as specified above will always be in the range of $-2^{17}$ to $2^{17}-1$, inclusive.

The updating process for the history-based motion vector predictor list as specified in clause 8.6.2.6 is invoked with luma motion vector mvL.

*It is a requirement of bitstream conformance that the luma block vector mvL shall obey the following constraints:*
  *((yCb + (mvL[ 1 ] >> 4 ) ) % wIbcBuf) +*
    *cbHeight is less than or equal to ctbSize*
  *For x = xCb..xCb + cbWidth - 1*
    *y = yCb..yCb +cbHeight - 1, ibcBuf[ ( x +*
    *(mvL[0]>>4) ) % wIbcBuf ][ ( y + (mvL[1]>>4))*
    *% ctbSize ] shall not be equal to -1.*

8.7.5 Picture reconstruction process
8.7.5.1 General
Inputs to this process are:
a location (xCurr, yCurr) specifying the top-left sample of the current block relative to the top-left sample of the current picture component,
the variables nCurrSw and nCurrSh specifying the width and height, respectively, of the current block,
a variable cIdx specifying the colour component of the current block,
an (nCurrSw)×(nCurrSh) array predSamples specifying the predicted samples of the current block,
an (nCurrSw)×(nCurrSh) array resSamples specifying the residual samples of the current block.
Output of this process *are* a reconstructed picture sample array recSamples *and an IBC buffer array ibcBuf.*
Depending on the value of the colour component cIdx, the following assignments are made:

If cIdx is equal to 0, recSamples corresponds to the reconstructed picture sample array SL and the function clipCidx1 corresponds to $Clip1_Y$.
Otherwise, if cIdx is equal to 1, tuCbfChroma is set equal to tu_cbf_cb[xCurr][yCurr], recSamples corresponds to the reconstructed chroma sample array $S_{Cb}$ and the function clipCidx1 corresponds to $Clip1_C$.
Otherwise (cIdx is equal to 2), tuCbfChroma is set equal to tu_cbf_cr[xCurr][yCurr], recSamples corresponds to the reconstructed chroma sample array $S_{Cr}$ and the function clipCidx1 corresponds to $Clip1_C$.
Depending on the value of slice_lmcs_enabled_flag, the following applies:
If slice_lmcs_enabled_flag is equal to 0, the (nCurrSw)× (nCurrSh) block of the reconstructed samples recSamples at location (xCurr, yCurr) is derived as follows for i=0 . . . nCurrSw−1, j=0 . . . nCurrSh−1:

$$recSamples[xCurr+i][yCurr+j]=clipCidx1(pred\text{-}Samples[i][j]+resSamples[i][j]) \quad (8\text{-}992)$$

Otherwise (slice_lmcs_enabled_flag is equal to 1), the following applies:
If cIdx is equal to 0, the following applies:
The picture reconstruction with mapping process for luma samples as specified in clause 8.7.5.2 is invoked with the luma location (xCurr, yCurr), the block width nCurrSw and height nCurrSh, the predicted luma sample array predSamples, and the residual luma sample array resSamples as inputs, and the output is the reconstructed luma sample array recSamples.
Otherwise (cIdx is greater than 0), the picture reconstruction with luma dependent chroma residual scaling process for chroma samples as specified in clause 8.7.5.3 is invoked with the chroma location (xCurr, yCurr), the transform block width nCurrSw and height nCurrSh, the coded block flag of the current chroma transform block tuCbfChroma, the predicted chroma sample array predSamples, and the residual chroma sample array resSamples as inputs, and the output is the reconstructed chroma sample array recSamples.

*After decoding the current coding unit, the following applies:*
  *ibcBuf[ ( xCurr + i ) % wIbcBuf ][*
    *( yCurr + j ) % ctbSize ] =*
    *recSamples[ xCurr + i ][ yCurr + j ]*
  *for i = 0..nCurrSw - 1, j = 0..nCurrSh - 1.*

5.18 Embodiment #18

The changes in some examples are indicated in bolded, underlined, italicized text in this document.
7.3.7 Slice Data Syntax
7.3.7.1 General Slice Data Syntax

| | Descriptor |
|---|---|
| slice_data( ) { | |
|   for( i = 0; i < NumBricksInCurrSlice; i++ ) { | |
|     CtbAddrInBs = FirstCtbAddrBs[ SliceBrickIdx[ i ] ] | |
|     for( j = 0; j < NumCtusInBrick[ SliceBrickIdx[ i ] ]; j++, CtbAddrInBs++ | |
|   ) { | |
|       if( ( j % BrickWidth[ SliceBrickIdx[ i ] ] ) = = 0 ) { | |
|         NumHmvpCand = 0 | |

```
      NumHmvpIbcCand = 0
      resetIbcBuf = 1
    }
    CtbAddrInRs = CtbAddrBsToRs[ CtbAddrInBs ]
    coding_tree_unit( )
    if( entropy_coding_sync_enabled_flag &&
        ( ( j + 1 ) % BrickWidth[ SliceBrickIdx[ i ] ] = = 0 ) ) {
      end_of_subset_one_bit /* equal to 1 */                          ae(v)
      if( j < NumCtusInBrick[ SliceBrickIdx[ i ] ] - 1 )
        byte_alignment( )
    }
  }
  if( !entropy_coding_sync_enabled_flag ) {
    end_of_brick_one_bit /* equal to 1 */                             ae(v)
    if( i < NumBricksInCurrSlice - 1 )
      byte_alignment( )
  }
 }
}
```

7.4.8.5 Coding Unit Semantics

When all the following conditions are true, the history-based motion vector predictor list for the shared merging candidate list region is updated by setting NumHmvpSmrIbcCand equal to NumHmvpIbcCand, and setting HmvpSmrIbcCandList[i] equal to HmvpIbcCandList[i] for i=0 . . . NumHmvpIbcCand−1:

IsInSmr[x0][y0] is equal to TRUE.
SmrX[x0][y0] is equal to x0.
SmrY[x0][y0] is equal to y0.

The following assignments are made for x=x0 . . . x0+cbWidth−1 and y=y0 . . . y0+cbHeight−1:

$$CbPosX[x][y]=x0 \quad (7\text{-}135)$$

$$CbPosY[x][y]=y0 \quad (7\text{-}136)$$

$$CbWidth[x][y]=cbWidth \quad (7\text{-}137)$$

$$CbHeight[x][y]=cbHeight \quad (7\text{-}138)$$

Set vSize as min( ctbSize, 64 )
**and wIbcBufY as (128\*128/CtbSizeY).**
ibcBuf$_L$ is an array with width being
wIbcBufY and height being CtbSizeY.
ibcBuf$_{Cb}$ and ibcBuf$_{Cr}$ are arrays with width
being wIbcBufC =(wIbcBufY/SubWidthC) and
height being (CtbSizeY/SubHeightC), i.e. CtbSizeC.
If resetIbcBuf is equal to 1, the following applies
  ibcBuf$_L$[ x % xIbcBufY ][ y % CtbSizeY ] =
  − 1, for x = x0..x0 + wIbcBufY − 1 and
  y = y0..y0 + CtbSizeY − 1
  ibcBuf$_{Cb}$[ x % xIbcBufC ][ y % CtbSizeC ] =
  − 1, for x = x0..x0 + wIbcBufC − 1 and
  y = y0..y0 + CtbSizeC − 1
  ibcBuf$_{Cr}$[ x % wIbcBufC ][ y % CtbSizeC ] = − 1,
  for x = x0..x0 + wIbcBufC − 1 and
  y = y0..y0 + CtbSizeC − 1
resetIbcBuf = 0
When ( x0 % vSizeY ) is equal to 0 and ( y0 % vSizeY )
is equal to 0, the following appliess
  ibcBuf$_L$[ x % wIbcBufY ][ y % CtbSizeY ] =
  ] = − 1, for x = x0..x0 + vSize −1 and
  y = y0..y0 + vSize − 1
  ibcBuf$_{Cb}$[ x % wIbcBufC ][ y % CtbSizeC ]
  = − 1, for x = x0/SubWidthC..x0/
  SubWidthC + vSize/ SubWidthC − 1 and
  y = y0/SubHeightC..y0/Sub
  HeightC + vSize/SubHeightC − 1
  ibcBuf$_{Cr}$[ x % wIbcBufC ][ y % CtbSizeC ]
  = − 1, for x = x0/SubWidthC..x0/SubWidthC..x0/
  SubWidthC + vSize/ SubWidthC − 1 and
  y = y0/SubHeightC..y0/SubHeightC
  + vSize/SubHeightC − 1

8.6.2 Derivation Process for Motion Vector Components for IBC Blocks

8.6.2.1 General

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma motion vector in 1/16 fractional-sample accuracy mvL.

The luma motion vector mvL is derived as follows:
The derivation process for IBC luma motion vector prediction as specified in clause 8.6.2.2 is invoked with the luma location (xCb, yCb), the variables cbWidth and cbHeight inputs, and the output being the luma motion vector mvL.

When general_merge_flag[xCb][yCb] is equal to 0, the following applies:
4. The variable mvd is derived as follows:

$$mvd[0]=MvdL0[xCb][yCb][0] \quad (8\text{-}883)$$

$$mvd[1]=MvdL0[xCb][yCb][1] \quad (8\text{-}884)$$

5. The rounding process for motion vectors as specified in clause 8.5.2.14 is invoked with mvX set equal to mvL, rightShift set equal to MvShift+2, and leftShift set equal to MvShift+2 as inputs and the rounded mvL as output.
6. The luma motion vector mvL is modified as follows:

$$u[0]=(mvL[0]+mvd[0]+2^{18})\% \, 2^{18} \quad (8\text{-}885)$$

$$mvL[0]=(u[0]>=2^{17})?(u[0]-2^{18}):u[0] \quad (8\text{-}886)$$

$$u[1]=(mvL[1]+mvd[1]+2^{18})\% \, 2^{18} \quad (8\text{-}887)$$

$$mvL[1]=(u[1]>=2^{17})?(u[1]-2^{18}):u[1] \quad (8\text{-}888)$$

NOTE 1 The resulting values of mvL[0] and mvL[1] as specified above will always be in the range of $2^{17}$ to $2^{17}$ 1, inclusive.

The updating process for the history-based motion vector predictor list as specified in clause 8.6.2.6 is invoked with luma motion vector mvL.

*Clause 8.6.2.5 is invoked with mvL as input and mvC as output.*
*It is a requirement of bitstream conformance that the luma block vector mvL shall obey the following constraints:*
*((yCb + (mvL[ 1 ] >> 4 ) ) % CtbSizeY )*
*+ cbHeight is less than or equal to CtbSizeY*
*For x = xC..xCb + cbWidth - 1 and*
*y = yCb..yCb + cbHeight - 1, ibcBuf<sub>L</sub>[ (x + (mvL[0]>>4)) % wIbcBufY ][ (y +(mvL[1]>>4)) % CtbSizeY ] shall not be equal to -1.*
*If treeType is equal to SINGLE TREE,*
*for x = xCb..xCb + cbWidth - 1 and*
*y = yCb..yCb + cbHeight - 1, ibcBuf<sub>Cb</sub>[ (x + (mvC[0]>>5)) % wIbcBufC ][ ( y +(mvC[1]>>5)) % CtbSizeC]*
*] shall not be equal to - 1.*

8.6.3 Decoding Process for ibc Blocks
8.6.3.1 General

This process is invoked when decoding a coding unit coded in ibc prediction mode.

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
colour component index of the current block.
*the motion vector mv,*
*an (wIbcBufY)x(CtbSizeY) array ibcBuf<sub>L</sub>,*
*an (wIbcBufC)x(CtbSizeC) array ibcBuf<sub>Cb</sub>, an (wIbcBufC)x(CtbSizeC) array ibcBuf<sub>Cr</sub>.*

Outputs of this process are:
an array predSamples of prediction samples.
*For x = xCB..xCb + Width - 1 and y = yCb..yCb + Height - 1, the following applies If cIdx is qual to 0*
*predSamples[ x ][ y ] = ibcBuf<sub>L</sub>[ ( x + mv[ 0 ] >> 4 )) % wIbcBufY ][ ( y + (mv[ 1 ] >> 4)) % CtbSizeY ]*
*if cIdx is equal to 1*
*predSamples[ x ][ y ] = ibcBuf<sub>Cb</sub>[ ( x + mv[ 0 ] >> 5 )) % wIbcBufC ][ ( y + (mv[ 1 ] >> 5)) % CtbSizeC ]*
*if cIdx is equal to 2*
*predSamples[ x ][ y ] = Buf<sub>Cr</sub>[ ( x + mv[ 0 ] >> 5 )) % wIbcBufC ][ ( y + (mv[ 1 ] >> 5)) % CtbSizeC ]*

8.7.5 Picture Reconstruction Process
8.7.5.1 General

Inputs to this process are:
a location (xCurr, yCurr) specifying the top-left sample of the current block relative to the top-left sample of the current picture component,
the variables nCurrSw and nCurrSh specifying the width and height, respectively, of the current block,
a variable cIdx specifying the colour component of the current block,
an (nCurrSw)×(nCurrSh) array predSamples specifying the predicted samples of the current block,
an (nCurrSw)×(nCurrSh) array resSamples specifying the residual samples of the current block.

Output of this process *are* a reconstructed picture sample array recSamples *and IBC buffer arrays ibcBuf<sub>L</sub>, ibcBuf<sub>Cb</sub>, ibcBuf<sub>Cr</sub>.*

Depending on the value of the colour component cIdx, the following assignments are made:
If cIdx is equal to 0, recSamples corresponds to the reconstructed picture sample array $S_L$ and the function clipCidx1 corresponds to $Clip1_Y$.
Otherwise, if cIdx is equal to 1, tuCbfChroma is set equal to tu_cbf_cb[xCurr][yCurr], recSamples corresponds to the reconstructed chroma sample array $S_{Cb}$ and the function clipCidx1 corresponds to $Clip1_C$.
Otherwise (cIdx is equal to 2), tuCbfChroma is set equal to tu_cbf_cr[xCurr][yCurr], recSamples corresponds to the reconstructed chroma sample array $S_{Cr}$ and the function clipCidx1 corresponds to $Clip1_C$.

Depending on the value of slice_lmcs_enabled_flag, the following applies:
If slice_lmcs_enabled_flag is equal to 0, the (nCurrSw)×(nCurrSh) block of the reconstructed samples recSamples at location (xCurr, yCurr) is derived as follows for i=0 . . . nCurrSw−1, j=0 . . . nCurrSh−1:

recSamples[xCurr+i][yCurr+j]=clipCidx1(pred-
  Samples[i][j]+resSamples[i][j])         (8-992)

Otherwise (slice_lmcs_enabled_flag is equal to 1), the following applies:
If cIdx is equal to 0, the following applies:
The picture reconstruction with mapping process for luma samples as specified in clause 8.7.5.2 is invoked with the luma location (xCurr, yCurr), the block width nCurrSw and height nCurrSh, the predicted luma sample array predSamples, and the residual luma sample array resSamples as inputs, and the output is the reconstructed luma sample array recSamples.
Otherwise (cIdx is greater than 0), the picture reconstruction with luma dependent chroma residual scaling process for chroma samples as specified in clause 8.7.5.3 is invoked with the chroma location (xCurr, yCurr), the transform block width nCurrSw and height nCurrSh, the coded block flag of the current chroma transform block tuCbfChroma, the predicted chroma sample array predSamples, and the residual chroma sample array resSamples as inputs, and the output is the reconstructed chroma sample array recSamples.

*After decoding the current coding unit, the following may apply:*
*If cIdx is equal to 0, and if treeType is equal to SINGLE_TREE or DUAL_TREE_LUMA, the following applies*
*ibcBuf<sub>L</sub>[ ( xCurr + i ) % wIbcBufY ][ ( yCurr + j ) % CtbSizeY ] = recSamples[ xCurr + i][ yCurr + j ]*
*for i = 0..nCurrSw - 1, j = 0..nCurrSh - 1.*
*If cIdx is equal to 1, and if treeType is equal to SINGLE _TREE or DUAL_TREE_CHROMA, the following applies*
*ibcBuf<sub>Cb</sub>[ ( xCurr + i ) % wIbcBufC ][ ( yCurr + j ) % CtbSizeC ] = recSamples[ xCurr + i ][ yCurr + j ]*
*for i = 0..nCurrSw - 1, j = 0..nCurrSh - 1.*

*If cIdx is equal to 2, and if treeType is equal to SINGLE TREE or DUAL_TREE_CHROMA, the following applies*
*ibcBuf$_{Cr}$[ ( xCurr + i ) % wIbcBufC ][ ( yCurr + j ) % CtbSizeC ] = RecSamples[ xCurr + i ][ yCurr + j ] for i = 0..nCurrSw - 1, j = 0..nCurrSh - 1.*

5.19 Embodiment #19

The changes in some examples are indicated in bolded, underlined, text in this document.
7.3.7 Slice Data Syntax
7.3.7.1 General Slice Data Syntax

| slice_data( ) { | Descriptor |
|---|---|
|   for( i = 0; i < NumBricksInCurrSlice; i++ ) { | |
|     CtbAddrInBs = FirstCtbAddrBs[ SliceBrickIdx[ i ] ] | |
|     for( j = 0; j < NumCtusInBrick[ SliceBrickIdx[ i ] ] ; j++, CtbAddrInBs++ | |
|   ) { | |
|       if( ( j % BrickWidth+ SliceBrickIdx[ i ] ] ) = = 0 ) { | |
|         NumHmvpCand = 0 | |
|         NumHmvpIbcCand = 0 | |
|         _resetIbcBuf = 1_ | |
|       } | |
|       CtbAddrInRs = CtbAddrBsToRs[ CtbAddrInBs ] | |
|       coding_tree_unit( ) | |
|       if( entropy_coding_sync_enabled_flag && | |
|         ( ( j + 1) % BrickWidth[ SliceBrickIdx[ i ] ] = = 0 ) ) { | |
|         end_of_subset_one_bit /* equal to 1 */ | ae(v) |
|         if( j < NumCtusInBrick[ SliceBrickIdx[ i ] ] - 1 ) | |
|           byte_alignment( ) | |
|       } | |
|     } | |
|     if( !entropy_coding_sync_enabled_flag ) { | |
|       end_of_brick_one_bit /* equal to 1 */ | ae(v) |
|       if( i < NumBricksInCurrSlice - 1 ) | |
|         byte_alignment( ) | |
|     } | |
|   } | |
| } | |

7.4.8.5 Coding Unit Semantics

When all the following conditions are true, the history-based motion vector predictor list for the shared merging candidate list region is updated by setting NumHmvpSmrIbcCand equal to NumHmvpIbcCand, and setting HmvpSmrIbcCandList[i] equal to HmvpIbcCandList[i] for i=0 . . . NumHmvpIbcCand−1:

IsInSmr[x0][y0] is equal to TRUE.
SmrX[x0][y0] is equal to x0.
SmrY[x0][y0] is equal to y0.

The following assignments are made for x=x0 . . . x0+cbWidth−1 and y=y0 . . . y0+cbHeight−1:

CbPosX[x][y]=x0    (7-135)

CbPosY[x][y]=y0    (7-136)

CbWidth[x][y]=cbWidth    (7-137)

CbHeight[x][y]=cbHeight    (7-138)

*Set vSize as min( ctbSize, 64 ) and wIbcBufY as (128\*128/CtbSizeY).*
*ibcBuf$_L$ is a array with width being wIbcBufY and height being CtbSizeY.*
*ibcBuf$_{Cb}$ and ibcBuf$_{Cr}$ are arrays with width being wIbcBufC =(wIbcBufY/SubWidthC) and height being (CtbSizeY/SubHeightC), i.e. CtbSizeC.*

*If resetIbcBuf is equal to 1, the following applies*
*ibcBuf$_L$[ x % wIbcBufY ][ y % CtbSizeY ] = − 1,*
*for x = x0..x0 + wIbcBufY − 1 and*
*y = y0..y0 + CtbSizeY − 1*
*ibcBuf$_{Cb}$[ x % wIbcBufC ][ y % CtbSizeC ] = − 1,*
*for x = x0..x0 + wIbcBufC − 1 and*
*y = y0..y0 + CtbSizeC − 1*
*ibcBuf$_{Cr}$[ x % wIbcBufC ][ y % CtbSizeC ] = − 1, for x = x0..x0 + wIbcBufC − 1 and*
*y = y0..y0 + CtbSizeC − 1*
*resetIbcBuf = 0*
*When ( x0 % vSizeY ) is equal to 0 and ( y0 % vSizeY ) is equal to 0, the following applies*
*ibcBuf$_L$[ x % wIbcBufY ][ y % CtbSizeY ] = − 1, for x = x0..x0 + min(vSize, cbWidth) − 1 and y = y0..y0 + min(vSize, cbHeight)− 1*
*ibcBuf$_{Cb}$[ x % wIbcBufC ][ y % CtbSizeC ] = − 1, for x = x0/SubWidthC..x0/ SubWidthC + min(vSize/ SubWidthC, CbWidth) − 1 and*
*y = y0/SubHeightC..y0/SubHeightC + min (vSize/SubHeightC, cbHeight) − 1*
*ibcBuf$_{Cr}$[ x % wIbcBufC ][ y % CtbSizeC ] = − 1, for x = x0/SubWidthC..x0/ SubWidthC + min(vSize/ SubWidthC, CbWidth) − 1 and*
*y = y0/SubHeightC..y0/SubHeightC + min(vSize/SubHeightC, cbHeight) − 1*

8.6.2 Derivation Process for Motion Vector Components for IBC Blocks 8.6.2.1 General Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma motion vector in 1/16 fractional-sample accuracy mvL.

The luma motion vector mvL is derived as follows:
The derivation process for IBC luma motion vector prediction as specified in clause 8.6.2.2 is invoked with the luma location (xCb, yCb), the variables cbWidth and cbHeight inputs, and the output being the luma motion vector mvL.
When general_merge_flag[xCb][yCb] is equal to 0, the following applies:
7. The variable mvd is derived as follows:

$$mvd[0]=MvdL0[xCb][yCb][0] \quad (8\text{-}883)$$

$$mvd[1]=MvdL0[xCb][yCb][1] \quad (8\text{-}884)$$

8. The rounding process for motion vectors as specified in clause 8.5.2.14 is invoked with mvX set equal to mvL, rightShift set equal to MvShift+2, and leftShift set equal to MvShift+2 as inputs and the rounded mvL as output.
9. The luma motion vector mvL is modified as follows:

$$u[0]=(mvL[0]+mvd[0]+2^{18})\% \ 2^{18} \quad (8\text{-}885)$$

$$mvL[0]=(u[0]>=2^{17})?(u[0]-2^{18}): u[0] \quad (8\text{-}886)$$

$$u[1]=(mvL[1]+mvd[1]+2^{18})\% \ 2^{18} \quad (8\text{-}887)$$

$$mvL[1]=(u[1]>=2^{17})?(u[1]-2^{18}): u[1] \quad (8\text{-}888)$$

NOTE 1 The resulting values of mvL[0] and mvL[1] as specified above will always be in the range of $-2^{17}$ to $2^{17}-1$, inclusive.
The updating process for the history-based motion vector predictor list as specified in clause 8.6.2.6 is invoked with luma motion vector mvL.

*Clause 8.6.2.5 is invoked with mvL*
*as input and mvC as output.*
*It is a requirement of bitstream conformance*
*that the luma block vector mvL shall obey the*
*following constraints:*
   *((yCb + ( mvL[ 1 ] >> 4 ) ) % CtbSizeY ) +*
      *cbHeight is less than or equal to CtbSizeY*
   *For  x = xCb..xCb + cbWidth − 1  and*
      *y = yCb..yCb + cbHeight − 1,  ibcBuf_L[ (x +*
      *(mvL[0]>>4)) % wIbcBufY ][ ( y +(mvL[1]>>4))*
      *% CtbSizeY ] shall not be equal to −1.*
   *If  treeType  is  equal  to  SINGLE TREE,*
      *for  x = xCb..xCb + cbWidth − 1  and*
      *y = yCb..yCb + cbHeight − 1,  ibcBuf_Cb[ (x +*
      *(mvC[0]>>5))  %  wIbcBufC  ][  ( y*
      *+(mvC[1]>>5)) % CtbSizeC]*
      *] shall not be equal to -1.*

8.6.3 Decoding Process for ibc Blocks
8.6.3.1 General
This process is invoked when decoding a coding unit coded in ibc prediction mode.
Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  *a variable cIdx specifying the colour*
      *component index of the current block,*
  *the motion vector mv,*
  *an (wIbcBufY)x(CtbSizeY) array ibcBuf_L,*
      *an (wIbcBufC)x(CtbSizeC) array ibcBuf_Cb, an*
      *(wIbcBufC)x(CtbSizeC) array ibcBuf_Cr.*
*Outputs of this process are:*
  *an array predSamples of prediction samples.*

*For x = xCb.. xCb+ Width − 1 and y = yCb..*
*yCb + Height  − 1, the following applies*
*If cIdx is qual to 0*
   *predSamples[ x ][ y ] = ibcBuf_L*
   *[ ( x + mv[ 0 ] >> 4 ))* *% wIbcBufY ][ ( y + (mv[ 1 ] >> 4)) %*
   *CtbSizeY ]*
*if cIdx is equal to 1*
   *predSamples[ x ][ y ] = ibc*
   *Buf_Cb[ ( x + mv[ 0 ] >> 5 ))* *% wIbcBufC ][ ( y + (mv[ 1 ] >> 5)) %*
   *CtbSizeC ]*
*if cIdx is equal to 2*
   *predSamples[ x ][ y ] = ibc*
   *Buf_Cr[ ( x + mv[ 0 ] >> 5 ))* *% wIbcBufC ][ ( y + (mv[ 1 ] >> 5)) %*
   *CtbSizeC ]*

8.7.5 Picture Reconstruction Process
8.7.5.1 General
  Inputs to this process are:
  a location (xCurr, yCurr) specifying the top-left sample of the current block relative to the top-left sample of the current picture component,
  the variables nCurrSw and nCurrSh specifying the width and height, respectively, of the current block,
  a variable cIdx specifying the colour component of the current block,
  an (nCurrSw)×(nCurrSh) array predSamples specifying the predicted samples of the current block,
  an (nCurrSw)×(nCurrSh) array resSamples specifying the residual samples of the current block.
Output of this process are a reconstructed picture sample array recSamples and IBC buffer arrays ibcBuf$_L$, ibcBuf$_{Cb}$, ibcBuf$_{Cr}$.
Depending on the value of the colour component cIdx, the following assignments are made:
  If cIdx is equal to 0, recSamples corresponds to the reconstructed picture sample array S$_L$ and the function clipCidx1 corresponds to Clip1$_Y$.
  Otherwise, if cIdx is equal to 1, tuCbfChroma is set equal to tu_cbf_cb[xCurr][yCurr], recSamples corresponds to the reconstructed chroma sample array S$_{Cb}$ and the function clipCidx1 corresponds to Clip1$_C$.
  Otherwise (cIdx is equal to 2), tuCbfChroma is set equal to tu_cbf_cr[xCurr][yCurr], recSamples corresponds to the reconstructed chroma sample array S$_{Cr}$ and the function clipCidx1 corresponds to Clip1$_C$.
Depending on the value of slice_lmcs_enabled_flag, the following applies:
  If slice_lmcs_enabled_flag is equal to 0, the (nCurrSw)× (nCurrSh) block of the reconstructed samples recSamples at location (xCurr, yCurr) is derived as follows for i=0 . . . nCurrSw−1, j=0 . . . nCurrSh−1:

$$recSamples[xCurr+i][yCurr+j]=clipCidx1(predSamples[i][j]+resSamples[i][j]) \quad (8\text{-}992)$$

Otherwise (slice_lmcs_enabled_flag is equal to 1), the following applies:
    If cIdx is equal to 0, the following applies:
      The picture reconstruction with mapping process for luma samples as specified in clause 8.7.5.2 is invoked with the luma location (xCurr, yCurr), the block width nCurrSw and height nCurrSh, the predicted luma sample array predSamples, and the residual luma sample array resSamples as inputs, and the output is the reconstructed luma sample array recSamples.

Otherwise (cIdx is greater than 0), the picture reconstruction with luma dependent chroma residual scaling process for chroma samples as specified in clause 8.7.5.3 is invoked with the chroma location (xCurr, yCurr), the transform block width nCurrSw and height nCurrSh, the coded block flag of the current chroma transform block tuCbfChroma, the predicted chroma sample array predSamples, and the residual chroma sample array resSamples as inputs, and the output is the reconstructed chroma sample array recSamples.

*After decoding the current coding unit, the following may apply:*

*If cIdx is equal to 0, and if treeType is equal to SINGLE_TREE or DUAL_TREE_LUMA, the following applies*

*ibcBuf$_L$[ ( xCurr + i ) % wIbcBufY ][ ( yCurr + j ) % CtbSizeY ] = recSamples[ xCurr + i ][ yCurr + j ]*

*for i = 0..nCurrSw − 1, j = 0..nCurrSh − 1.*

*If cIdx is equal to 1, and if treeType is equal to SINGLE_TREE or DUAL_TREE_CHROMA, the following applies*

*ibcBuf$_{Cb}$[ ( xCurr + i ) % wIbcBufC ][ ( yCurr + j ) % CtbSizeC ] = recSamples[ xCurr + i ][ yCurr + j ]*

*for i = 0..nCurrSw − 1, j = 0..nCurrSh − 1.*

*If cIdx is equal to 2, and if treeType is equal to SINGLE_TREE or DUAL_TREE_CHROMA, the following applies*

*ibcBuf$_{Cr}$[ ( xCurr + i ) % wIbcBufC ][ ( yCurr + j ) % CtbSizeC ] = recSamples[ xCurr + i ][ yCurr + j ]*

*for i = 0..nCurrSw − 1, j = 0..nCurrSh − 1.*

5.20 Embodiment #20

The changes in some examples are indicated in bolded, underlined, italicized text in this document.

7.3.7 Slice Data Syntax
7.3.7.1 General Slice Data Syntax

```
slice_data( ) {                                                              Descriptor
  for( i = 0; i < NumBricksInCurrSlice; i++ ) {
    CtbAddrInBs = FirstCtbAddrBs[ SliceBrickIdx[ i ] ]
    for( j = 0; j < NumCtusInBrick[ SliceBrickIdx[ i ] ] ; j++, CtbAddrInBs++
    ) {
      if( ( j % BrickWidth[ SliceBrickIdx[ i ] ] ) = = 0 ) {
        NumHmvpCand = 0
        NumHmvpIbcCand = 0
        resetIbcBuf = 1
      }
      CtbAddrInRs = CtbAddrBsToRs[ CtbAddrInBs ]
      coding_tree_unit( )
      if( entropy_coding_sync_enabled_flag &&
          ( ( j + 1) % BrickWidth[ SliceBrickIdx[ i ] ] = = 0 ) ) {
        end_of_subset_one_bit /* equal to 1 */                                ae(v)
        if( j < NumCtusInBrick[ SliceBrickIdx[ i ] − 1 )
          byte_alignment( )
      }
    }
    if( !entropy_coding_sync_enabled_flag ) {
      end_of_brick_one_bit /* equal to 1 */                                   ae(v)
      if( i < NumBricksInCurrSlice − 1 )
        byte_alignment ( )
    }
  }
}
```

7.4.8.5 Coding Unit Semantics

When all the following conditions are true, the history-based motion vector predictor list for the shared merging candidate list region is updated by setting NumHmvpSmrIbcCand equal to NumHmvpIbcCand, and setting HmvpSmrIbcCandList[i] equal to HmvpIbcCandList[i] for i=0 . . . NumHmvpIbcCand−1:

IsInSmr[x0][y0] is equal to TRUE.
SmrX[x0][y0] is equal to x0.
SmrY[x0][y0] is equal to y0.

The following assignments are made for x=x0 . . . x0+cbWidth−1 and y=y0 . . . y0+cbHeight−1:

$$CbPosX[x][y] = x0 \quad (7\text{-}135)$$

$$CbPosY[x][y] = y0 \quad (7\text{-}136)$$

$$CbWidth[x][y] = cbWidth \quad (7\text{-}137)$$

$$CbHeight[x][y] = cbHeight \quad (7\text{-}138)$$

*Set vSize as min( ctbSize, 64 ) and wIbcBufY as (128\*128/CtbSizeY).*
*ibcBuf$_L$ is a array with width being wIbc BufY and height being CtbSizeY.*
*ibcBuf$_{Cb}$ and ibcBuf$_{Cr}$ are arrays with width being wIbcBufC =(wIbcBufY/SubWidthC) and height being (CtbSizeY/SubHeightC), i.e. CtbSizeC.*

*If resetIbcBuf is equal to 1, the following applies*

*ibcBuf$_L$[ x % wIbcBufY ][ y % CtbSizeY ] = − 1, for x = x0..x0 + wIbcBufY − 1 and y = y0..y0 + CtbSizeY − 1*

*ibcBuf$_{Cb}$[ x % wIbcBufC ][ y % CtbSizeC ] = − 1, for x = x0..x0 + wIbcBufC − 1 and y = y0..y0 + CtbSizeC − 1*

*ibcBuf$_{Cr}$[ x % wIbcBufC ][ y % CtbSizeC ] = − 1, for x = x0..x0 + wIbcBufC − 1 and y = y0..y0 + CtbSizeC − 1*

*resetIbcBuf = 0*
*When ( x0 % vSizeY ) is equal to 0 and ( y0 % vSizeY )*
*is equal to 0, the following applies*
   *ibcBuf$_L$[ x % wIbcBufY ][ y % CtbSizeY ]*
     *= − 1, for x = x0..x0 + max(vSize, cbWidth)*
     *− 1 and y = y0..y0 + max(vSize, cbHeight)− 1*
   *ibcBuf$_{Cb}$[ x % wIbcBufC ][ y % CtbSizeC ]*
     *= − 1, for x = x0/SubWidthC..x0/*
     *SubWidthC + max(vSize/     SubWidthC,*
        *cbWidth)    − 1    and*
     *y = y0/SubHeightC..y0/SubHeightC +*
       *max(vSize/SubHeightC, cbHeight) − 1*
   *ibcBuf$_{Cr}$[ x % wIbcBufC ][ y % CtbSizeC*
     *] = − 1, for x = x0/SubWidthC..x0/*
     *SubWidthC + max(vSize/     SubWidthC,*
        *cbWidth)    − 1    and*
     *y = y0/SubHeightC..y0/SubHeightC +*
       *max(vSize/SubHeightC, cbHeight) − 1*

8.6.2 Derivation Process for Motion Vector Components for IBC Blocks 8.6.2.1 General Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are:

the luma motion vector in 1/16 fractional-sample accuracy mvL.

The luma motion vector mvL is derived as follows:

The derivation process for IBC luma motion vector prediction as specified in clause 8.6.2.2 is invoked with the luma location (xCb, yCb), the variables cbWidth and cbHeight inputs, and the output being the luma motion vector mvL.

When general_merge_flag[xCb][yCb] is equal to 0, the following applies:

10. The variable mvd is derived as follows:

$$mvd[0]=MvdL0[xCb][yCb][0] \quad (8\text{-}883)$$

$$mvd[1]=MvdL0[xCb][yCb][1] \quad (8\text{-}884)$$

11. The rounding process for motion vectors as specified in clause 8.5.2.14 is invoked with mvX set equal to mvL, rightShift set equal to MvShift+2, and leftShift set equal to MvShift+2 as inputs and the rounded mvL as output.

12. The luma motion vector mvL is modified as follows:

$$u[0]=(mvL[0]+mvd[0]+2^{18})\%\, 2^{18} \quad (8\text{-}885)$$

$$mvL[0]=(u[0]>=2^{17})?(u[0]-2^{18}): u[0] \quad (8\text{-}886)$$

$$u[1]=(mvL[1]+mvd[1]+2^{18})\%\, 2^{18} \quad (8\text{-}887)$$

$$mvL[1]=(u[1]>=2^{17})?(u[1]-2^{18}): u[1] \quad (8\text{-}888)$$

NOTE 1 The resulting values of mvL[0] and mvL[1] as specified above will always be in the range of $-2^{17}$ to $2^{17}-1$, inclusive.

The updating process for the history-based motion vector predictor list as specified in clause 8.6.2.6 is invoked with luma motion vector mvL.

*Clause 8.6.2.5 is invoked with mvL*
*as input and mvC as output.*
*It is a requirement of bitstream conformance*
*that the luma block vector mvL shall obey the*
*following constraints:*
   *((yCb + ( mvL[ 1 ] >> 4 ) ) % CtbSizeY ) +*
     *cbHeight is less than or equal to CtbSizeY*
   *For x = xCb..xCb + cbWidth - 1*
     *yCb..yCb + cbHeight - 1, ibcBuf$_L$[ (x +*
     *(mvL[0]>>4)) % wIbcBufY ][ ( y +(mv[1]>>4))*
     *% CtbSizeY ] shall not be equal to - 1.*

8.6.3 Decoding Process for ibc Blocks 8.6.3.1 General

This process is invoked when decoding a coding unit coded in ibc prediction mode.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, a variable cIdx specifying the colour component index of the current block.

*the motion vector mv,*
*an (wIbcBufY)x(CtbSizeY) array ibcBuf$_L$,*
*an (wIbcBufC)x(CtbSizeC) array ibcBuf$_{Cb}$, an*
*(wIbcBufC)x(CtbSizeC) array ibcBuf$_{Cr}$.*
*Outputs of this process are:*
*an array predSamples of prediction samples.*
*For x = xCb..xCb+ Width - 1 and y = yCb..*
*yCb + Height - 1, the following applies*
*If cIdx is qual to 0*
   *predSamples[ x ][ y ] = ibcBuf$_L$[ ( x + mv[ 0*
*] >> 4 )) % wIbcBufY ][ ( y + (mv[ 1 ] >> 4)) %*
*CtbSizeY ]*
*if cIdx is equal to 1*
   *predSamples[ x ][ y ] = ibcBuf$_{Cb}$[ ( x + mv[ 0*
*] >> 5 )) % wIbcBufC ][ ( y + (mv[ 1 ] >> 5 )) %*
*CtbSizeC ]*
*if cIdx is equal to 2*
   *predSamples[ x ][ y ] = ibcBuf$_{Cr}$[ ( x + mv[ 0*
*] >> 5 )) % wIbcBufC ][ ( y + (mv[ 1 ] >> 5)) %*
*CtbSizeC ]*

8.7.5 Picture Reconstruction Process 8.7.5.1 General

Inputs to this process are:

a location (xCurr, yCurr) specifying the top-left sample of the current block relative to the top-left sample of the current picture component, the variables nCurrSw and nCurrSh specifying the width and height, respectively, of the current block, a variable cIdx specifying the colour component of the current block, an (nCurrSw)×(nCurrSh) array predSamples specifying the predicted samples of the current block, an (nCurrSw)×(nCurrSh) array resSamples specifying the residual samples of the current block.

Output of this process are a reconstructed picture sample array recSamples and IBC buffer arrays ibcBuf$_L$, ibcBuf$_{Cb}$, ibcBuf$_{Cr}$.

Depending on the value of the colour component cIdx, the following assignments are made:

If cIdx is equal to 0, recSamples corresponds to the reconstructed picture sample array $S_L$ and the function clipCidx1 corresponds to Clip1$_Y$.

Otherwise, if cIdx is equal to 1, tuCbfChroma is set equal to tu_cbf_cb[xCurr][yCurr], recSamples corresponds to the reconstructed chroma sample array $S_{Cb}$ and the function clipCidx1 corresponds to Clip1$_C$.

Otherwise (cIdx is equal to 2), tuCbfChroma is set equal to tu_cbf_cr[xCurr][yCurr], recSamples corresponds to the reconstructed chroma sample array $S_{Cr}$ and the function clipCidx1 corresponds to Clip1$_C$.

Depending on the value of slice_lmcs_enabled_flag, the following applies:

If slice_lmcs_enabled_flag is equal to 0, the (nCurrSw)×(nCurrSh) block of the reconstructed samples recSamples at location (xCurr, yCurr) is derived as follows for i=0 . . . nCurrSw−1, j=0 . . . nCurrSh−1:

recSamples[xCurr+i][yCurr+j]=clipCidx1(predSamples[i][j]+resSamples[i][j])  (8-992)

Otherwise (slice_lmcs_enabled_flag is equal to 1), the following applies:

If cIdx is equal to 0, the following applies:

The picture reconstruction with mapping process for luma samples as specified in clause 8.7.5.2 is invoked with the luma location (xCurr, yCurr), the block width nCurrSw and height nCurrSh, the predicted luma sample array predSamples, and the residual luma sample array resSamples as inputs, and the output is the reconstructed luma sample array recSamples.

Otherwise (cIdx is greater than 0), the picture reconstruction with luma dependent chroma residual scaling process for chroma samples as specified in clause 8.7.5.3 is invoked with the chroma location (xCurr, yCurr), the transform block width nCurrSw and height nCurrSh, the coded block flag of the current chroma transform block tuCbfChroma, the predicted chroma sample array predSamples, and the residual chroma sample array resSamples as inputs, and the output is the reconstructed chroma sample array recSamples.

*After decoding the current coding unit, the following may apply:*
*If cIdx is equal to 0, and if treeType is equal to SINGLE_TREE or DUAL_TREE_LUMA, the following applies*
*ibcBuf$_L$[ ( xCurr + i ) % wIbcBufY ][ ( yCurr + j ) % CtbSizeY ] = recSamples[ xCurr + i ][ yCurr + j ]*
*for i = 0..nCurrSw - 1, j = 0..nCurrSh - 1.*
*If cIdx is equal to 1, and if treeType is equal to SINGLE_TREE or DUAL_TREE_CHROMA, the following applies*
*ibcBuf$_{Cb}$[ ( xCurr + i ) % wIbcBufC ][ ( yCurr + j ) % CtbSizeC ] = recSamples[ xCurr + i ][ yCurr + j ]*
*for i = 0..nCurrSw - 1, j = 0..nCurrSh - 1.*
*If cIdx is equal to 2, and if treeType is equal to SINGLE_TREE or DUAL_TREE_CHROMA, the following applies*
*ibcBuf$_{Cr}$[ ( xCurr + i ) ][ ( yCurr + j ) % CtbSizeC ] = recSamples[ xCurr + i ][ yCurr + j ]*
*for i = 0..nCurrSw - 1, j = 0..nCurrSh -1.*

Figure 6:
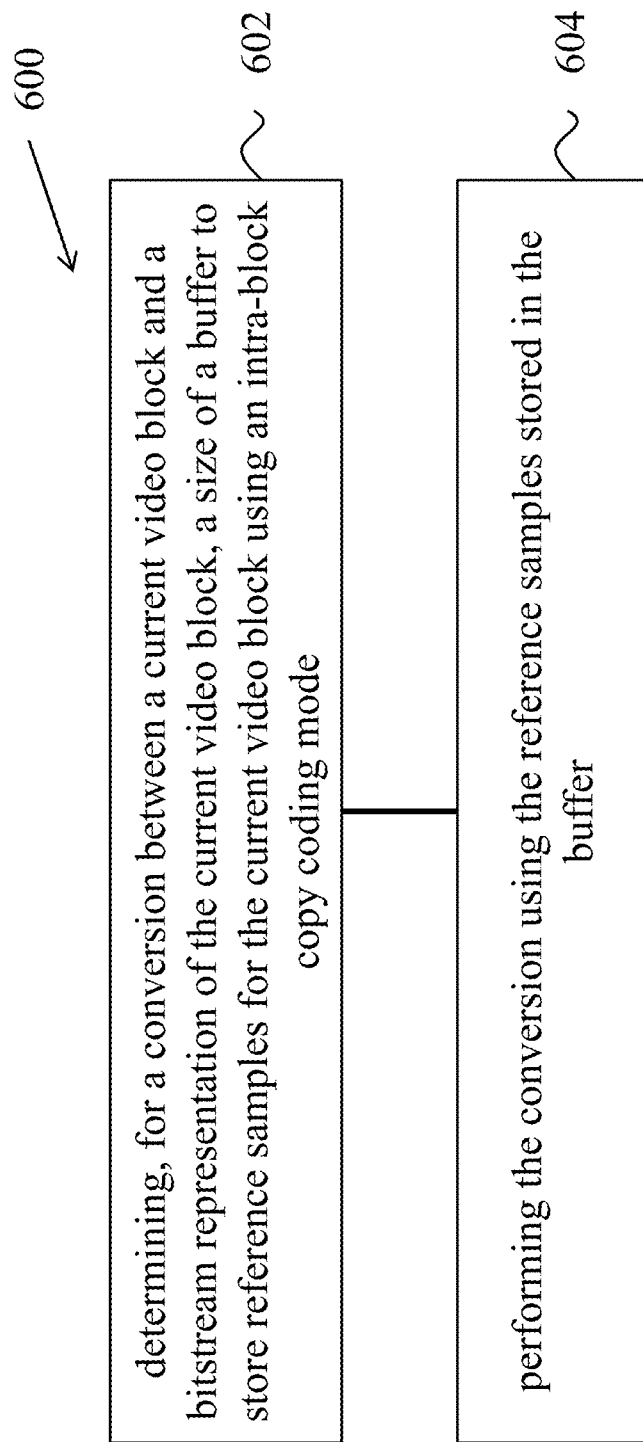
FIG. 6 is a flowchart of an example method of video or image processing.

FIG. 6 is a flowchart of an example method 600 of visual media (video or image) processing. The method 600 includes determining (602), for a conversion between a current video block and a bitstream representation of the current video block, a size of a buffer to store reference samples for the current video block using an intra-block copy coding mode, and performing (604) the conversion using the reference samples stored in the buffer.

The following clauses describe some example preferred features implemented by embodiments of method 600 and other methods. Additional examples are provided in Section 4 of the present document.

1. A method of video processing, comprising: determining, for a conversion between a current video block and a bitstream representation of the current video block, a size of a buffer to store reference samples for the current video block using an intra-block copy coding mode; and performing the conversion using the reference samples stored in the buffer.

2. The method of clause 1, wherein the size of the buffer is a predetermined constant.

3. The method of any of clauses 1-2, wherein the size is M×N, where M and N are integers.

4. The method of clause 3, wherein M×N is equal to 64×64 or 128×128 or 64×128.

5. The method of clause 1, wherein the size of the buffer is equal to a size of a coding tree unit of the current video block.

6. The method of clause 1, wherein the size of the buffer is equal to a size of a virtual pipeline data unit used during the conversion.

7. The method of clause 1, wherein the size of the buffer corresponds a field in the bitstream representation.

8. The method of clause 7, wherein the field is included in the bitstream representation at a video parameter set or sequence parameter set, or picture parameter set or a picture header or a slice header or a tile group header level.

9. The method of any of clauses 1-8, wherein the size of the buffer is different for reference samples for luma component and reference samples for chroma components.

10. The method of any of clauses 1-8, wherein the size of the buffer is dependent on chroma subsampling format of the current video block.

11. The method of any of clauses 1-8, wherein the reference samples are stored in RGB format.

12. The method of any of clauses 1-11, wherein the buffer is used for storing reconstructed samples before loop filtering and after loop filtering.

13. The method of clause 12, wherein loop filtering includes deblocking filtering or adaptive loop filtering (ALF) or sample adaptive offset (SAO) filtering.

14. A method of video processing, comprising: initializing, for a conversion between a current video block and a bitstream representation of the current video block, a buffer to store reference samples for the current video block using an intra-block copy coding mode using initial values for the reference samples; and performing the conversion using the reference samples stored in the buffer.

15. The method of clause 14, wherein the initial values correspond to a constant.

16. The method of any of clauses 14-15, wherein the initial values are a function of bit-depth of the current video block.

17. The method of clause 15, wherein the constant corresponds to a mid-grey value.

18. The method of clause 14, wherein the initial values correspond to pixel values of a previously decoded video block.

19. The method of clause 18, wherein the previously decoded video block corresponds to a decoded block prior to in-loop filtering.

20. The method of any of clauses 14-19, wherein a size of the buffer is at recited in one of clauses 1-13.

21. The method of any of clauses 1-20, wherein pixel locations within the buffer as addressed using x and y numbers.

22. The method of any of clauses 1-20, wherein pixel locations within the buffer as addressed using a single number that extends from 0 to M*N−1, where M and N are pixel width and pixel height of the buffer.

23. The method of any of clauses 1-20, wherein, the current bitstream representation includes a block vector for the conversion, wherein the block vector, denoted as (BVx, BVy) is equal to (x−x0,y−y0), where (x0, y0) correspond to an upper-left position of a coding tree unit of the current video block.

24. The method of any of clauses 1-20, wherein, the current bitstream representation includes a block vector for the conversion, wherein the block vector, denoted as (BVx, BVy) is equal to (x−x0+Tx,y−y0+Ty), where (x0, y0) correspond to an upper-left position of a coding tree unit of the current video block and wherein Tx and Ty are offset values.

25. The method of clause 24, wherein Tx and Ty are pre-defined offset values.

26. The method of any of clauses 1-20, wherein during the conversion, for a pixel at location (x0, y0) and having a block vector (BVx, BVy), a corresponding reference in the buffer is found at a reference location (x0+BVx, y0+BVy).

27. The method of clause 26, wherein in case that the reference location is outside the buffer, the reference in the buffer is determined by clipping at a boundary of the buffer.

28. The method of clause 26, wherein in case that the reference location is outside the buffer, the reference in the buffer is determined to have a predetermined value.

29. The method of any of clauses 1-20, wherein during the conversion, for a pixel at location (x0, y0) and having a block vector (BVx, BVy), a corresponding reference in the buffer is found at a reference location ((x0+BVx) mod M, (y0+BVy) mod N) where "mod" is modulo operation and M and N are integers representing x and y dimensions of the buffer.

30. A method of video processing, comprising: resetting, during a conversion between a video and a bitstream representation of the current video block, a buffer that stores reference samples for intra block copy coding at a video boundary; and performing the conversion using the reference samples stored in the buffer.

31. The method of clause 30, wherein the video boundary corresponds to a new picture or a new tile.

32. The method of clause 30, wherein the conversion is performed by updating, after the resetting, the buffer with reconstructed values of a Virtual Pipeline Data Unit (VPDU).

33. The method of clause 30, wherein the conversion is performed by updating, after the resetting, the buffer with reconstructed values of a coding tree unit.

34. The method of clause 30, wherein the resetting is performed at beginning of each coding tree unit row.

35. The method of clause 1, wherein the size of the buffer corresponds to L 64×64 previously decoded blocks, where L is an integer.

36. The method of any of clauses 1-35, wherein a vertical scan order is used for reading or storing samples in the buffer during the conversion.

37. A method of video processing, comprising: using, for a conversion between a current video block and a bitstream representation of the current video block, a buffer to store reference samples for the current video block using an intra-block copy coding mode, wherein a first bit-depth of the buffer is different than a second bit-depth of the coded data; and performing the conversion using the reference samples stored in the buffer.

38. The method of clause 37, wherein the first bit-depth is greater than the second bit-depth.

39. The method of any of clauses 37-38, wherein the first bit-depth is identical to a bit-depth of a reconstruction buffer used during the conversion.

40. The method of any of clauses 37-39, wherein the first bit-depth is signaled in the bitstream representation as a value or a difference value.

41. The method of any of clauses 37-40, wherein the conversion uses different bit-depths for chroma and luma components.

Additional embodiments and examples of clauses 37 to 41 are described in Item 7 in Section 4.

42. A method of video processing, comprising: performing a conversion between a current video block and a bitstream representation of the current video block using an intra-block copy mode in which a first precision used for prediction calculations during the conversion is lower than a second precision used for reconstruction calculations during the conversion.

43. The method of clause 43, wherein the prediction calculations include determining a prediction sample value from a reconstructed sample value using clip{{p+[1<<(b−1)]}>>b,0,(1<<bitdepth)−1}<<b, where p is the reconstructed sample value, b is a predefined bit-shifting value, and bitdepth is a prediction sample precision.

Additional embodiments and examples of clauses 42 to 43 are described in Item 28 to 31 and 34 in Section 4.

44. A method of video processing, comprising: performing a conversion between a current video block and a bitstream representation of the current video block using an intra-block copy mode in which a reference area of size nM×nM is used for a coding tree unit size M×M, where n and M are integers and wherein the current video block is positioned in the coding tree unit, and wherein the reference area is a nearest available n×n coding tree unit in a coding tree unit row corresponding to the current video block.

Additional embodiments and examples of clause 4 are described in Item 35 in Section 4.

45. A method of video processing, comprising: performing a conversion between a current video block and a bitstream representation of the current video block using an intra-block copy mode in which a reference area of size nM×nM is used for a coding tree unit size other than M×M, where n and M are integers and wherein the current video block is positioned in the coding tree unit, and wherein the reference area is a nearest available n×n−1 coding tree unit in a coding tree unit row corresponding to the current video block.

Additional embodiments and examples of clause 4 are described in Item 36 in Section 4. FIGS. 8 and 9 show additional example embodiments.

46. The method of clause 3, wherein M=mW and N=H, where W and H are width and height of a coding tree unit (CTU) of the current video block, and m is a positive integer.

47. The method of clause 3, wherein M=W and N=nH, where W and H are width and height of a coding tree unit (CTU), and n is a positive integer.

48. The method of clause 3, wherein M=mW and N=nH, where W and H are width and height of a coding tree unit (CTU), m and n are positive integers.

49. The method of any of clauses 46-48, wherein n and m depend on a size of the CTU.

50. A method of video processing, comprising: determining, for a conversion between a current video block of a video and a bitstream representation of the current video block, validity of a block vector corresponding to the current video block of a component c of the video using a component X of the video, wherein the component X is different from a luma component of the video; and performing the conversion using the block vector upon determining that the block vector is valid for the current video block. Here, the block vector, denoted as (BVx,BVy) is equal to (x−x0,y−y0), where (x0, y0) correspond to an upper-left position of a coding tree unit of the current video block.

51. The method of clause 50, wherein the component c corresponds to the luma component of the video.

52. The method of clause 50, wherein the current video block is a chroma block and the video is in a 4:4:4 format.

53. The method of clause 50, wherein the video is in a 4:2:0 format, and wherein the current video block is a chroma block starting at position (x, y), and wherein the determining comprises determining the block vector to be invalid for a case in which isRec(c, ((x+BVx)>>5<<5)+64−(((y+BVy)>>5)&1)*32+(x %32), ((y+BVy)>>5<<5)+(y %32)) is true.

54. The method of clause 50, wherein the video is in a 4:2:0 format, and wherein the current video block is a chroma block starting at position (x, y), and wherein the determining comprises determining the block vector to be invalid for a case in which if isRec(c, x+BVx+Chroma_CTU_size, y) is true.

55. A method of video processing, comprising: determining, selectively for a conversion between a current video block of a current virtual pipeline data unit (VPDU) of a video region and a bitstream representation of the current video block, to use K1 previously processed VPDUs from a first row of the video region and K2 previously processed VPDUs from a second row of the video region; and performing the conversion, wherein the conversion excludes using remaining of the current VPDU.

56. The method of clause 55, wherein K1=1 and K2=2.

57. The method of any of clauses 55-56, wherein the current video block is selectively processed based on a dimension of the video region or a dimension of the current VPDU.

58. A method of video processing, comprising: performing a validity check of a block vector for a conversion between a current video block and a bitstream representation of the current video block, wherein the block vector is used for intra block copy mode; and using a result of the validity check to selectively use the block vector during the conversion.

59. The method of clause 58, wherein an intra block copy (IBC) buffer is used during the conversion, wherein a width and a height of the IBC buffer as Wbuf and Hbuf an dimensions of the current video block are W×H and wherein the block vector is represented as (BVx, BVy), and wherein the current video block is in a current picture having dimensions Wpic and Hpic and a coding tree unit having Wctu and Hctu as width and height, and wherein the validity check uses a pre-determined rule.

60. The method of any of clauses 58-59, wherein the current video block is a luma block, a chroma block, a coding unit CU, a transform unit TU, a 4×4 block, a 2×2 block, or a subblock of a parent block starting from pixel coordinates (X, Y).

61. The method of any of clauses 58-60, wherein the validity check considers the block vector that falls outside a boundary of the current picture as valid.

62. The method of any of clauses 58-60, wherein the validity check considers the block vector that falls outside a boundary of the coding tree unit as valid.

Items 23-30 in the previous section provide additional examples and variations of the above clauses 58-62.

63. The method of any of clauses 1-62, wherein the conversion includes generating the bitstream representation from the current video block.

64. The method of any of clauses 1-62, wherein the conversion includes generating pixel values of the current video block from the bitstream representation.

65. A video encoder apparatus comprising a processor configured to implement a method recited in any one or more of clauses 1-62.

66. A video decoder apparatus comprising a processor configured to implement a method recited in any one or more of clauses 1-62.

67. A computer readable medium having code stored thereon, the code embodying processor-executable instructions for implementing a method recited in any of or more of clauses 1-62.

Figure 7:
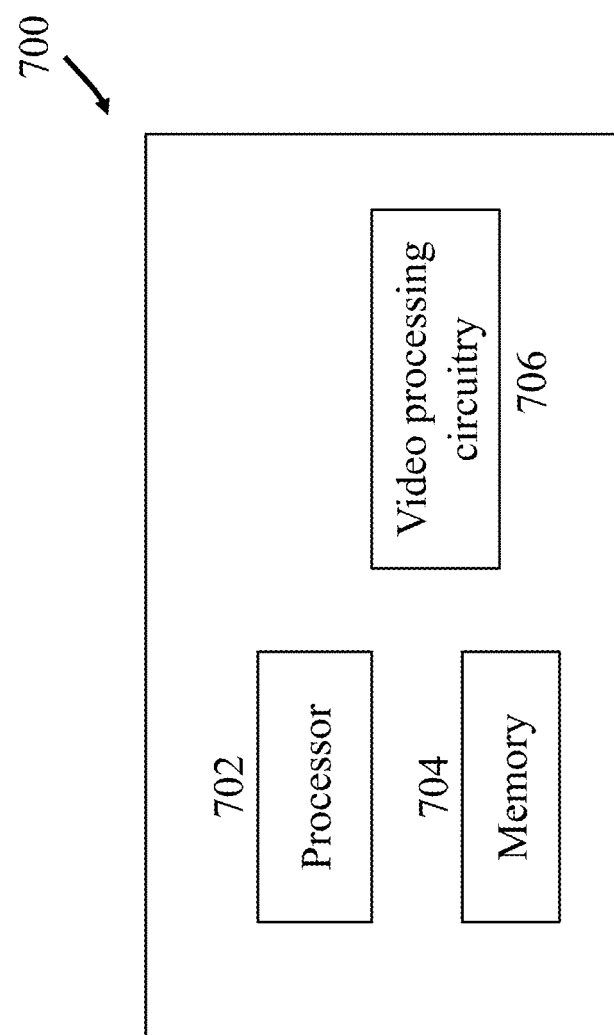
FIG. 7 is a block diagram of a hardware platform for video or image coding or decoding.

FIG. 7 is a block diagram of a hardware platform of a video/image processing apparatus 700. The apparatus 700 may be used to implement one or more of the methods described herein. The apparatus 700 may be embodied in a smartphone, tablet, computer, Internet of Things (IoT) receiver, and so on. The apparatus 700 may include one or more processors 702, one or more memories 704 and video processing hardware 706. The processor(s) 702 may be configured to implement one or more methods (including, but not limited to, method 600) described in the present document. The memory (memories) 704 may be used for storing data and code used for implementing the methods and techniques described herein. The video processing hardware 706 may be used to implement, in hardware circuitry, some techniques described in the present document.

The bitstream representation corresponding to a current video block need not be a contiguous set of bits and may be distributed across headers, parameter sets, and network abstraction layer (NAL) packets.

Section A: Another Additional Example Embodiment

In Section A, we present another example embodiment in which the current version of the VVC standard may be modified for implementing some of the techniques described in the present document.

This section analyzes several issues in the current IBC reference buffer design and presents a different design to address the issues. An independent IBC reference buffer is proposed instead of mixing with decoding memory. Compared with the current anchor, the proposed scheme shows −0.99%/−0.71%/−0.79% AI/RA/LD-B luma BD-rate for class F and −2.57%/−1.81%/−1.36% for 4:2:0 TGM, with 6.7% memory reduction; or −1.31%/−1.01%/−0.81% for class F and −3.23%/−2.33%/−1.71% for 4:2:0 TGM with 6.7% memory increase.

A1. Introduction

Intra block copy, i.e. IBC (or current picture referencing, i.e. CPR previously) coding mode, is adopted. It is realized that IBC reference samples should be stored in on-chip memory and thus a limited reference area of one CTU is defined. To restrict the extra on-chip memory for the buffer, the current design reuses the 64×64 memory for decoding the current VPDU so that only 3 additional 64×64 blocks' memory is needed to support IBC. When CTU size is 128×128, currently the reference area is shown in FIG. 2.

In the current draft (VVC draft 4), the area is defined as The following conditions shall be true:

$$(yCb+(mvL[1]>>4))>>Ctb \text{ Log } 2SizeY=yCb>>Ctb \text{ Log } 2SizeY \quad (8\text{-}972)$$

$$(yCb+(mvL[1]>>4)+cbHeight-1)>>Ctb \text{ Log } 2SizeY=yCb>>Ctb \text{ Log } 2SizeY \quad (8\text{-}973)$$

$$(xCb+(mvL[0]>>4))>>Ctb \text{ Log } 2SizeY>=(xCb>>Ctb \text{ Log } 2SizeY)-1 \quad (8\text{-}974)$$

$$(xCb+(mvL[0]>>4)+cbWidth-1)>>Ctb \text{ Log } 2SizeY<=(xCb>>Ctb \text{ Log } 2SizeY) \quad (8\text{-}975)$$

[Ed. (SL): conditions (8-218) and (8-216) might have been checked by 6.4.X.]

When (xCb+(mvL[0]>>4))>>Ctb Log 2SizeY is equal to (xCb>>Ctb Log 2SizeY)−1, the derivation process for block availability as specified in clause 6.4.X [Ed. (BB): Neighbouring blocks availability checking process tbd] is invoked with the current luma location (xCurr, yCurr) set equal to (xCb, yCb) and the neighbouring luma location (((xCb+(mvL[0]>>4)+CtbSizeY)>>(Ctb Log 2SizeY 1))<<(Ctb Log 2SizeY 1), ((yCb+(mvL[1]>>4))>>(Ctb Log 2SizeY 1))<<(Ctb Log 2SizeY 1)) as inputs, and the output shall be equal to FALSE.

Thus, the total reference size is a CTU.

A2. Potential Issues of the Current Design

The current design assumes to reuse the 64×64 memory for decoding the current VPDU and the IBC reference is aligned to VPDU memory reuse accordingly. Such a design bundles VPDU decoding memory with the IBC buffer. There might be several issues:

1. To handle smaller CTU size might be an issue. Suppose that CTU size is 32×32, it is not clear whether the current 64×64 memory for decoding the current VPDU can support 32×32 level memory reuse efficiently in different architectures.
2. The reference area varies significantly. Accordingly, too many bitstream conformance constraints are introduced. It places extra burden to encoder to exploit reference area efficiently and avoid generating legal bitstreams. It also increases the possibility to have invalid BVs in different modules, e.g. merge list. To handle those invalid BVs may introduce extra logics or extra conformance constraints. It not only introduces burdens to encoder or decoder, it may also create divergence between BV coding and MV coding.
3. The design does not scale well. Because VPDU decoding is mixed with IBC buffer, it is not easy to increase or decrease reference area relative to the current one 128×128 CTU design. It may limit the flexibility to exploit a better coding efficiency vs. on-chip memory trade-off in the later development, e.g. a lower or higher profile.
4. The bit-depth of IBC reference buffer is linked with decoding buffer. Even though screen contents usually have a lower bit-depth than internal decoding bit-depth, the buffer still needs to spend memory to store bits mostly representing rounding or quantization noises. The issue becomes even severe when considering higher decoding bit-depth configurations.

A3. A Clear IBC Buffer Design

To address issues listed in the above sub-section, we propose to have a dedicated IBC buffer, which is not mixed with decoding memory.

For 128×128 CTU, the buffer is defined as 128×128 with 8-bit samples, when a CU (x, y) with size w×h has been decoded, its reconstruction before loop-filtering is converted to 8-bit and written to the w×h block area starting from position (x %128, y %128). Here the modulo operator % always returns a positive number, i.e. for x<0, x % L ≙ −(−x % L), e.g. −3%128=125.

Assume that a pixel (x,y) is coded in IBC mode with BV=(BVx, BVy), it is prediction sample in the IBC reference buffer locates at ((x+BVx) %128, (y+BVy) %128) and the pixel value will be converted to 10-bit before prediction.

When the buffer is considered as (W, H), after decoding a CTU or CU starting from (x, y), the reconstructed pixels before loop-filtering will be stored in the buffer starting from (x % W, y % H). Thus, after decoding a CTU, the corresponding IBC reference buffer will be updated accordingly. Such setting might happen when CTU size is not 128×128. For example, for 64×64 CTU, with the current buffer size, it can be considered as a 256×64 buffer. For 64×64 CTU, FIG. 2 shows the buffer status.

Figure 12:
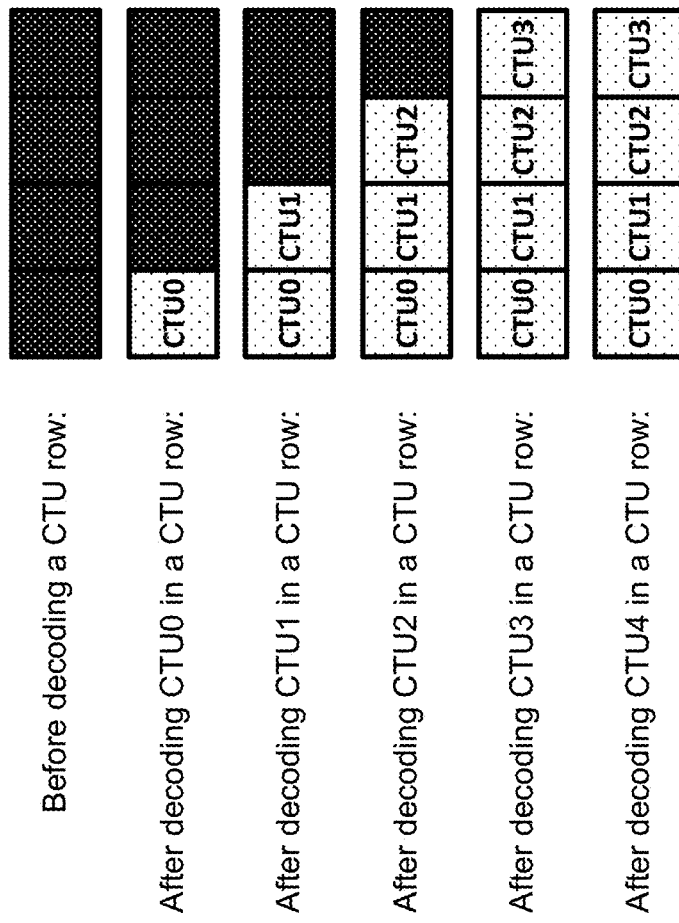
FIG. 12 is an illustration of IBC reference buffer status, where a block denotes a 64×64 CTU.

FIG. 12 is an illustration of IBC reference buffer status, where a block denotes a 64×64 CTU.

In such a design, because the IBC buffer is different from the VPDU decoding memory, all the IBC reference buffer can be used as reference.

When the bit-depth of the IBC buffer is 8-bit, compared with the current design that needs 3 additional 10-bit 64×64 buffer, the on-chip memory increase is (8*4)/(10*3)−100%=6.7%.

If we further reduce the bit-depth. The memory requirement can be further reduced. For example, for 7-bit buffer, the on-chip memory saving is 100%−(7*4)/(10*3)=6.7%.

With the design, the only bitstream conformance constraint is that the reference block shall be within the reconstructed area in the current CTU row of the current Tile.

When initialization to 512 is allowed at the beginning of each CTU row, all bitstream conformance constraints can be removed.

A4. Experimental Results

In some embodiments, the disclosed methods can be implemented using VTM-4.0 software.

For a 10-bit buffer implementation and CTC, the decoder is fully compatible to the current VTM4.0 encoder, which means that the proposed decoder can exactly decode the VTM-4.0 CTC bitstreams.

For a 7-bit buffer implementation, the results shown in Table I.

For a 8-bit buffer implementation, the results shown in Table II.

TABLE I

Performance with a 7-bit buffer. The anchor is VTM-4.0 with IBC on for all sequences.

| | Over VTM-4.0 w/IBC on | | | | |
|---|---|---|---|---|---|
| | Y | U | V | EncT | DecT |
| | All Intra | | | | |
| Class A1 | −0.01% | −0.09% | −0.10% | 132% | 101% |
| Class A2 | 0.05% | 0.00% | 0.06% | 135% | 100% |
| Class B | 0.00% | −0.02% | 0.01% | 135% | 100% |
| Class C | −0.02% | 0.01% | 0.03% | 130% | 98% |
| Class E | −0.13% | −0.16% | −0.04% | 135% | 99% |

TABLE I-continued

Performance with a 7-bit buffer. The anchor is VTM-4.0 with IBC on for all sequences.

| | Over VTM-4.0 w/IBC on | | | | |
|---|---|---|---|---|---|
| | Y | U | V | EncT | DecT |
| Overall | −0.02% | −0.05% | 0.00% | 133% | 100% |
| Class D | 0.04% | 0.04% | 0.12% | 127% | 107% |
| Class F | −0.99% | −1.14% | −1.18% | 115% | 99% |
| 4:2:0 TGM | −2.57% | −2.73% | −2.67% | 104% | 102% |
| Random Access | | | | | |
| Class A1 | 0.02% | −0.01% | 0.01% | 109% | 100% |
| Class A2 | 0.00% | −0.04% | 0.03% | 111% | 100% |
| Class B | −0.01% | −0.10% | −0.22% | 113% | 101% |
| Class C | −0.01% | 0.17% | 0.12% | 115% | 100% |
| Class E | | | | | |
| Overall | 0.00% | 0.00% | −0.04% | 112% | 100% |
| Class D | 0.05% | 0.16% | 0.20% | 117% | 101% |
| Class F | −0.71% | −0.77% | −0.77% | 109% | 99% |
| 4:2:0 TGM | −1.81% | −1.65% | −1.64% | 107% | 101% |
| Low delay B | | | | | |
| Class A1 | | | | | |
| Class A2 | | | | | |
| Class B | 0.01% | 0.36% | 0.30% | 114% | 95% |
| Class C | −0.01% | −0.12% | −0.10% | 120% | 98% |
| Class E | 0.10% | 0.20% | 0.18% | 107% | 99% |
| Overall | 0.03% | 0.16% | 0.13% | 114% | 97% |
| Class D | −0.01% | 1.07% | 0.18% | 123% | 104% |
| Class F | −0.79% | −0.89% | −1.01% | 110% | 100% |
| 4:2:0 TGM | −1.36% | −1.30% | −1.26% | 109% | 102% |

TABLE II

Performance with a 8-bit buffer. The anchor is VTM-4.0 with IBC on for all sequences.

| | Over VTM-4.0 w/IBC on | | | | |
|---|---|---|---|---|---|
| | Y | U | V | EncT | DecT |
| All Intra | | | | | |
| Class A1 | −0.01% | 0.02% | −0.10% | 129% | 102% |
| Class A2 | 0.02% | −0.06% | −0.02% | 134% | 102% |
| Class B | −0.04% | −0.02% | −0.07% | 135% | 101% |
| Class C | −0.03% | 0.04% | 0.00% | 130% | 98% |
| Class E | −0.16% | −0.14% | −0.08% | 134% | 100% |
| Overall | −0.04% | −0.03% | −0.05% | 133% | 100% |
| Class D | 0.00% | 0.04% | 0.02% | 126% | 101% |
| Class F | −1.31% | −1.27% | −1.29% | 114% | 98% |
| 4:2:0 TGM | −3.23% | −3.27% | −3.24% | 101% | 100% |
| Random Access | | | | | |
| Class A1 | −0.01% | −0.08% | 0.04% | 107% | 99% |
| Class A2 | −0.03% | −0.16% | 0.06% | 110% | 99% |
| Class B | −0.01% | −0.14% | −0.22% | 111% | 99% |
| Class C | −0.01% | 0.15% | 0.09% | 115% | 100% |
| Class E | | | | | |
| Overall | −0.01% | −0.05% | −0.03% | 111% | 99% |
| Class D | 0.01% | 0.19% | 0.22% | 116% | 101% |
| Class F | −1.01% | −0.99% | −1.01% | 108% | 99% |
| 4:2:0 TGM | −2.33% | −2.14% | −2.19% | 105% | 100% |
| Low delay B | | | | | |
| Class A1 | | | | | |
| Class A2 | | | | | |
| Class B | 0.00% | 0.04% | −0.14% | 113% | #NUM! |
| Class C | −0.05% | −0.28% | −0.15% | 119% | 98% |
| Class E | 0.04% | −0.16% | 0.43% | 107% | #NUM! |
| Overall | 0.00% | −0.11% | 0.00% | 113% | #NUM! |
| Class D | −0.07% | 1.14% | 0.13% | 122% | 99% |
| Class F | −0.81% | −0.92% | −0.96% | 111% | 99% |
| 4:2:0 TGM | −1.71% | −1.67% | −1.71% | 106% | 95% |

Figure 17:
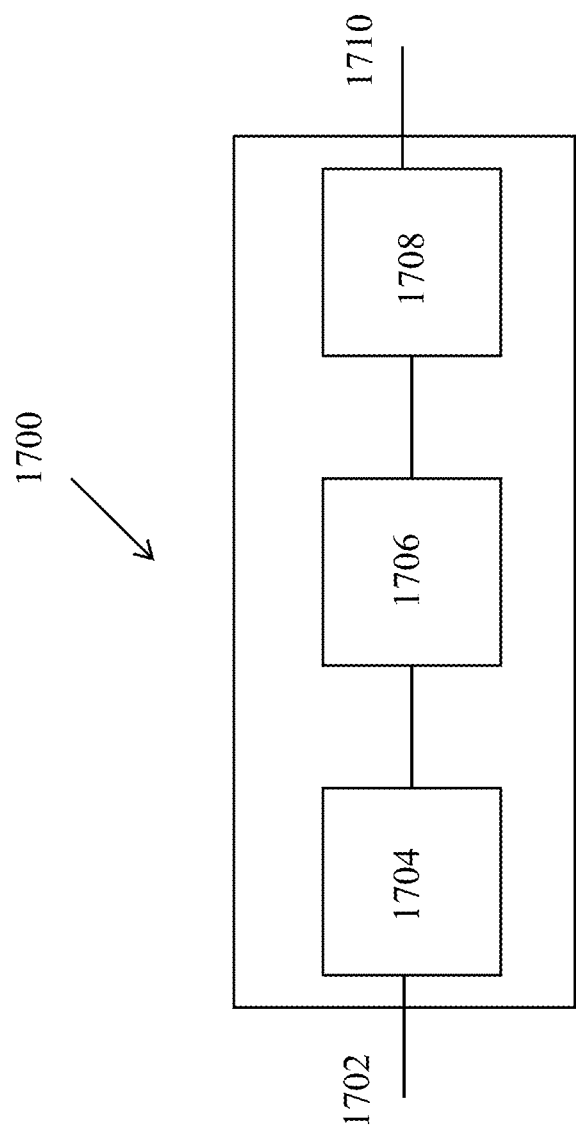
FIG. 17 is a block diagram of an example video processing system in which disclosed techniques may be implemented.

FIG. 17 is a block diagram showing an example video processing system 1700 in which various techniques disclosed herein may be implemented. Various implementations may include some or all of the components of the system 1700. The system 1700 may include input 1702 for receiving video content. The video content may be received in a raw or uncompressed format, e.g., 8 or 10 bit multi-component pixel values, or may be in a compressed or encoded format. The input 1702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1700 may include a coding component 1704 that may implement the various coding or encoding methods described in the present document. The coding component 1704 may reduce the average bitrate of video from the input 1702 to the output of the coding component 1704 to produce a coded representation of the video. The coding techniques are therefore sometimes called video compression or video transcoding techniques. The output of the coding component 1704 may be either stored, or transmitted via a communication connected, as represented by the component 1706. The stored or communicated bitstream (or coded) representation of the video received at the input 1702 may be used by the component 1708 for generating pixel values or displayable video that is sent to a display interface 1710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

FIG. 18 is a flowchart of an example method of visual data processing. Steps of this flowchart are discussed in connection with example 18 discussed in Section 4 of this document. At step 1802, the process determines, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block. At step 1804, for a sample spatially located at location (x0, y0) of the current video block relative to an upper-left position of a coding tree unit including the current video block and having a block vector (BVx, BVy), the process computes a corresponding reference in the buffer at a reference location (P, Q), wherein the reference location (P, Q) is determined using the block vector (BVx, BVy) and the location (x0, y0). Upon determining that the reference location (P, Q) lies outside the buffer, at step 1805, the process re-computes the reference location based at least in part on a location of the current video block relative to the coding tree unit including the current video block.

Figure 19:
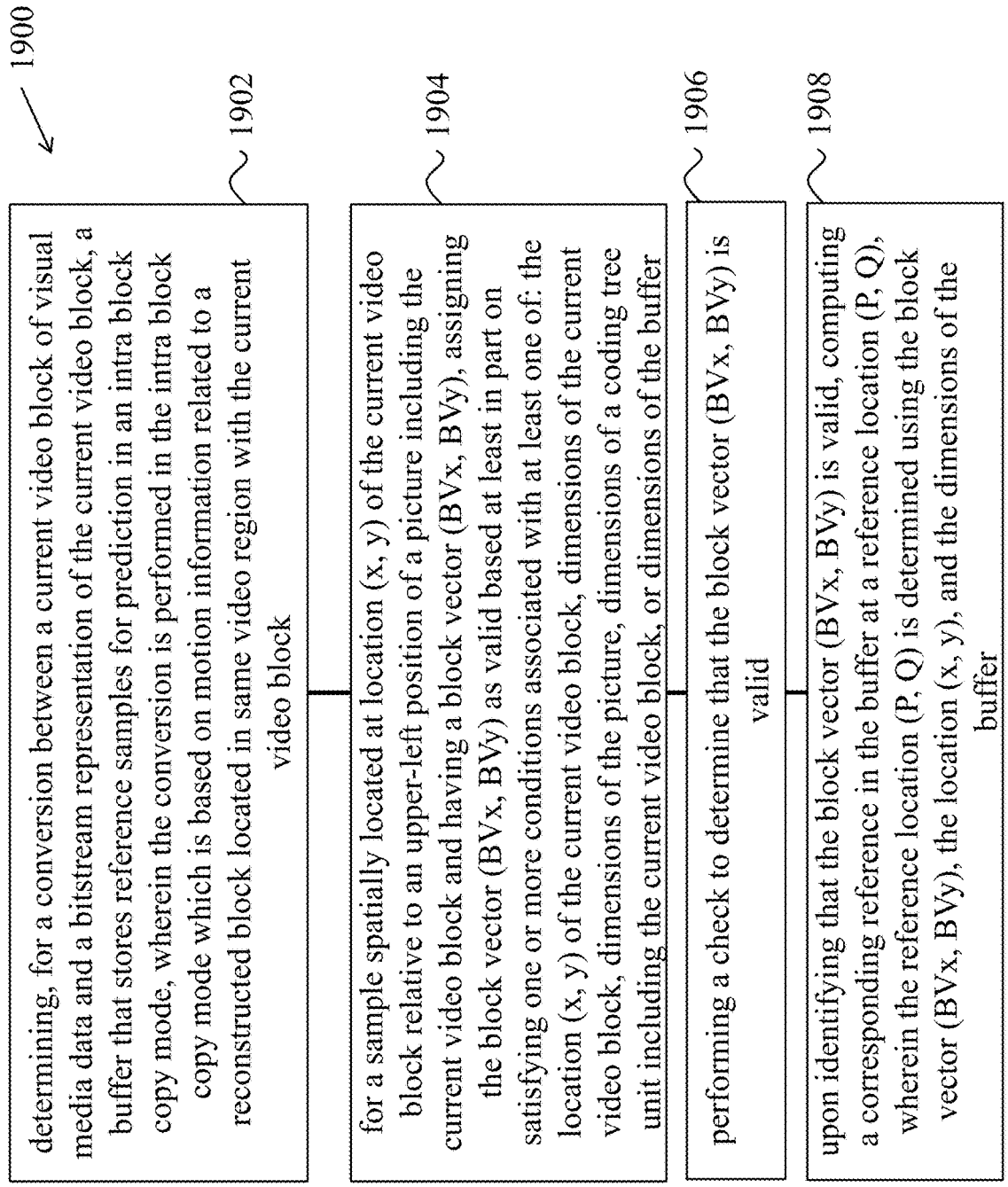
FIG. 19 is a flowchart of an example method of visual data processing.

FIG. 19 is a flowchart of an example method of visual data processing. Steps of this flowchart are discussed in connection with example 29 discussed in Section 4 of this document. At step 1902, the process determines, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block. At step 1904, for a sample spatially located at location (x, y) of the current video block relative to an upper-left position of a picture including the current video block and having a block vector (BVx, BVy), the process assigns the block vector (BVx, BVy) as valid based at least in part on satisfying one or more conditions associated with at least one of: the location (x, y) of the current video block, dimensions of the current video block, dimensions of the picture, dimensions of a coding tree unit including the current video block, or dimensions of the buffer. At step 1906, the process performs a check to determine that the block vector (BVx, BVy) is valid. At step 1908, upon identifying that the block vector (BVx, BVy) is valid, the process computes a corresponding reference in the buffer at a reference location (P, Q), wherein the reference location (P, Q) is determined using the block vector (BVx, BVy), the location (x, y), and the dimensions of the buffer.

Figure 20:
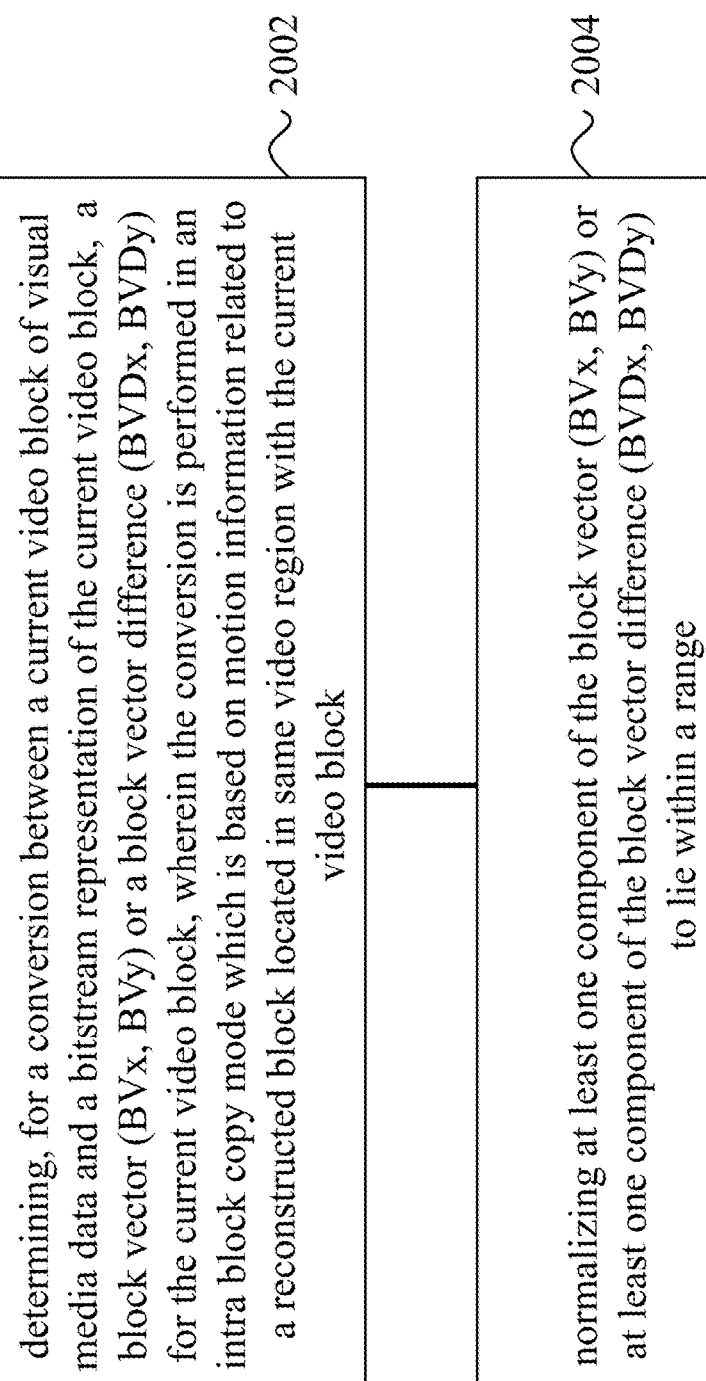
FIG. 20 is a flowchart of an example method of visual data processing.

FIG. 20 is a flowchart of an example method of visual data processing. Steps of this flowchart are discussed in connection with example 19 discussed in Section 4 of this document. At step 2002, the process determines, for a conversion between a current video block of visual media data and a bitstream representation of the current video block, a block vector (BVx, BVy) or a block vector difference (BVDx, BVDy) for the current video block, wherein the conversion is performed in an intra block copy mode which is based on motion information related to a reconstructed block located in same video region with the current video block. At step 2004, the process normalizes at least one component of the block vector (BVx, BVy) or at least one component of the block vector difference (BVDx, BVDy) to lie within a range.

FIG. 21 is a flowchart of an example method of visual data processing. Steps of this flowchart are discussed in connection with example 40 discussed in Section 4 of this document. At step 2102, the process determines, for a conversion between a current video block and a bitstream representation of the current video block, a buffer that is used to store reconstructed samples for prediction in an intra block copy mode, wherein the conversion is performed in the intra block copy mode which is based on motion information related to a reconstructed block located in same video region with the current video block. At step 2104, the process updates the reconstructed samples stored in the buffer in accordance with an order.

FIG. 22 is a flowchart of an example method of visual data processing. Steps of this flowchart are discussed in connection with example 57 discussed in Section 4 of this document. At step 2202, the process performs a conversion between a current video block and a bitstream representation of the current video block, wherein the conversion is performed in an intra block copy mode which is based on motion information related to a reconstructed block located in same video region with the video block, wherein, during the conversion, a first precision used for prediction calculations is lower than a second precision used for reconstruction calculations.

FIG. 23 is a flowchart of an example method of visual data processing. Steps of this flowchart are discussed in connection with example 59 discussed in Section 4 of this document. At step 2302, the process performs a conversion between a current video block and a bitstream representation of the current video block using an intra block copy mode which is based on motion information related to a reconstructed block located in same video region with the current video block, wherein, during the conversion, a reference area of size nM×nM is used, where n and M are integers and wherein the current video block is positioned in a coding tree unit, and wherein the reference area includes samples from n×n nearest available coding tree units in a coding tree unit row corresponding to the current video block.

FIG. 24 is a flowchart of an example method of visual data processing. Steps of this flowchart are discussed in connection with example 60 discussed in Section 4 of this document. At step 2402, the process performs a conversion between a current video block and a bitstream representation of the current video block using an intra block copy mode which is based on motion information related to a reconstructed block located in same video region with the current video block, wherein, during the conversion, a reference area of size nM×pM is used, where n, p and M are integers and wherein the current video block is positioned in a coding tree unit, and wherein the reference area includes samples from n×p−1 nearest available coding tree units in a coding tree unit row corresponding to the current video block.

FIG. 25 is a flowchart of an example method of visual data processing. Steps of this flowchart are discussed in connection with example 61 discussed in Section 4 of this document. At step 2502, the process performs a conversion between a current video block of a virtual pipeline data unit (VPDU) of a video region and a bitstream representation of the current video block using an intra block copy mode which is based on motion information related to a reconstructed block located in same video region with the current video block, wherein, during the conversion, a reference area of size nM×nM is used, a size of the VPDU is kM×kM, where k, n and M are integers and wherein the current video block is positioned in the coding tree unit, and wherein the reference area includes samples from n×n−k nearest available coding tree units in a coding tree unit row corresponding to the current video block.

FIG. 26 is a flowchart of an example method of visual data processing. Steps of this flowchart are discussed in connection with examples 62-66 discussed in Section 4 of this document. At step 2602, the process determines, for a conversion between a w×h sized current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block. At step 2604, for a sample spatially located at location (x0, y0) of the current video block relative to an upper-left position of a coding tree unit (CTU) of size M×M including the current video block and having a block vector (BVx, BVy), the process computes a corresponding reference area starting at a reference location (P, Q) in the buffer, wherein the reference location (P, Q) is determined using the block vector (BVx, BVy) and/or the location (x0, y0). At step 2606, the process applies one or more rule-based constraints to the reference area and/or the reference location (P, Q) to restrict overlap of the reference area with a video region.

FIG. 27 is a flowchart of an example method of visual data processing. Steps of this flowchart are discussed in connection with example 68 discussed in Section 4 of this document. At step 2702, the process determines, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block. At step 2704, for a sample spatially located at location (x0, y0) of the current video block relative to a coding unit (CU) including the current video block, the process computes a corresponding reference area starting at a reference location in the buffer. At step 2706, the process adjusts the reference area and the reference location to determine which of the previously-processed blocks are used for prediction.

FIG. 28 is a flowchart of an example method of visual data processing. Steps of this flowchart are discussed in connection with examples 69-75 discussed in Section 4 of this document. At step 2802, the process determines, for a conversion between a current video block of a video and a bitstream representation of the current video block, validity of a block vector corresponding to the current video block of a component c of the video using a component X of the video, wherein the component X is different from a luma component of the video. At step 2804, the process performs the conversion using the block vector upon determining that the block vector is valid for the current video block, wherein the conversion is performed in an intra block copy (IBC) mode which is based on motion information related to a reconstructed block located in same video region with the current video block.

Some embodiments of the present document are now presented in clause-based format.

A1. A method of visual media processing, comprising:
determining, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block;

for a sample spatially located at location (x0, y0) of the current video block relative to an upper-left position of a coding tree unit including the current video block and having a block vector (BVx, BVy), computing a corresponding reference in the buffer at a reference location (P, Q), wherein the reference location (P, Q) is determined using the block vector (BVx, BVy) and the location (x0, y0); and upon determining that the reference location (P, Q) lies outside the buffer, re-computing the reference location based at least in part on a location of the current video block relative to the coding tree unit including the current video block.

A2. The method of clause A1, wherein the reference location (P, Q) is determined as P=x0+BVx and Q=y0+BVy.

A3. The method of clause 1, wherein the re-computing comprises:
re-computing the reference location (P,Q) based at least in part on whether the current video block is located in a horizontal direction relative to the coding tree unit or located in a vertical direction relative to the coding tree unit.

A4. The method of any one or more of clauses A1-A3, wherein the current video block is located in a horizontal direction relative to the coding tree unit.

A5. The method of any one or more of clauses A1-A3, wherein the current video block is located in a vertical direction relative to the coding tree unit.

A6. The method of clause 1, wherein the re-computing comprises:
re-computing the reference location (P, Q) based at least in part on whether the current video block is located within a predefined distance from a boundary of the visual media data.

A7. The method of any one or more of clauses A1-A2 and A6, wherein the current video block is located within a predefined distance from a boundary of the visual media data.

A8. The method of any one or more of clauses A1-A2, wherein the reference location (P, Q) is assigned a predefined value in response to determining that (y0+BVy) lies outside a range [0, . . . , N−1], where N is an integer representing a y dimension of the buffer.

A9. The method of any one or more of clauses A1-A2, wherein the reference location (P, Q) is assigned a predefined value in response to determining that (x0+BVx) lies outside a range [0, . . . , N−1], where M is an integer representing a x dimension of the buffer.

A10. The method of any one or more of clauses A1-A2, wherein the reference location (P, Q) is assigned as ((x0+BVx) mod M, y0+BVy) where "mod" is modulo operation defined as x mod y=x−y*floor(x/y), where floor(a) is the largest integer no greater than a and M is an integer representing a x dimension of the buffer.

A11. The method of any one or more of clauses A1-A2, wherein the reference location (P, Q) is assigned as (x0+BVx, (y0+BVy) mod N)) where "mod" is modulo operation defined as x mod y=x−y*floor(x/y), where floor(a) is the largest integer no greater than a and N is an integer representing a y dimension of the buffer.

A12. The method of clause A10, wherein additional processing is performed in response to determining that ((x0+BVx) mod M, y0+BVy) lies outside the buffer.

A13. The method of clause A12, wherein additional processing is performed in response to determining that (x0+BVx, (y0+BVy) mod N)) lies outside the buffer.

B1. A method of visual media processing, comprising:
determining, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block;

for a sample spatially located at location (x, y) of the current video block relative to an upper-left position of a picture including the current video block and having a block vector (BVx, BVy), assigning the block vector (BVx, BVy) as valid based at least in part on satisfying one or more conditions associated with at least one of: the location (x, y) of the current video block, dimensions of the current video block, dimensions of the picture, dimensions of a coding tree unit including the current video block, or dimensions of the buffer;

performing a check to determine that the block vector (BVx, BVy) is valid; and upon identifying that the block vector (BVx, BVy) is valid, computing a corresponding reference in the buffer at a reference location (P, Q), wherein the reference location (P, Q) is determined using the block vector (BVx, BVy), the location (x, y), and the dimensions of the buffer.

B2. The method of clause B1, wherein the reference location (P, Q) is determined as ((x+BVx) % Wbuf, (x+BVy) % Hbuf), wherein Wbuf×Hbuf denote the dimensions of the buffer, wherein "%" denotes the modulo operation and "x % y" when x<0 is defined as x−y*floor(x/y), where floor(a) is the largest integer no greater than a.

C1. A method of visual media processing, comprising:
determining, for a conversion between a current video block of visual media data and a bitstream representation of the current video block, a block vector (BVx, BVy) or a block vector difference (BVDx, BVDy) for the current video block, wherein the conversion is performed in an intra block copy mode which is based on motion information related to a reconstructed block located in same video region with the current video block; and
normalizing at least one component of the block vector (BVx, BVy) or at least one component of the block vector difference (BVDx, BVDy) to lie within a range.

C2. The method of clause C1, wherein the normalizing includes:
normalizing, based on a dimension of a buffer, the at least one component of the block vector (BVx, BVy) or the at least one component of the block vector difference (BVDx, BVDy) to lie within the range, wherein the buffer stores reference samples for prediction in the intra block copy mode.

C3. The method of clause C2, wherein component BVx is normalized to (BVx mod M), where M is an integer representing a x dimension of the buffer and "mod" is a modulo operation defined as x mod y=x−y*floor(x/y), where floor(a) is the largest integer no greater than a.

C4. The method of clause C2, wherein component BVx is normalized to ((BVx+x0) mod M)−V, where M is an integer representing a x dimension of the buffer, "mod" is a modulo operation defined as x mod y=x−y*floor(x/y), where floor(a) is the largest integer no greater than a, and V is a predefined value.

C5. The method of clause C4, wherein V is 64.

C6. The method of clause C4, wherein V is M/2.

C7. The method of clause C4, wherein V is x0.

C8. The method of clause C2 wherein component BVy is normalized to (BVy mod N), where N is an integer representing a y dimension of the buffer and "mod" is a modulo operation defined as x mod y=x−y*floor(x/y), where floor(a) is the largest integer no greater than a.

C9. The method of clause C2, wherein component BVy is normalized to ((BVy+y0) mod N)−V, where N is an integer representing a y dimension of the buffer, "mod" is a modulo operation defined as x mod y=x−y*floor(x/y), where floor(a) is the largest integer no greater than a, and V is a predefined value.

C10. The method of clause C9, wherein V is 64.

C11. The method of clause C9, wherein V is N/2.

C12. The method of clause C9, wherein V is y0.

C13. The method of clause C1, wherein components BVx and BVy are normalized to lie within different ranges.

C14. The method of clause C2, wherein component BVDx is normalized to (BVDx mod M), where M is an integer representing a x dimension of the buffer and "mod" is a modulo operation defined as x mod y=x−y*floor(x/y), where floor(a) is the largest integer no greater than a.

C15. The method of clause C2, wherein component BVDx is normalized to ((BVDx+x0) mod M)−V, where M is an integer representing a x dimension of the buffer, "mod" is a modulo operation defined as x mod y=x−y*floor(x/y), where floor(a) is the largest integer no greater than a, and V is a predefined value.

C16. The method of clause C15, wherein V is 64.

C17. The method of clause C15, wherein V is M/2.

C18. The method of clause C15, wherein V is x0.

C19. The method of clause C2, wherein component BVDy is normalized to (BVDy mod N), where N is an integer representing a y dimension of the buffer and "mod" is a modulo operation.

C20. The method of clause C2, wherein component BVDy is normalized to ((BVDy+y0) mod N)−V, where N is an integer representing a y dimension of the buffer, "mod" is a modulo operation, and V is a predefined value.

C21. The method of clause C20, wherein V is 64.

C22. The method of clause C20, wherein V is N/2.

C23. The method of clause C20, wherein V is y0.

C24. The method of clause C1, wherein components BVDx and BVDy are normalized to lie within different ranges.

D1. A method of visual media processing, comprising:
determining, for a conversion between a current video block and a bitstream representation of the current video block, a buffer that is used to store reconstructed samples for prediction in an intra block copy mode, wherein the conversion is performed in the intra block copy mode which is based on motion information related to a reconstructed block located in same video region with the current video block; and
updating the reconstructed samples stored in the buffer in accordance with an order.

D2. The method of clause D1, wherein the buffer is updated in accordance with a sequential order.

D3. The method of clause D1, wherein the buffer is updated in accordance with an order of reconstructed blocks.

D4. The method of clause D1, further comprising:
upon determining that the buffer is full, replacing the reconstructed samples stored in the buffer with recently reconstructed samples.

D5. The method of clause D1, wherein the reconstructed samples stored in the buffer are replaced in a first-in-first-out order.

D6. The method of clause D1, wherein an oldest set of the reconstructed samples stored in the buffer are replaced.

D7. The method of clause D1, wherein the reconstructed samples stored in the buffer are assigned priority values, and wherein the reconstructed samples stored in the buffer are replaced according to the priority values.

D8. The method of clause D1, wherein a subset of the reconstructed samples stored in the buffer are marked for replacement in future, and wherein samples not included in the subset are replaced initially.

D9. The method of clause D7, wherein a flag included in the bitstream representation indicates the priority values that satisfy one or more conditions.

D10. The method of clause D7, wherein the priority values are assigned based on a characteristic of the current video block.

D11. The method of clause D9, wherein the one of more conditions relate to a percentage of the reconstructed samples coded using a palette mode and/or an intra block coding (IBC) mode and/or a transform-skip mode.

D12. The method of clause D11, wherein, in response to determining that the percentage of the reconstructed samples coded using the palette mode and/or the intra block coding (IBC) mode and/or the transform-skip mode exceed a threshold, assigning all samples in the current video block as high priority.

D13. The method of clause D12, wherein the threshold is based on a size of the current video block and/or a color component of the current video block and/or a size of the coding tree unit (CTU) including the current video block.

D14. The method of clause D13, wherein the threshold is included as a field in the bitstream representation.

D15. The method of clause D14, wherein the field is included in a sequence parameter set (SPS), a picture parameter set (PPS), a sequence header, a slice header, a tile group, a tile level, or a video region.

D16. The method of clause D4, wherein determining that a number of available samples in the buffer is equal or larger than a threshold is indicative of the buffer being full.

D17. The method of clause D16, wherein the threshold is 64×64×3 luma samples.

E1. A method of visual media processing, comprising:
performing a conversion between a current video block and a bitstream representation of the current video block, wherein the conversion is performed in an intra block copy mode which is based on motion information related to a reconstructed block located in same video region with the video block, wherein, during the conversion, a first precision used for prediction calculations is lower than a second precision used for reconstruction calculations.

E2. The method of clause E1, wherein the prediction calculations include determining a prediction sample value from a reconstructed sample value using clip{{p+[1<<(b−1)]}>>b,0,(1<<bitdepth)−1}<<b, where p is the reconstructed sample value, b is a predefined bit-shifting value, bitdepth is a prediction sample precision, and "clip" is a clipping operation defined as clip(x, y, z)=(x<y)?y:(x>z?z:x).

E3. The method of clause E1, wherein the prediction calculations include determining a prediction sample value from a reconstructed sample value using clip{{p+[1<<(b−1)−1]}>>b,0,(1<<bitdepth)−1}<<b, where p is the reconstructed sample value, b is a predefined bit-shifting value, bitdepth is a prediction sample precision, and "clip" is a clipping operation defined as clip(x, y, z)=(x<y)?y:(x>z?z:x).

E4. The method of clause E1, wherein the prediction calculations include determining a prediction sample value from a reconstructed sample value using ((p>>b)+(1<<(bitdepth−1)))<<b, where p is the reconstructed sample value, b is a predefined bit-shifting value, and bitdepth is a prediction sample precision.

E5. The method of clause E1, wherein the prediction calculations include determining a prediction sample value from a reconstructed sample value using (clip((p>>b),0,(1<<(bitdepth-b)))+(1<<(bitdepth−1)))<<b, where p is the reconstructed sample value, b is a predefined bit-shifting value, bitdepth is a prediction sample precision, and "clip" is a clipping operation defined as clip(x, y, z)=(x<y)?y:(x>z?z:x).

E6. The method of clause E1, wherein the prediction calculations include determining a prediction sample value from a reconstructed sample value using a clipping operation based on whether an in-loop reshaping (ILR) step is applied.

E7. The method of any one or more of clauses E1-E5, wherein b is a difference of bit-depths of the reconstructed sample and the current video block.

E8. The method of clause E1, wherein the first precision and/or the second precision and/or a difference between the first precision and the second precision is signaled as a field in the bitstream representation.

E9. The method of clause E1, wherein the prediction calculations include determining a prediction sample value from a reconstructed sample value, wherein a first portion of the prediction sample value has the first precision and a second portion of the prediction sample value has the second precision.

E10. The method of clause E9, wherein the current video block is located inside a coding tree unit that includes samples with different precisions.

E11. The method of clause E10, wherein the samples with the different precisions are included in a reference area allowed for the current video block.

E12. The method of clause E9, wherein a first reference area associated with a coding tree unit including another video block uses the first precision and a second reference area associated with a coding tree unit including the current video block uses the second precision.

E13. The method of clause E12, wherein the first reference area corresponds to a first color component and the second reference area corresponds to a second color component.

F1. A method of visual media processing, comprising:
performing a conversion between a current video block and a bitstream representation of the current video block using an intra block copy mode which is based on motion information related to a reconstructed block located in same video region with the current video block, wherein, during the conversion, a reference area of size nM×nM is used, where n and M are integers and wherein the current video block is positioned in a coding tree unit, and wherein the reference area includes samples from n×n nearest available coding tree units in a coding tree unit row corresponding to the current video block.

F2. The method of clause F1, wherein a size of the reference area is 128×128 samples, the coding tree unit size is 64×64, and the buffer includes four nearest available coding tree units in a same coding tree unit row that includes the current video block.

F3. The method of clause F1, wherein a size of the reference area is 128×128 samples, the coding tree unit size is 32×32, and the buffer includes sixteen nearest available coding tree units in a same coding tree unit row that includes the current video block.

G1. A method of visual media processing, comprising:
performing a conversion between a current video block and a bitstream representation of the current video block using an intra block copy mode which is based on motion information related to a reconstructed block located in same video region with the current video block, wherein, during the conversion, a reference area of size nM×pM is used, where n, p and M are integers and wherein the current video block is positioned in a coding tree unit, and wherein the reference area includes samples from n×p−1 nearest available coding tree units in a coding tree unit row corresponding to the current video block.

G2. The method of clause G1, wherein a size of the reference area is 128×128 samples or 256×64 samples, the coding tree unit size is 64×64, and the buffer includes three nearest available coding tree units in a same coding tree unit row that includes the current video block.

G3. The method of clause G1, wherein a size of the reference area is 128×128 samples or 512×32 samples, the coding tree unit size is 32×32, and the buffer includes fifteen nearest available coding tree units in a same coding tree unit row that includes the current video block.

G4. The method of clause G1, wherein the coding tree unit is of size M×M.

G5. The method of any of clauses G1 to G4, wherein samples outside the buffer are disallowed for use during the conversion.

H1. A method of visual media processing, comprising:
performing a conversion between a current video block of a virtual pipeline data unit (VPDU) of a video region and a bitstream representation of the current video block using an intra block copy mode which is based on motion information related to a reconstructed block located in same video region with the current video block, wherein, during the conversion, a reference area of size nM×nM is used, a size of the VPDU is kM×kM, where k, n and M are integers and wherein the current video block is positioned in the coding tree unit, and wherein the reference area includes samples from n×n−k nearest available coding tree units in a coding tree unit row corresponding to the current video block.

H2. The method of clause H1, wherein a size of the reference area is 128×128 samples, the coding tree unit size is 64×64, the size of the VPDU is 64×64, and the buffer includes three nearest available coding tree units in a same coding tree unit row that includes the current video block.

H3. The method of clause H1, wherein a size of the reference area is 128×128 samples, the coding tree unit size is 32×32, the size of the VPDU is 64×64, and the buffer includes twelve nearest available coding tree units in a same coding tree unit row that includes the current video block.

I1. A method of visual media processing, comprising:
determining, for a conversion between a w×h sized current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block;

for a sample spatially located at location (x0, y0) of the current video block relative to an upper-left position of a coding tree unit (CTU) of size M×M including the current video block and having a block vector (BVx, BVy), computing a corresponding reference area starting at a reference location (P, Q) in the buffer, wherein the reference location (P, Q) is determined using the block vector (BVx, BVy) and/or the location (x0, y0); and applying one or more rule-based constraints to the reference area and/or the reference location (P, Q) to restrict overlap of the reference area with a video region.

I2. The method of clause I1, wherein, when the CTU is of size 128×128, (x0, y0) are expressed as (m×64, n×64), the reference area is restricted from overlapping with the video region of size 64×64 having an upper-left corner expressed as ((m−2)×64, n×64), where m and n are integers.

I3. The method of clause I1, wherein, when the CTU is of size 128×128, (x0, y0) are expressed as (m×64, n×64), the reference area is restricted from overlapping with the video region of size w×h having an upper-left corner expressed as (x0-128, y0), where m and n are integers.

I4. The method of clause I1, wherein, when a size of the buffer is kM×M, the reference area is restricted from overlapping with the video region of size w×h having an upper-left corner expressed as (x0−kM y0).

I5. The method of clause I1, wherein, when a top-left position of the current video block is expressed as (2m*64, 2n*64), a top-left position of the reconstructed block is expressed as ((2m−2)*64, 2n*64), where m and n are integers and the current video block is of size 64×64.

I6. The method of clause I1, wherein, when a top-left position of the current video block is expressed as (2m*64, 2n*64), a top-left position of the reconstructed block is expressed as ((2m−1)*64, 2n*64), where m and n are integers and the current video block is of size 64×64.

I7. The method of clause I1, wherein, when a top-left position of the current video block is expressed as (2m*64, 2n*64), a top-left position of the reconstructed block is expressed as ((2m−1)*64, (2n+1)*64), where m and n are integers and the current video block is of size 64×64.

I8. The method of clause I1, wherein, when a top-left position of the current video block is expressed as (2m*64, 2n*64), a top-left position of the reconstructed block is positioned at the top-left position of the current video block, where m and n are integers and the current video block is of size 64×64.

I9. The method of clause I1, wherein, when a top-left position of the current video block is expressed as ((2m+1)*64, (2n+1)*64), a top-left position of the reconstructed block is positioned at the top-left position of the current video block, where m and n are integers and the current video block is of size 64×64.

I10. The method of clause I1, wherein, when a top-left position of the current video block is expressed as ((2m+1)*64, 2n*64), a top-left position of the reconstructed block is expressed as ((2m−1)*64, 2n*64), where m and n are integers and the current video block is of size 64×64.

I11. The method of clause I1, wherein, when a top-left position of the current video block is expressed as ((2m+1)*64, 2n*64), a top-left position of the reconstructed block is expressed as ((2m−1)*64, (2n+1)*64), where m and n are integers and the current video block is of size 64×64.

I12. The method of clause I1, wherein, when a top-left position of the current video block is expressed as ((2m+1)*64, 2n*64), a top-left position of the reconstructed block is expressed as (2m*64, 2n*64), where m and n are integers and the current video block is of size 64×64.

I13. The method of clause I1, wherein, when a top-left position of the current video block is expressed as ((2m+1)*64, 2n*64), a top-left position of the reconstructed block is positioned at the top-left position of the current video block, where m and n are integers and the current video block is of size 64×64.

I14. The method of clause I1, wherein, when a top-left position of the current video block is expressed as (2m*64, (2n+1)*64), a top-left position of the reconstructed block is expressed as ((2m−1)*64, (2n+1)*64), where m and n are integers and the current video block is of size 64×64.

I15. The method of clause I1, wherein, when a top-left position of the current video block is expressed as (2m*64, (2n+1)*64), a top-left position of the reconstructed block is expressed as (2m*64, 2n*64), where m and n are integers and the current video block is of size 64×64.

I16. The method of clause I1, wherein, when a top-left position of the current video block is expressed as (2m*64, (2n+1)*64), a top-left position of the reconstructed block is expressed as ((2m+1)*64, 2n*64), where m and n are integers and the current video block is of size 64×64.

I17. The method of clause I1, wherein, when a top-left position of the current video block is expressed as (2m*64, (2n+1)*64), a top-left position of the reconstructed block is positioned at the top-left position of the current video block, where m and n are integers and the current video block is of size 64×64.

J1. A method of visual media processing, comprising:
determining, for a conversion between a current video block of visual media data and a bitstream representation of the current video block, a buffer that stores reference samples for prediction in an intra block copy mode, wherein the conversion is performed in the intra block copy mode which is based on motion information related to a reconstructed block located in same video region with the current video block;

for a sample spatially located at location (x0, y0) of the current video block relative to a coding unit (CU) including the current video block, computing a corresponding reference area starting at a reference location in the buffer; and adjusting the reference area and the reference location to determine which of the previously-processed blocks are used for prediction.

J2. The method of clause J1, wherein, when (y0>>6)&1==0, upto two previously-processed blocks are used for prediction, wherein top-left positions of the two previously-processed blocks are expressed as ((x>>6<<6)−128, y>>6<<6) and ((x>>6<<6)−64, y>>6<<6).

J3. The method of clause J1, wherein, when (y0>>6)&1==1, one previously-processed block having a top-left position expressed as ((x>>6<<6)−64, y>>6<<6) is used for prediction.

K1. A method of video processing, comprising:

determining, for a conversion between a current video block of a video and a bitstream representation of the current video block, validity of a block vector corresponding to the current video block of a component c of the video using a component X of the video, wherein the component X is different from a luma component of the video; and performing the conversion using the block vector upon determining that the block vector is valid for the current video block, wherein the conversion is performed in an intra block copy (IBC) mode which is based on motion information related to a reconstructed block located in same video region with the current video block.

K2. The method of clause K1, wherein the current video block starts at position (x, y), and wherein the determining comprises determining the block vector to be invalid for a case in which isRec(((x+BVx)>>6<<6)+128−(((y+BVy)>>6)&1)*64+(x %64), ((y+BVy)>>6<<6)+(y %64)) is true, where isRec(x,y) is true if sample (x,y) is reconstructed by the IBC mode and the block vector is denoted (BVx, BVy)).

K3. The method of clause K1, wherein the component c corresponds to a luma component of the video.

K4. The method of clause K1, wherein the current video block is a chroma block and the video is in a 4:4:4 format.

K5. The method of clause K1, wherein the current video block includes a luma component and a chroma component.

K6. The method of clause K1, wherein the video is in a 4:2:0 format, and wherein the current video block is a chroma block starting at position (x, y), and wherein the determining comprises determining the block vector to be invalid for a case in which isRec(c, ((x+BVx)>>5<<5)+64−(((y+BVy)>>5)&1)*32+(x %32), ((y+BVy)>>5<<5)+(y %32)) is true, where isRec(x,y) is true if sample (x,y) is reconstructed by the IBC mode.

K7. The method of clause K1, wherein the determining is based at least in part on availability of samples of the component X of the video.

K8. The method of clause K7, wherein the current video block starts at position (x, y), and wherein the determining comprises determining the block vector to be invalid for a case in which isRec(c, ((x+BVx)>>6<<6)+128−(((y+BVy)>>6)&1)*64+(x %64), ((y+BVy)>>6<<6)+(y %64)) is true, where isRec(c, x, y) is true if sample (x,y) for component c is available and reconstructed by the IBC mode and the block vector is denoted (BVx, BVy)).

K9. The method of clause K8, wherein the current video block is a luma block.

K10. The method of clause K8, wherein the current video block is a chroma block and the video is in a 4:4:4 format.

K11. The method of clause K7, wherein the determining comprises determining the availability of samples of the component X of the video.

K12. The method of clause K7, wherein the current video block starts at position (x, y), and wherein the determining comprises determining the block vector to be invalid for a case in which isRec(c, x+BVx+Chroma_CTU_size, y), where isRec(c, x, y) is true if sample (x,y) for component c is available and reconstructed by the IBC mode and the block vector is denoted (BVx, BVy)) and Chroma_CTU_size denotes a size of a coding tree unit for a chroma component.

K13. The method of clause K12, wherein the size of a coding tree unit for the chroma component is 64.

K14. The method of clause K1, further comprising:

determining a buffer that stores reference samples for prediction in the intra block copy mode; and for a sample spatially located at location (x0, y0) of the current video block relative to an upper-left position of a coding tree unit (CTU) including the current video block, computing a corresponding reference area starting at a reference location (P, Q) in the buffer.

K15. The method of clause K14, wherein the buffer stores blocks of size M×M.

K16. The method of clause K14, wherein the buffer stores blocks of size N×M, where M and N are unequal.

K17. The method of clause K14, wherein the buffer is restricted for use when one or more conditions are met.

K18. The method of clause K14, wherein the buffer is restricted for use when the buffer is within a same brick/tile/tile group/slice as the current video block.

L1. The method of any of clauses A1-K18, wherein the conversion includes generating the bitstream representation from the current video block.

L2. The method of any of clauses A1-K18, wherein the conversion includes generating pixel values of the current video block from the bitstream representation.

L3. A video encoder apparatus comprising a processor configured to implement a method recited in any one or more of clauses A1-K18.

L4. A video decoder apparatus comprising a processor configured to implement a method recited in any one or more of clauses A1-K18.

L5. A computer readable medium having code stored thereon, the code embodying processor-executable instructions for implementing a method recited in any of or more of clauses A1-K18.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:
1. A method of visual media processing, comprising:
determining, for a conversion of a current video block of a video and a bitstream of the video, that a first coding mode is applied on the current video block;
deriving a first block vector (BVx, BVy) for the current video block;
generating prediction samples for the current video block based on the first block vector and a luma buffer, wherein reconstructed samples of previous video blocks without being applied a filtering operation are stored in the luma buffer, and wherein in the first coding mode, the prediction samples are derived from a same picture including the current video block; and
performing the conversion based on the prediction samples;
wherein a size of the luma buffer is indicated by M=mW and N=H, wherein M is a width of the luma buffer, N is a height of the luma buffer, W is a width of a coding tree block including the current video block, and H is a height of a coding tree block including the current video block,
wherein m is a positive integer and derived based on W or H,
wherein W, H, M and N are all positive integers, and wherein, for any pixel (x0, y0) in the current video block, y0+BVy and x0+BVx are restricted to a certain range.

2. The method of claim 1, wherein y0+BVy should be in a range of [0, ..., N−1], and x0+BVx should be in a range of [0, ..., M−1].

3. The method of claim 1, wherein the luma buffer is reset before coding a picture or a slice.

4. The method of claim 3, wherein elements of the luma buffer are reset with a fixed value.

5. The method of claim 1, wherein the reference area includes nearest available m−1 coding tree blocks in a coding tree block row.

6. The method of claim 1, wherein after reconstructing a position (x, y) relative to an upper-left corner of a picture, a value at position (x mod M, y mod N) in the luma buffer is updated with a reconstructed value of the position (x, y).

7. The method of claim 1, wherein the conversion includes encoding the current video block into the bitstream.

8. The method of claim 1, wherein the conversion includes decoding the current video block from the bitstream.

9. An apparatus for processing video data comprising a processor and a non-transitory memory with instructions thereon, wherein the instructions upon execution by the processor, cause the processor to:
determine, for a conversion of a current video block of a video and a bitstream of the video, that a first coding mode is applied on the current video block;
derive a first block vector (BVx, BVy) for the current video block;
generate prediction samples for the current video block based on the first block vector and a luma buffer, wherein reconstructed samples of previous video blocks without being applied a filtering operation are stored in the luma buffer, and wherein in the first coding mode, the prediction samples are derived from a same picture including the current video block; and
perform the conversion based on the prediction samples, wherein a size of the luma buffer is indicated by M=mW and N=H, wherein M is a width of the luma buffer, N is a height of the luma buffer, W is a width of a coding tree block including the current video block, and H is a height of a coding tree block including the current video block,
wherein m is a positive integer and derived based on W or H,
wherein W, H, M and N are all positive integers, and
wherein for any pixel (x0, y0) in the current video block, y0+BVy and x0+BVx are restricted to a certain range.

10. The apparatus of claim 9, wherein y0+BVy should be in a range of [0, ..., N−1], and x0+BVx should be in a range of [0, ..., M−1].

11. The apparatus of claim 9, wherein the luma buffer is reset before coding a picture or a slice.

12. The apparatus of claim 11, wherein elements of the luma buffer are reset with a fixed value.

13. The apparatus of claim 9, wherein the reference area includes nearest available m−1 coding tree blocks in a coding tree block row.

14. The apparatus of claim 9, wherein after reconstructing a position (x, y) relative to an upper-left corner of a picture, a value at position (x mod M, y mod N) in the luma buffer is updated with a reconstructed value of the position (x, y).

15. The apparatus of claim 9, wherein the conversion includes encoding the current video block into the bitstream.

16. The apparatus of claim 9, wherein the conversion includes decoding the current video block from the bitstream.

17. A non-transitory computer-readable storage medium storing instructions that cause a processor to:
determine, for a conversion of a current video block of a video and a bitstream of the video, that a first coding mode is applied on the current video block;
derive a first block vector (BVx, BVy) for the current video block;
generate prediction samples for the current video block based on the first block vector and a luma buffer, wherein reconstructed samples of previous video blocks without being applied a filtering operation are stored in the luma buffer, and wherein in the first coding mode, the prediction samples are derived from a same picture including the current video block; and
perform the conversion based on the prediction samples, wherein a size of the luma buffer is indicated by M=mW and N=H, wherein M is a width of the luma buffer, N is a height of the luma buffer, W is a width of a coding tree block including the current video block, and H is a height of a coding tree block including the current video block,
wherein m is a positive integer and derived based on W or H,
wherein W, H, M and N are all positive integers, and
wherein for any pixel (x0, y0) in the current video block, y0+BVy and x0+BVx are restricted to a certain range.

18. A non-transitory computer-readable recording medium storing a bitstream of a video which is generated by a method performed by a video processing apparatus, wherein the method comprises:
determining, that a first coding mode is applied on a current video block of the video;
deriving a first block vector (BVx, BVy) for the current video block;
generating prediction samples for the current video block based on the first block vector and a luma buffer, wherein reconstructed samples of previous video blocks without being applied a filtering operation are stored in the luma buffer, and wherein in the first coding mode, the prediction samples are derived from a same picture including the current video block; and
generating the bitstream based on the prediction samples, wherein a size of the luma buffer is indicated by M=mW and N=H, wherein M is a width of the luma buffer, N is a height of the luma buffer, W is a width of a coding tree block including the current video block, and H is a height of a coding tree block including the current video block,
wherein m is a positive integer and derived based on W or H,
wherein W, H, M and N are all positive integers, and
wherein for any pixel (x0, y0) in the current video block, y0+BVy and x0+BVx are restricted to a certain range.

19. The non-transitory computer-readable storage medium of claim 17, wherein the luma buffer is reset before coding a picture or a slice.

20. The non-transitory computer-readable recording medium of claim 18, wherein the luma buffer is reset before coding a picture or a slice.

* * * * *